(12) United States Patent
Zhang et al.

(10) Patent No.: US 12,729,614 B2
(45) Date of Patent: Sep. 8, 2026

(54) ADAPTIVE MOBILE POWER GENERATION SYSTEM

(71) Applicant: YANTAI JEREH PETROLEUM EQUIPMENT & TECHNOLOGIES CO., LTD., Yantai (CN)

(72) Inventors: Peng Zhang, Yantai (CN); Liang Lv, Yantai (CN); Rikui Zhang, Yantai (CN); Zhuqing Mao, Yantai (CN); Jianwei Wang, Yantai (CN); Chunqiang Lan, Yantai (CN); Yipeng Wu, Yantai (CN); Xincheng Li, Yantai (CN); Ning Feng, Yantai (CN); Ting Zhang, Yantai (CN); Jianglei Zou, Yantai (CN); Haibo Zhang, Yantai (CN); Ligong Wu, Yantai (CN); Cong Zhang, Yantai (CN); Wanchun Zha, Yantai (CN); Qiong Wu, Yantai (CN); Jifeng Zhong, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/659,970

(22) Filed: May 9, 2024

(65) Prior Publication Data

US 2024/0301777 A1 Sep. 12, 2024

Related U.S. Application Data

(63) Continuation-in-part of application No. 18/348,761, filed on Jul. 7, 2023, now Pat. No. 12,234,712, which
(Continued)

(30) Foreign Application Priority Data

Jan. 11, 2021 (CN) ......................... 202110030394.5
Apr. 2, 2021 (CN) ......................... 202110360761.8
(Continued)

(51) Int. Cl.
*E21B 43/26* (2006.01)
*F02C 6/00* (2006.01)
*F02C 7/36* (2006.01)

(52) U.S. Cl.
CPC .......... *E21B 43/2607* (2020.05); *E21B 43/26* (2013.01); *F02C 6/00* (2013.01); *F02C 7/36* (2013.01)

(58) Field of Classification Search
CPC ........ E21B 43/2607; E21B 43/26; F02C 6/00; F02C 7/36; F02C 7/26; F05D 2250/313;
(Continued)

(56) References Cited

U.S. PATENT DOCUMENTS 2,988,153 A 6/1961 Haworth et al.
3,350,138 A 10/1967 Wilms
(Continued)

FOREIGN PATENT DOCUMENTS

CA 2 292 821 A1 6/2000
CA 2944968 8/2016
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

*Primary Examiner* — James G Sayre
(74) *Attorney, Agent, or Firm* — Crowell & Moring LLP

(57) ABSTRACT

This disclosure generally relates to power generation methods and systems based on gas turbine engines, and particu-
(Continued)

larly to mobile and adaptive power generation systems and methods based on gas turbine engine for supplying mechanical and/or electrical power for fracturing operations at an oil wellsite. Various systems, platforms, components, devices, and methods are provided for flexibly and adaptively configure one of more gas turbines, hydraulic pumps, and electric generators to support both fracturing and electric demands at a well site. The disclosed implementations enable and facilitate a mobile, adaptive, and reconfigurable power system to provide both mechanical and electric power for hydraulic fracturing operation, which is convenient to set up for operation and for transport.

19 Claims, 27 Drawing Sheets

Related U.S. Application Data is a continuation-in-part of application No. 17/493,573, filed on Oct. 4, 2021, now Pat. No. 12,320,344, application No. 18/659,970 is a continuation-in-part of application No. 17/735,826, filed on May 3, 2022, now Pat. No. 11,702,919, which is a continuation-in-part of application No. 17/370,856, filed on Jul. 8, 2021, now Pat. No. 11,608,726, and a continuation of application No. 17/544,462, filed on Dec. 7, 2021, now Pat. No. 11,499,405, which is a continuation of application No. PCT/CN2019/107026, filed on Sep. 20, 2019.

(30) Foreign Application Priority Data

Apr. 20, 2021 (CN) ........................ 202110426356.1
Jun. 4, 2021 (CN) .......................... 20211062507.1
Sep. 17, 2021 (CN) ........................ 202111094887.1

(58) Field of Classification Search
CPC ............ F05D 2260/96; F05D 2220/76; F05D 2240/90; F01D 25/30; F04B 17/05
See application file for complete search history.

(56) References Cited

U.S. PATENT DOCUMENTS 3,400,609 A 9/1968 Utter
3,418,485 A 12/1968 Anderson et al.
3,791,682 A 2/1974 Mitchell
3,794,377 A 2/1974 Wachsmuth et al.
3,815,965 A 6/1974 Ostwald
3,881,841 A 5/1975 Straniti
4,201,523 A 5/1980 Olofsson
4,341,071 A 7/1982 Abo et al.
4,464,902 A 8/1984 Mendle et al.
4,793,775 A 12/1988 Peruzzi
4,848,617 A 7/1989 Zygaj
4,955,494 A 9/1990 Angelone
5,149,248 A 9/1992 Cramer
5,435,975 A 7/1995 Bastos
5,517,822 A 5/1996 Haws et al.
5,709,076 A 1/1998 Lawlor
5,846,056 A 12/1998 Dhindsa et al.
6,134,878 A 10/2000 Amako et al.
6,230,481 B1 5/2001 Jahr
6,446,425 B1 9/2002 Lawlor
7,028,461 B2 4/2006 Goi
7,036,318 B1 5/2006 Munson, Jr.
7,506,574 B2 3/2009 Jensen et al.
7,552,903 B2 6/2009 Dunn et al.
7,845,413 B2 12/2010 Shampine et al.
8,506,267 B2 8/2013 Gambier
8,567,354 B2 10/2013 Kealy et al.
8,621,873 B2 1/2014 Robertson et al.
8,731,793 B2 5/2014 Barbir et al.
8,801,394 B2 8/2014 Anderson
9,534,473 B2 1/2017 Morris et al.
9,650,879 B2 5/2017 Broussard
10,030,579 B2 * 7/2018 Austin .................... F16M 3/00
10,060,293 B2 8/2018 Del Bono
10,240,643 B2 3/2019 Clap et al.
10,371,012 B2 8/2019 Davis et al.
10,648,311 B2 5/2020 Oehring et al.
10,815,764 B1 10/2020 Yeung
10,865,624 B1 12/2020 Cui et al.
10,895,202 B1 1/2021 Yeung et al.
10,914,155 B2 2/2021 Oehring et al.
10,954,770 B1 3/2021 Yeung et al.
10,961,993 B1 3/2021 Ji et al.
10,968,837 B1 4/2021 Yeung et al.
11,047,379 B1 6/2021 Li et al.
11,109,508 B1 8/2021 Yeung et al.
11,111,768 B1 9/2021 Yeung et al.
11,125,066 B1 9/2021 Yeung et al.
11,143,006 B1 10/2021 Zhang et al.
11,181,046 B1 11/2021 Brooks et al.
11,208,878 B2 12/2021 Oehring et al.
11,220,895 B1 1/2022 Yeung et al.
11,242,737 B2 2/2022 Zhang
11,378,008 B2 7/2022 Yeung et al.
11,391,136 B2 7/2022 Coli et al.
11,434,737 B2 9/2022 Oehring et al.
11,441,483 B2 9/2022 Li et al.
11,459,863 B2 10/2022 Robinson et al.
11,499,405 B2 11/2022 Zhang
11,519,395 B2 12/2022 Zhang
11,608,726 B2 3/2023 Zhang et al.
2003/0004029 A1 1/2003 Lagarde et al.
2003/0064858 A1 4/2003 Saeki et al.
2003/0171184 A1 9/2003 Wige
2004/0050049 A1 3/2004 Wendt et al.
2005/0093496 A1 5/2005 Tokunou et al.
2005/0221946 A1 10/2005 Mitrovic
2007/0213171 A1 9/2007 Pizzichil et al.
2007/0277982 A1 12/2007 Shampine et al.
2009/0068031 A1 3/2009 Gambier et al.
2010/0033148 A1 2/2010 Tsai
2010/0071899 A1 3/2010 Coquilleau et al.
2010/0135840 A1 6/2010 Fujimoto et al.
2011/0085924 A1 4/2011 Shampine et al.
2011/0171044 A1 7/2011 Flanigan
2012/0199001 A1 8/2012 Chillar et al.
2013/0112029 A1 5/2013 Slayter et al.
2013/0209236 A1 8/2013 Xu
2013/0255153 A1 10/2013 Sasaki et al.
2014/0013768 A1 1/2014 Laing et al.
2014/0144641 A1 5/2014 Chandler
2014/0174717 A1 6/2014 Broussard et al.
2014/0219824 A1 8/2014 Burnette
2014/0274557 A1 9/2014 Chong
2015/0184591 A1 7/2015 Giancotti et al.
2015/0247421 A1 9/2015 Wojick et al.
2015/0252661 A1 9/2015 Glass
2015/0275891 A1 10/2015 Chong
2015/0377318 A1 12/2015 Byrne
2015/0381013 A1 12/2015 Davies et al.
2016/0041066 A1 2/2016 Patenaude et al.
2016/0047305 A1 2/2016 Wickert et al.
2016/0102581 A1 4/2016 Del Bono
2016/0121871 A1 5/2016 Lee
2016/0169322 A1 6/2016 Ono
2016/0177678 A1 6/2016 Morris et al.
2016/0218650 A1 7/2016 Gajanayake et al.
2016/0230525 A1 8/2016 Lestz et al.
2016/0281484 A1 9/2016 Lestz et al.
2016/0341124 A1 11/2016 Ross et al.
2016/0348479 A1 12/2016 Oehring et al.
2017/0023014 A1 1/2017 Clemen et al.
2017/0074288 A1 3/2017 Setty et al.
2017/0082110 A1 3/2017 Lammers
2017/0089189 A1 3/2017 Norris et al.

(56) References Cited

U.S. PATENT DOCUMENTS

| | | | |
|---|---|---|---|
| 2017/0104389 | A1 | 4/2017 | Morris et al. |
| 2017/0145844 | A1 | 5/2017 | Jamiolkowski et al. |
| 2017/0218727 | A1 | 8/2017 | Oehring et al. |
| 2017/0234308 | A1 | 8/2017 | Buckley |
| 2017/0285062 | A1 | 10/2017 | Kim |
| 2017/0292789 | A1 | 10/2017 | Hjorth et al. |
| 2018/0080377 | A1 | 3/2018 | Austin et al. |
| 2018/0111807 | A1 | 4/2018 | Snider |
| 2018/0163569 | A1 | 6/2018 | LeBlanc et al. |
| 2018/0266412 | A1 | 9/2018 | Stokkevag et al. |
| 2018/0283464 | A1 | 10/2018 | Altamura |
| 2018/0328157 | A1 | 11/2018 | Bishop |
| 2019/0063309 | A1 | 2/2019 | Davis |
| 2019/0067991 | A1 | 2/2019 | Davis et al. |
| 2019/0068026 | A1 | 2/2019 | Davis |
| 2019/0100989 | A1 | 4/2019 | Stewart et al. |
| 2019/0128265 | A1 | 5/2019 | Washio et al. |
| 2019/0169971 | A1 | 6/2019 | Oehring et al. |
| 2019/0178235 | A1 | 6/2019 | Coskrey et al. |
| 2019/0195292 | A1 | 6/2019 | Pan et al. |
| 2019/0338762 | A1 | 11/2019 | Curry et al. |
| 2020/0040878 | A1 | 2/2020 | Morris et al. |
| 2020/0049136 | A1 | 2/2020 | Stephenson |
| 2020/0056458 | A1 | 2/2020 | Mao et al. |
| 2020/0109616 | A1 | 4/2020 | Oehring et al. |
| 2020/0325760 | A1 | 10/2020 | Markham |
| 2020/0325761 | A1 | 10/2020 | Williams |
| 2020/0332784 | A1 | 10/2020 | Zhang et al. |
| 2020/0340344 | A1 | 10/2020 | Reckels et al. |
| 2020/0370633 | A1 | 11/2020 | Kumar |
| 2020/0392826 | A1 | 12/2020 | Cui et al. |
| 2021/0025383 | A1 | 1/2021 | Bodishbaugh |
| 2021/0040830 | A1 | 2/2021 | Mu et al. |
| 2021/0071579 | A1 | 3/2021 | Li et al. |
| 2021/0079902 | A1 | 3/2021 | Yeung et al. |
| 2021/0095552 | A1 | 4/2021 | Oehring et al. |
| 2021/0095648 | A1 | 4/2021 | Buckley et al. |
| 2021/0102451 | A1 | 4/2021 | Robinson et al. |
| 2021/0102530 | A1 | 4/2021 | Pruitt et al. |
| 2021/0102531 | A1 | 4/2021 | Bodishbaugh et al. |
| 2021/0199161 | A1 | 7/2021 | Eto et al. |
| 2021/0310341 | A1 | 10/2021 | Sherman et al. |
| 2021/0355802 | A1 | 11/2021 | Yeung et al. |
| 2021/0372256 | A1 | 12/2021 | Yeung et al. |
| 2021/0381358 | A1 | 12/2021 | Yeung |
| 2021/0404309 | A1 | 12/2021 | Yeung et al. |
| 2022/0018232 | A1 | 1/2022 | Oehring et al. |
| 2022/0025818 | A1* | 1/2022 | Yeung ........................ F02C 7/24 |
| 2022/0213777 | A1 | 7/2022 | Cui et al. |
| 2022/0259964 | A1 | 8/2022 | Zhang |
| 2022/0298906 | A1 | 9/2022 | Zhong et al. |
| 2022/0333471 | A1 | 10/2022 | Zhong et al. |
| 2022/0341362 | A1* | 10/2022 | Feng ..................... F02B 63/047 |
| 2022/0364448 | A1 | 11/2022 | Oehring et al. |
| 2023/0296050 | A1 | 9/2023 | Yeung et al. |

FOREIGN PATENT DOCUMENTS

| | | | |
|---|---|---|---|
| CA | 3154906 | A1 | 3/2021 |
| CN | 2625578 | Y | 7/2004 |
| CN | 1566689 | A | 1/2005 |
| CN | 201159100 | Y | 12/2008 |
| CN | 201461291 | U | 5/2010 |
| CN | 201646518 | U | 11/2010 |
| CN | 201863895 | U | 6/2011 |
| CN | 102136778 | A | 7/2011 |
| CN | 102602323 | A | 7/2012 |
| CN | 202544830 | U | 11/2012 |
| CN | 202645914 | U | 1/2013 |
| CN | 202673269 | U | 1/2013 |
| CN | 202763319 | U | 3/2013 |
| CN | 202926404 | U | 5/2013 |
| CN | 202935216 | U | 5/2013 |
| CN | 203962367 | U | 11/2014 |
| CN | 105065224 | A | 11/2015 |
| CN | 205117343 | U | 3/2016 |
| CN | 105545666 | A | 5/2016 |
| CN | 105703535 | A | 6/2016 |
| CN | 205479153 | U | 8/2016 |
| CN | 106089175 | A | 11/2016 |
| CN | 106143468 | A | 11/2016 |
| CN | 107208557 | A | 9/2017 |
| CN | 107237617 | A | 10/2017 |
| CN | 107544304 | A | 1/2018 |
| CN | 107816341 | A | 3/2018 |
| CN | 107939342 | A | 4/2018 |
| CN | 108278148 | A | 7/2018 |
| CN | 108343416 | A | 7/2018 |
| CN | 108443099 | A | 8/2018 |
| CN | 208169068 | U | 11/2018 |
| CN | 208281489 | U | 12/2018 |
| CN | 109296733 | A | 2/2019 |
| CN | 109578459 | A | 4/2019 |
| CN | 109578459 | B | 4/2019 |
| CN | 208862781 | U | 5/2019 |
| CN | 109869294 | A | 6/2019 |
| CN | 109882144 | A | 6/2019 |
| CN | 109906305 | A | 6/2019 |
| CN | 209041375 | U | 6/2019 |
| CN | 107461253 | B | 8/2019 |
| CN | 110118127 | A | 8/2019 |
| CN | 110145399 | A | 8/2019 |
| CN | 110374745 | A | 10/2019 |
| CN | 209469732 | U | 10/2019 |
| CN | 110454285 | A | 11/2019 |
| CN | 110469314 | A | 11/2019 |
| CN | 110469405 | A | 11/2019 |
| CN | 110500255 | A | 11/2019 |
| CN | 110513097 | A | 11/2019 |
| CN | 209586278 | U | 11/2019 |
| CN | 209586287 | U | 11/2019 |
| CN | 110735713 | A | 1/2020 |
| CN | 110821464 | A | 2/2020 |
| CN | 110894807 | A | 3/2020 |
| CN | 111156266 | A | 5/2020 |
| CN | 210714958 | U | 6/2020 |
| CN | 210985525 | A | 7/2020 |
| CN | 111502974 | A | 8/2020 |
| CN | 111594314 | A | 8/2020 |
| CN | 111946504 | A | 11/2020 |
| CN | 112343676 | A | 2/2021 |
| CN | 112682172 | A | 4/2021 |
| CN | 112983381 | A | 6/2021 |
| CN | 214741267 | U | 11/2021 |
| CN | 214944457 | U | 11/2021 |
| CN | 217582962 | U | 10/2022 |
| DE | 102015213625 | A1 | 1/2017 |
| FR | 2890438 | A1 | 3/2013 |
| KR | 101861753 | B1 | 5/2018 |
| WO | WO 2019/204323 | A1 | 10/2019 |

OTHER PUBLICATIONS

International Search Report, dated Jun. 5, 2020, pp. 1-4, issued in International Patent Application No. PCT/CN2019/107020, China Intellectual Property Administration, Beijing, China.

International Search Report, dated Jun. 5, 2020, pp. 1-4, issued in International Patent Application No. PCT/CN2019/107021, China Intellectual Property Administration, Beijing, China.

International Search Report, dated Jun. 10, 2020, pp. 1-4, issued in International Patent Application No. PCT/CN2019/107023, China Intellectual Property Administration, Beijing, China.

International Search Report, dated May 14, 2020, pp. 1-4, issued in International Patent Application No. PCT/CN2019/107026, China Intellectual Property Administration, Beijing, China.

International Search Report, dated Sep. 26, 2021, pp. 1-4, issued in International Patent Application No. PCT/CN2019/095646, China Intellectual Property Administration, Beijing, China.

Non-Final Office Action for U.S. Appl. No. 17/884,358 mailed on Dec. 8, 2022.

Final Office Action for U.S Appl. No. 17/733,922 mailed on Dec. 28, 2022.

(56) References Cited

OTHER PUBLICATIONS

Notice of Allowance for U.S Appl. No. 17/884,358 mailed on Feb. 8, 2023.
Written Opinion and International Search Report for PCT Application No. PCT/CN2021/139240 mailed on Mar. 16, 2022.
Non-Final Office Action for U.S Appl. No. 17/733,922 mailed on Sep. 21, 2022.
Notice of Allowance for U.S. Appl. No. 17/493,573 dated Oct. 17, 2024.
Non-final Office Action for U.S. Appl. No. 18/348,761 mailed on Jul. 5, 2024.
Ex-Parte Quayle for U.S. Appl. No. 18/342,318 dated May 14, 2024.
Non-final Office Action for U.S. Appl. No. 18/184,360 mailed on Jan. 8, 2024.
Non-final Office Action for U.S. Appl. No. 17/886,221 mailed on Jan. 29, 2024.
Non-final Office Action for U.S. Appl. No. 18/182,920 mailed on Jan. 2, 2024.
Final Office Action for U.S. Appl. No. 17/891,632 mailed on May 31, 2024.
Non-final Office Action for U.S. Appl. No. 17/891,632 mailed on Jan. 12, 2024.
Final Office Action for U.S. Appl. No. 17/891,632 mailed on Jul. 3, 2023.
Non-Final Office Action for U.S. Appl. No. 17/891,632 mailed on Feb. 13, 2023.
Non-Final Office Action for U.S. Appl. No. 17/889,101 mailed on Aug. 25, 2023.
Final Office Action for U.S. Appl. No. 17/889,101 mailed on Mar. 7, 2023.
Non-Final Office Action for U.S. Appl. No. 17/889,101 mailed Oct. 12, 2022.
Non-Final Office Action for U.S. Appl. No. 18/509,683 mailed on Aug. 20, 2024.
Reexamination Opinion dated May 16, 2025 for Chinese Patent Application No. 201910893337.2 (6 pages).
Chinese-language Search Report issued in Chinese Application No. 2021103390663 dated Oct. 27, 2025 (2 pages).
Chinese-language Office Action issued in Chinese Application No. 202110339066.3 dated Oct. 31, 2025 (1 page).
Search Report issued in Chinese Application No. 2021103390663 dated Nov. 27, 2024 (2 pages).
Chinese-language Office Action issued in Chinese Application No. 202110339066.3 dated Nov. 27, 2024, with English translation (15 pages).
Chinese-language Office Action issued in Chinese Application No. 202110339066.3 dated Jun. 30, 2025 (7 pages).
Chinese Office Action issued Jun. 12, 2026 in Chinese Patent Application No. 202311253023.9, with English translation; total 12 pages.
Chinese Search Report issued Jun. 12, 2026 in Chinese Patent Application No. 202311253023.9, with English translation; total 6 pages.

* cited by examiner

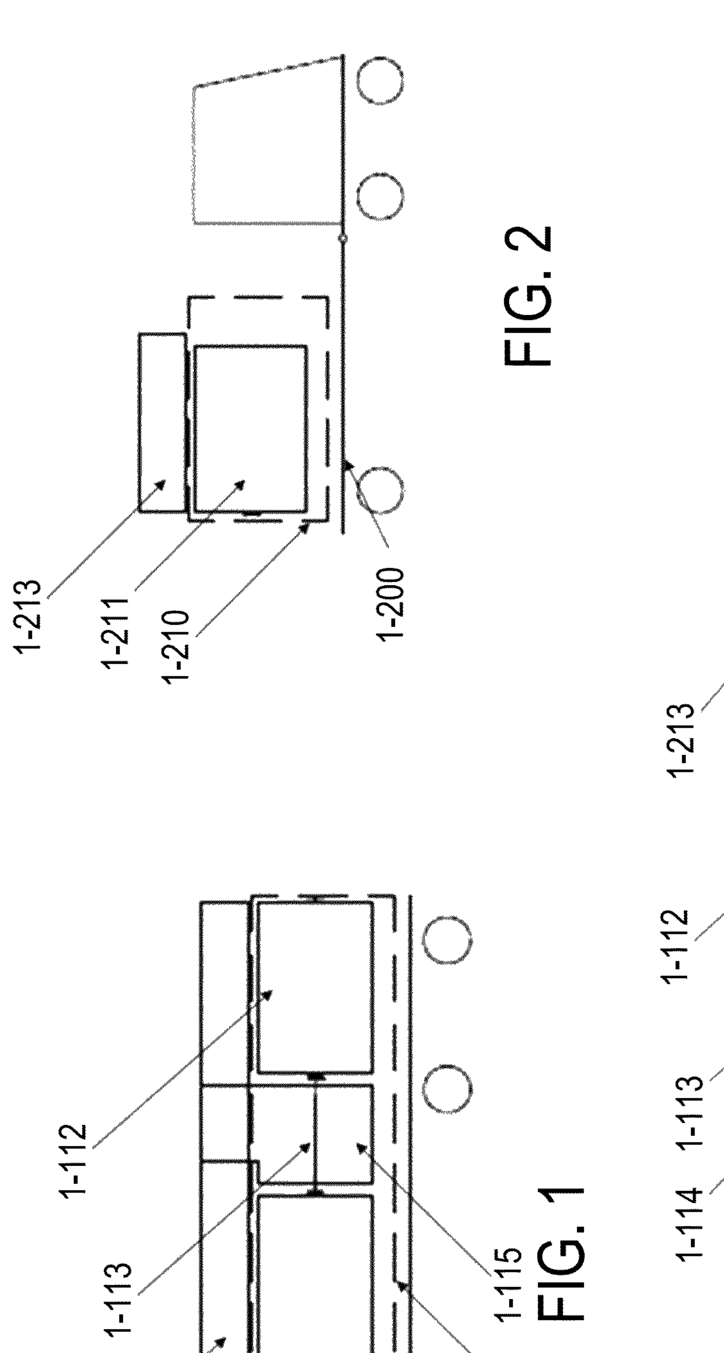
FIG. 2
FIG. 1
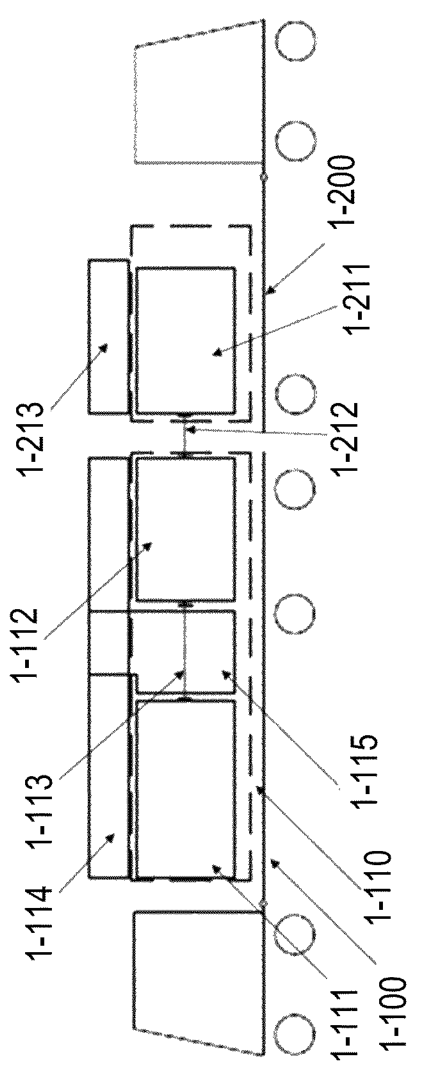
FIG. 3

3-60
3-6022a
3-6022b
3-6022c
3-6024
3-602
3-601
3-6023

3-60
3-6011
3-602
3-6022a
3-6024
3-6022b
3-6022c
3-601

3-60
3-6011
Rotation direction
3-6021
3-602
3-6024
3-6023
3-601
6012

3-60
3-6011
Moving direction
3-6024
3-602
3-6021
3-601
3-6012

ADAPTIVE MOBILE POWER GENERATION SYSTEM

CROSS-REFERENCE

This present application is a continuation-in-part application and claims the benefit of priority to U.S. patent application Ser. No. 18/348,761, filed on Jul. 7, 2023, which is a continuation-in-part application of and claims the benefit of priority to U.S. patent application Ser. No. 17/493,573 filed on Oct. 4, 2021, which is based on and claims the benefit of priority to Chinese Patent Application No. 202110426356.1 filed on Apr. 20, 2021. The present application is further a continuation-in-part application of and claims the benefit of priority to U.S. patent application Ser. No. 17/735,826 filed on May 3, 2023, which is a continuation-in-part application of and claims priority to U.S. patent application Ser. No. 17/370,856, filed on Jul. 8, 2021, which is based on and claims priority to Chinese Patent Application Nos. 202110030394.5 and 202110360761.8, filed on Jan. 11, 2021 and Apr. 2, 2021, respectively. U.S. patent application Ser. No. 17/735,826 is further based on and claims priority to Chinese Patent Application No. 202111094887.1 filed on Sep. 17, 2021 and Chinese Patent Application No. 202110625071 filed on filed on Jun. 4, 2021. U.S. patent application Ser. No. 17/735,826 additionally claim priority to U.S. patent application Ser. No. 17/544,462 filed on Dec. 7, 2021, which is based on International PCT Patent Application No. PCT/CN/2019/107026, filed on Sep. 20, 2019. The entireties of these prior U.S., Chinese, and PCT patent applications are herein incorporated by reference as part of the present disclosure.

TECHNICAL FIELD

The present invention generally relates to power generation methods and systems based on gas turbine engines, and particularly to mobile and adaptive power generation systems and methods based on gas turbine engine for supplying mechanical and/or electrical power for fracturing operations at an oil wellsite.

BACKGROUND

A gas turbine generally includes an internal combustion engine that converts chemical energy of a fuel into mechanical energy in the form of rotational power that can be further utilized to power various loads, including but not limited to mechanical loads such as hydraulic pumps and electric loads such as electric generators. The advantages of gas turbines include high reliability, low operating costs and high-power density. Gas turbines can also run on cleaner energy sources than, e.g., diesel engines, thereby reducing carbon emissions and air pollution. In a particular example, gas turbines may be used in the combined-heat-and-power (CHP) production to increase energy efficiency of thermal power plants by using the hot exhaust gas from the gas turbines to generate steam for driving electric generators in addition to directly driving the electric generators with the rotational power from the gas turbines. An example of electric power generation system based on gas turbines is described in US Patent Application Publication No. US20180080376A1, which is herein incorporated by reference as part of current disclosure. That reference, for example, discloses a system comprising: a first moving body configured to support a gas turbine and an air intake portion connected to the gas turbine; a second moving body configured to support a generator, wherein the first and second moving bodies are configured to align with the detachable coupling between the gas turbine and the generator, and the third moving body is configured to support one or more partially assembled components associated with the gas turbine and the generator. The term “gas turbine”, “turbine”, “gas turbine engine”, “turbine engine” may be used interchangeably in this disclosure.

In some applications, gas turbines may be used to drive both mechanical loads and electric power generators. For example, in an oil well site employing hydraulic fracturing operations, gas turbines may be used to drive both hydraulic pumps and electric generators. The hydraulic pumps such as plunger pumps may be operated to deliver higher pressure fracturing fluid to a wellhead of the wellsite whereas the electric generators may be configured to provide electric power to components of the entire power system and other components of the wellsite. It is desirable that the entire power system be adaptive, mobile, and convenient reconfigurable, as these systems are often move from well site to well site having different power requirement and characteristics.

SUMMARY

The present invention generally relates to power generation methods and systems based on gas turbine engines, and particularly to mobile and adaptive power generation systems and methods based on gas turbine engine for supplying mechanical and/or electrical power for fracturing operations at an oil wellsite.

In one example embodiment, a power generation and delivery platform is disclosed. The power generation and delivery platform may include one or more power systems. The one ore more power systems may each include a rotational combustion power generation device comprising a rotational power output port and an exhaust section, the rotational power output port and the exhaust section being disposed on a same end of the rotational combustion power generation device; a power-load bearing platform, configured for carrying and fixing a first type of power load or a second type of power load distinct from the first type of power load; a power transmission device, detachably coupled to the rotational power output port of the rotational combustion power generation device on a first end, and swappably coupled to either the first type of power load or the second type of power load when carried by and fixed on the power-load bearing platform. The power transmission device passes through the exhaust section of the rotational combustion power generation device. The power generation and delivery system is configured to swappably operate in at least a first operational state and a second operational state. The first operational state comprises supplying an output rotational power to the first type of power load. The second operational state comprises supplying the output rotational power to the second type of power load.

In another example embodiment, a method for controlling an operation of an oil well site is disclosed. The method may include providing a power generation and delivery platform comprising a plurality of power systems each including a gas turbine, a power-load bearing platform, configured to swappably fix and carry a plunger pump or an electric generator, and a power transmission device, detachably couples the gas turbine to the plunger pump in a first operational state or to the electric generator in a second operational state. The method may further include automatically monitoring fracturing fluid displacement generated by a first subset of power systems of the plurality of the power systems configured in the first operation state; automatically determining a current operational fracturing fluid displacement of the oil well site; retrieving a fracturing fluid displacement demand of the oil well site; and in response to the current operational fracturing fluid displacement being greater than the fracturing fluid displacement demand, generating a switching control information, the switching control information indicate a set of power systems among the first subset of power systems to be switched from the first operational state to the second operational state

BRIEF DESCRIPTION OF THE DRAWINGS

To facilitate illustration of the technical solutions of the embodiments of the present disclosure, the accompanying drawings are provided and are briefly introduced below. These drawings merely represent some example embodiments of the present disclosure, and are not intended as limiting the scope of the present disclosure and the claims.

FIG. 1 shows a schematic structural diagram of an example mobile power platform as provided according to an embodiment of the present disclosure.

FIG. 2 shows a schematic structural diagram of another example mobile power platform as provided according to an embodiment of the present disclosure.

FIG. 3 shows a schematic structural diagram of an example mobile power platform combining the example mobile power platforms of FIG. 1 and FIG. 2 according to an embodiment of the present disclosure.

Figure 4:
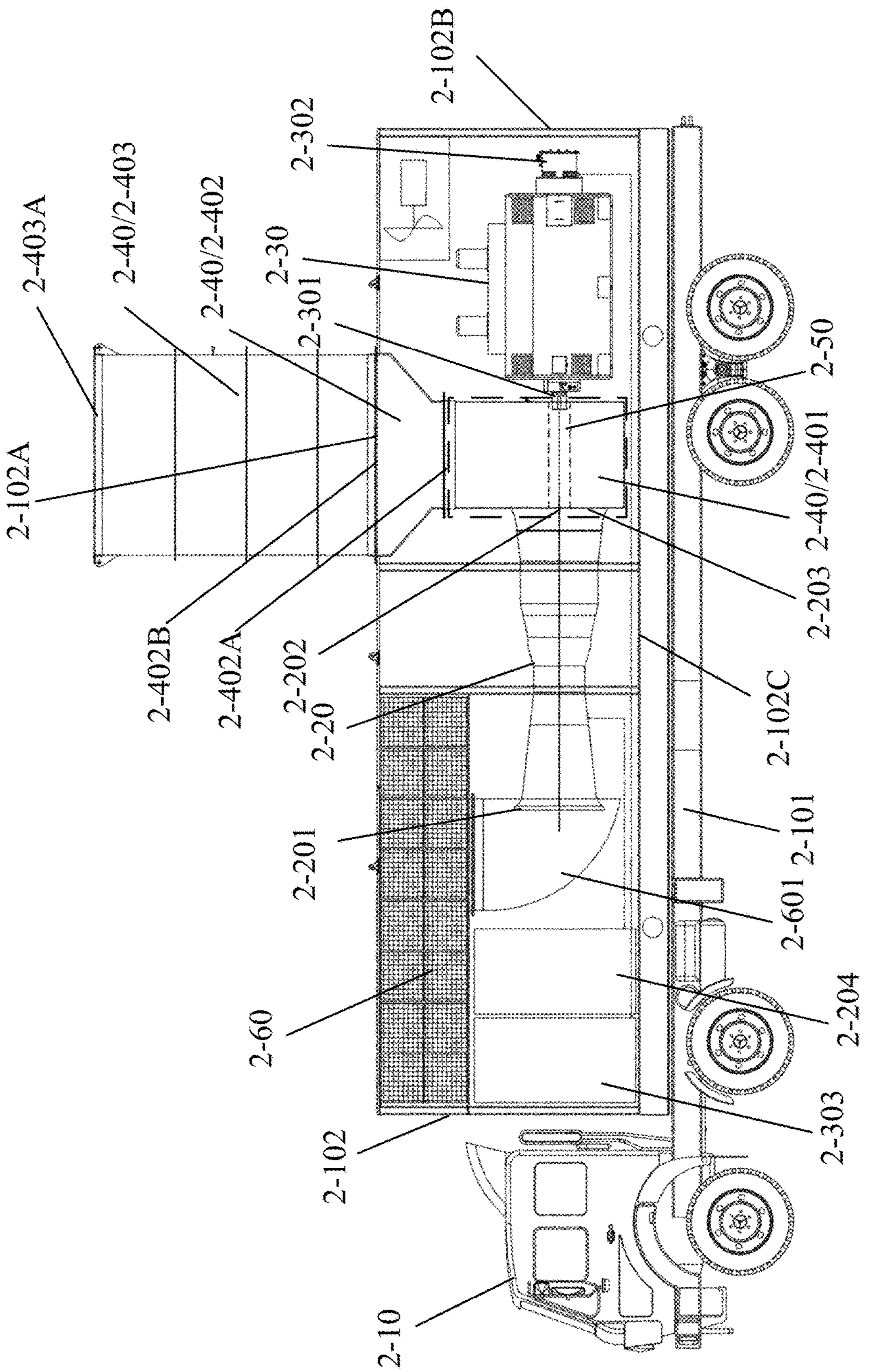
FIG. 4 shows a side view of an example mobile electric power generation system as provided according to an embodiment of the present disclosure.

The drawings of the various embodiments of the present disclosure above only shows structures relevant to corresponding embodiments of the present disclosure. Other structures not shown in the drawings are not excluded from the various embodiments. The thicknesses of layers or regions may be exaggerated or reduced for clarity. In other words, the drawings may not be necessarily generated according to an actual scale. The various features of the drawings and the corresponding embodiment may be combined in any non-conflicting manner.

DESCRIPTION OF THE EMBODIMENTS

The various technical solutions and implementations of the present disclosure are described below with reference to the accompanying drawings. The embodiments descried in detail are merely examples. Other related solutions and embodiments may be derived by a person having ordinary skill in the art based on the described embodiments of the present disclosure, and fall within the protective scope of the present disclosure.

Unless otherwise defined, technical or scientific terms used in this disclosure-shall have the ordinary meaning as understood by a person having ordinary skill in the art to which this disclosure belongs. As used in this disclosure, unless specified otherwise, terms such as “first,” “second,” and the like do not denote any order, quantity, or importance, but are merely used to distinguish the various components. The terms “comprising” and the like are intended to mean that the elements or things appearing before the word encompass or include the elements or things recited after the word and their equivalents, but do not exclude other elements or things. Words such as “connected” or “connected” and the like are not limited to physical or mechanical connections, but may include electrical connections and other coupling, in either a direct or indirect manner. Directional terms including but not limited to “up”, “down”, “left”, “right”, etc. are only used to represent the relative positional relationship, and when the absolute position of the described object changes, the relative positional relationship may also change accordingly.

The present disclosure generally relates to power generation methods and systems based on gas turbine engines, and particularly to mobile and adaptive power generation systems and methods based on gas turbine engine for supplying mechanical and/or electrical power for fracturing operations at an oil wellsite.

A gas turbine may include an internal combustion engine that converts chemical energy of a fuel into mechanical energy in the form of rotational power that can be further utilized to power various loads, including but not limited to mechanical loads such as hydraulic pumps and electric loads such as electric generators. The advantages of gas turbines include small footprint, compactness, high reliability, low operating costs and high-power density. Gas turbines can also run on cleaner energy sources than, e.g., diesel engines, thereby reducing carbon emissions and air pollution.

A gas turbine, for example may include an intake end for delivering combustion air and an exhaust end for releasing combustion exhaust. Fuels may be directed into a combustion chamber of the gas turbine to mix with the combustion air via fuel injection lines. The gas turbine may further include a mechanical rotational power output for driving a load. The power output of a gas turbine is usually at a high rotational speed.

In some applications, gas turbines may be used to drive both mechanical loads and electric power generators. For example, in an oil well site employing hydraulic fracturing operations, gas turbines may be used to drive both hydraulic pumps and electric generators. The hydraulic pumps such as plunger pumps may be operated to deliver higher pressure fracturing fluid to a wellhead of the wellsite whereas the electric generators may be configured to provide electric power to components of the entire power system and other components of the wellsite. It is desirable that the entire power system be adaptive, mobile, and convenient reconfigurable, as these systems are often move from well site to well site having different power requirement and characteristics.

In this disclosure, various systems, platforms, components, devices, and methods are provided for flexibly and adaptively configure one of more gas turbines, hydraulic pumps, and electric generators to support both fracturing and electric demands at a well site. The disclosed implementations enable and facilitate a mobile, adaptive, and reconfigurable power system to provide both mechanical and electric power for hydraulic fracturing operation. The disclosed systems and platforms, however, may not be limited to fracturing application. The underlying principles generally apply to power generation and distribution to other types of applications and scenarios.

In some example implementations, a mobile power generation system is disclosed. The power generation system may include a first vehicle, a gas turbine, and an electric generator (alternatively referred to as a generator). The first vehicle may be provided with a first platform. A first casing may be provided on the first platform for hosting various power generation components. The gas turbine may be arranged in the first casing and may include a first input end and a first output end. The electric generator may be arranged in the first casing and may include a second input end and a second output end, wherein the first output end of the gas turbine may be connected with the second input end of the electric generator.

The example mobile power generation system is shown in FIG. 1. As illustrated in FIG. 1, the example mobile power generation system may include a gas turbine 1-111. The gas turbine 1-111 may be alternatively referred to as gas turbine engine, turbine, or turbine engine. The power output port of the gas turbine 1-111 may be detachably connected to an electric generator 1-211 shown in FIG. 2. The electric generator 1-211 may be alternatively referred to as a generator. When in use, the gas turbine 1-111 outputs rotational kinetic energy to drive the generator 1-211 to generate electricity, and to deliver a power output through the generator 1-211.

As further shown in FIG. 1, the gas turbine 1-111 may be fixedly connected to the first platform 1-100. The first platform 1-100 may be a semi-trailer or a portion of a semi-trailer. A first casing 1-110 may be fixedly connected to the semi-trailer or integrated with the semi-trailer, and the gas turbine 1-111 may be disposed in the first casing 1-110. The first casing 1-110, may be alternatively referred to as a first housing. A gear box 1-112 may be detachably connected to a location relative to the semi-trailer corresponding to the output end of the gas turbine 1-111. In some example implementations, the gear box 1-112 may be disposed within the first casing 1-110. The gear-box 1-112 may include a mounting surface, an input port, and an output port. The gear box 1-112, for example, may fixedly connected, using bolts and the like, to the semi-trailer platform 1-100 through the mounting surface, and further through the first casing 1-110 when the gear box 1-112 is disposed within the first casing 1-110. The output end of the gas turbine 1-111 may be detachably connected with one end of a first coupling 1-113, and another end of the first coupling 1-113 away from the gas turbine 1-111 may be detachable connected to the input end of the gearbox 1-112. The detachable connection of the first coupling 1-113 to the output end of the turbine engine and/or the input port of the gear box 1-112 may be achieved via a set of bolts or splines. A first shaft hole may be formed on the side wall of the first casing 1-110 corresponding to the output end of the gear box 1-112 for outputting power from the gear box 1-112 to the outside of the first casing 1-110 (e.g., to the electric generator 1-211 of FIG. 2. The position on the first casing or housing 1-110 corresponding to the first shaft hole may be hingedly coupled to a cover capable of covering the first shaft hole, so as to open to receive a driving shaft when driving a load but to close the first shaft hole to prevent dust and other substances from entering the first casing or housing 1-110 when the gear box 1-112 is not connected to and driving any load. A first locking mechanism may be provided on the first end cover for securely closing the shaft hole, and the first locking mechanism may be based on any one of various locks such as padlocks and magnetic suction stations. During an operation of the gas turbine 1-111, the output speed or torque of the gas turbine 1-111 may be adjusted through the gearbox 1-112 to a desired level to effectively match the characteristics of the load. For example, the gas turbine 1-111 may rotate at a high speed and a rational speed reduction may be provided by the gear box for driving a load at a lower rotational speed (and, e.g., a higher torque).

A central axis of the gas turbine 1-111 may be arranged along the length direction of the semi-trailer, and the output end of the gas turbine 1-111 may be arranged toward the rear of the semi-trailer. Both a central axis of the input end and a central axis of the output end of the gearbox 1-112 may be parallel to the central axis of the gas turbine 1-111. For example, the central axis of the input end of the gearbox 1-112 may be colinear with the central axis of the gas turbine 1-111. The central axis of the output end of the gear box 1-112, however, may or may not be colinear with the central axis of the input end of the gear box 1-112. In other words, the central axis of the output end of the gear box 1-112 may be parallelly shifted from the central axis of the input end of the gear box 1-112. The term "central axis," for example, may refer to a corresponding rotational axis. The output end of the gearbox 1-112 may be disposed toward the rear of the semi-trailer.

In some example implementations as shown in FIG. 1, an exhaust channel may be disposed between the gas turbine 1-111 and the gear box 1-112 of the semi-trailer. The exhaust channel 1-115 may be detachably connected to the semi-trailer through, for example, the fist casing or housing 1-110 and/or the platform 1-100 of the semi-trailer. For example, the exhaust channel includes a volute or other structure, which can be connected to the semi-trailer or removed from the semi-trailer by means of bolting or unbolting. When connecting a volute to the gas turbine 1-111, the volute can be connected to the exhaust end of the gas turbine 1-111 by means of flanges and the like for convenient assembly and disassembly. The end of the volute away from the gas turbine 1-111 may protrude out of the first casing 1-110. Correspondingly, the first casing 1-110 may be provided with an opening for releasing turbine combustion exhaust. When the gas turbine 1-111 is in operation, the volute can guide the exhaust gas discharged from the gas turbine 1-111 away from the gas turbine 1-111 through the pipes or channels therein, so as to reduce the probability that the exhaust gas being inhaled into the gas turbine 1-111 through its air intake port.

The first casing or housing 1-110 may be further provided with a disassembly opening at a position corresponding to one side of the volute. The cross-sectional area of the disassembly opening may be larger than that of the volute, and may thus allow the volute to pass through the disassembly opening.

The provision of the disassembly opening thus may facilitate the operator to install the volute via the disassembly opening or disassemble it from the semi-trailer via the disassembly opening or disassembly port. A cavity may be formed in the volute for the first coupling 1-113 to pass through. The exhaust channels or pipes in the volute thus may be constructed to go around the cavity. During assembly, the volute may be fixed on the semi-trailer first, and then the first coupling 1-113 may be installed by inserting it through the cavity and the two ends of the first coupling 1-113 may then be respectively attached to the gas turbine 1-111 and the gearbox 1-112, as described above, to complete the driving connection or coupling between the gas turbine 1-111 and the gearbox 1-112.

The end of the volute away from the gas turbine 1-111 may be further detachably connected with an auxiliary exhaust passage. The auxiliary exhaust passage, for example, can be a pipe or a cylindrical structure. The auxiliary exhaust passage may be connected to the volute through flanges or bolts to guide the exhaust gas further away from the gas turbine 1-111.

In some implementations, as shown in FIGS. 1 and 3, a first intake passage 1-114 may be fixedly connected and disposed above the first casing 1-110 for air intake to the gas turbine 1-111. The first intake passage 1-114 may be provided with an intake port at a position corresponding to at least one side of the semi-trailer, and located near the gas turbine 1-111. In some implementations, multiple intake ports may be disposed with the intake passage 1-114 and may be located on two sides of the demi-trailer. The intake passage 1-114 may be connected to the intake end of the gas turbine 1-111. The connection may be through the first casing 1-110. Alternatively, the intake end of the gas turbine 1-111 may extrude out of the first casing 1-110 and in connection with the intake passage for the intake air to flow into the intake end of the gas turbine.

As further shown in FIG. 2, the electric generator 1-211 may be disposed on a second platform 1-200. The second platform 1-200 may be formed by a portion of a vehicle, semi-trailer, or trailer. A second casing or housing 1-210 may be provided either as an integral part of the vehicle or an add-on fixedly connected to the vehicle. The generator 1-211 may be accordingly disposed in the second casing 1-210. The second casing or housing 1-210 may be provided with a second shaft hole at a position corresponding to the input end of the generator 1-211 for allowing rotational power to be transmitted or delivered to the input end of the generator 1-211 through a shaft. The second shaft hole in the second casing or housing 1-210 may be provided with a second cover hingedly connected with the second casing. The second cover may be capable of covering the second shaft hole, so as to close the second shaft hole and prevent dust from entering when the electric generator is not connected to the gas turbine and is not in use. A second locking mechanism may be provided on the second end cover with the second casing 1-210, and the second locking mechanism may be implemented as any one of various types of locks such as padlocks and magnetic suction stations.

In some example implementations, an electric output end of the electric generator 1-211 may be disposed toward the rear or front of the vehicle body shown in FIG. 2. The output of the electric generator 1-211 may be electrically connected to any suitable load, such as an electric motor. The electric motor may be used to supply electrical power need for the fracturing operation. In some implementations, the electric motor may be used for driving a plunger pump for pumping hydraulic fracturing fluid.

As further shown in FIG. 2, a second intake passage 1-213 may be fixedly disposed on the second housing 1-210 at a position above the generator 1-211. The second intake passage 1-213 may include a pipe or a box with an opening. Air may flow into the second casing or housing 1-210 via the second intake passage, so as to achieve circulation of cooling air for the electric generator 1-211 when in operation.

Referring to FIG. 3, when using the above gas-turbine system for driving the electric generator system, the semi-trailer hosting the gas-turbine system of FIG. 2 may be parked at a fixed location or position, and the vehicle body hosting electric generator system may be reversed until the rear of the semi-trailer aligns to the rear of the vehicle body. At this time, a second coupling 1-212 can be used to line the gas-turbine 1-111 and the electric generator 1-211 for the gas turbine 1-111 to drive the electric generator 1-211 through the gear box 1-112 to produce electricity. The electric generator 1-211 may be connected with the gear box 1-112, and the manner in which the two ends of the second coupling 1-212 are connected to the gear box 1-112 and the electric generator 1-211 may be similar to that used for the first coupling 1-113 of FIG. 1 for connecting the output end of the gas turbine 1-111 and the gear box 1-112. Under such a configuration, the rotational power from the gas turbine when in operation can be transmitted from the first casing 1-110 to the second casing 1-210 through the second coupling 1-212, so as to realize electricity generation by the electric generator 1-211.

The rear of the semi-trailer and the rear of the vehicle body above may be further connected by one or more coupled flanges, so as to keep the relative position and orientation of the vehicle body and the semi-trailer sufficiently fixed and stable.

The end faces of the first air inlet passage 1-114 and the second air inlet passage 1-213 may also be aligned when the vehicle body and demi-trailer are coupled for electricity generation. For example, the air inlet passage 1-114 for the gas turbine and the air inlet passage 1-213 for the electric generator may be close and may butt up against each other at these ends and they may be provided with connection mechanisms for connecting these ends. For example, the connection mechanisms may utilize connection flanges. The connection between the first intake passage 1-114 and the second intake passage 1-213 may help further stabilize the position and orientation between the vehicle body and the semi-trailer.

This implementations of the gas turbine system and the electric generator system may be provided according to an example method, including the steps of:

- S1: Reverse the vehicle body and semi-trailer to align the rear of the vehicle body and the rear of the semi-trailer, and connect the vehicle body and the semi-trailer, for example, through the flanges described above;
- S2: Connect the first intake passage 1-114 and the second intake passage 1-213, for example through using flanges described above;
- S3: Place the volute described above into the first casing or housing 1-110 at the disassembly opening or port and fix or attach it on the first platform 1-100;
- S4: Connect the gas turbine 1-111 and the generator 1-211.

The step S4 may specifically include the following steps:

- S4-1: Connect the gearbox 1-112 and the gas turbine 1-111 through the first coupling 1-113, wherein the first coupling 1-113 passes through the cavity formed around the first exhaust passage 1-115, as described above;
- S4-2: connect the gearbox 1-112 and the generator 1-211 through the second coupling 1-212;
- S4-3: Connect the second intake passage 1-213 and the first intake passage 1-114.

Through the above assembly or installation steps, the relative position and orientation of the generator 1-211 and the gas turbine 1-111 can be determined through the connection between the vehicle body and the semi-trailer and the connection between the first air intake passage 1-114 and the second air intake passage 1-213 before the power output connection. The process above to fix and connect the various components results in stable relative position and orientation of these components, so that when the second coupling 1-212 is connected between the gear box 1-112 and the electric generator 1-211, the alignment accuracy during connection can be effectively improved or maintained, and the probability and extent of equipment wear may be reduced.

The implementations above in relation to FIGS. 1-3 provides a flexible configuration of mobile units containing turbine power source and electric generator that can be flexibly combined and installed. As such, the turbine power source may be used and alternatively configured to power other components at a well site rather than being dedicated to the electric generator.

In some other example implementations, rather than separating the gas turbine system and the electric power generation system into two separate mobile platform (or vehicles) and connecting them prior to operation, the two systems may be disposed on one integral mobile platform. By arranging the gas turbine and the electric generator in the same vehicle or mobile platform, the relative positions of the gas turbine and the generator may be fixed via common platform and/or casing and a simple and stable connection/coupling therebetween. Replacement and installation procedures are simplified. The combined system can be mobile and thus can be conveniently moved from well site to well site or from one location of a well site to another location on a same transportation platform. Such implementations may be suitable to some well sites depending on their operating characteristics.

Figures 5, 6:
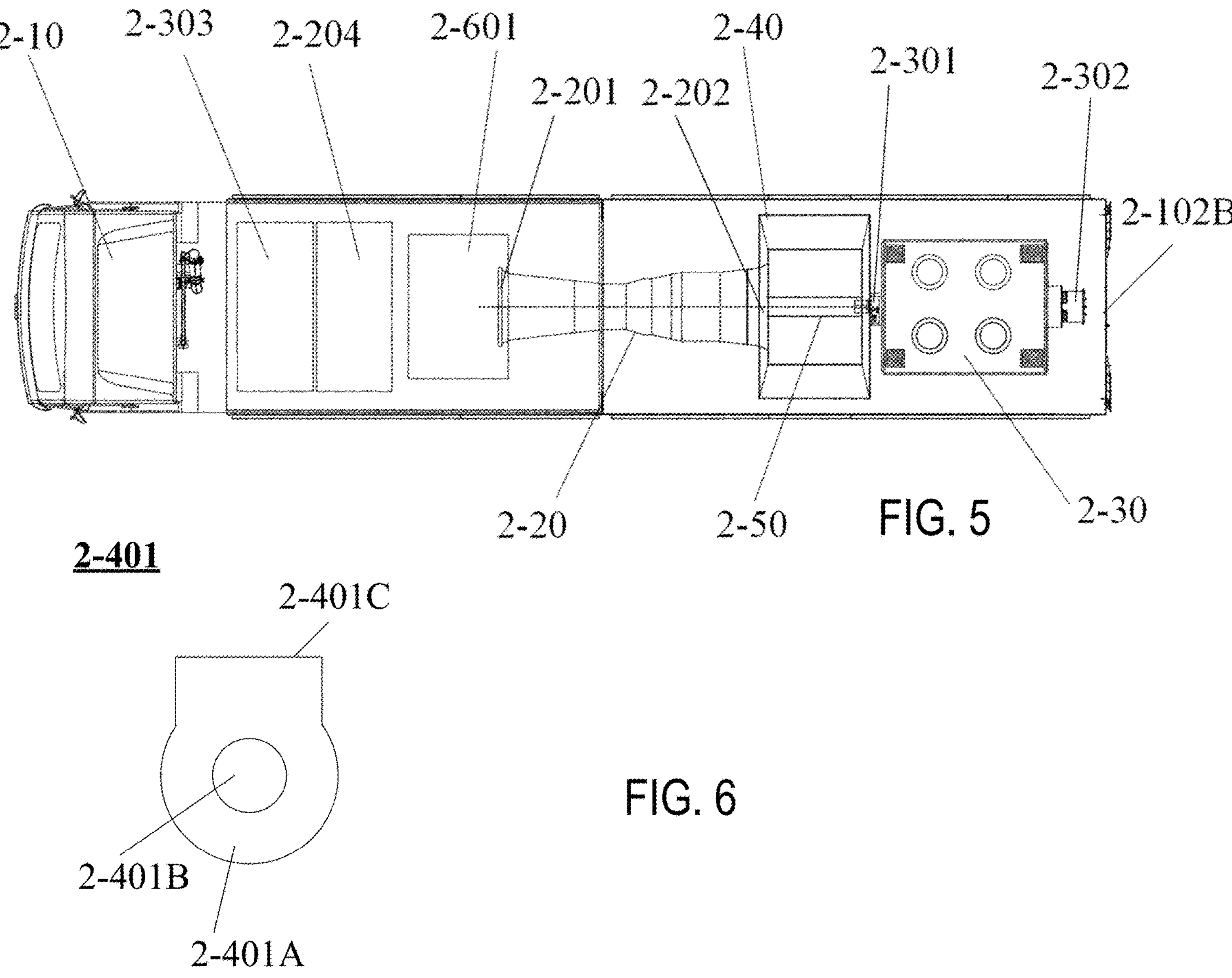
FIG. 5 shows a side view of the example mobile electric power generation system of FIG. 4 as provided according to an embodiment of the present disclosure.
FIG. 6 shows a schematic structural diagram of a volute exhaust structure in a power generation system based on gas turbine as provided according to an embodiment of the present disclosure.

For example, FIG. 4 shows a side view of such a power generation system with the gas turbine and electric generator arranged on a same mobile platform, whereas FIG. 5 shows a top view of the power generation system. Throughout disclosure, differentiation is not made between the term “system”, “device”, “equipment”, and “apparatus”. Unless otherwise specified, these terms are used interchangeably. As shown in FIG. 4 and FIG. 5, the power generation system may include a first vehicle 2-10, a gas turbine 2-20, a generator 2-30 and other devices/components. For example, the first vehicle 2-10 may include a first platform 2-101. A first casing 2-102 (alternatively referred to as a first housing 2-102) may be disposed on the first platform 2-101, and the gas turbine 2-20 may be disposed in the first casing 2-102 and may include a first input end 2-201 and a first output end 2-202. For example, the first input end 2-201 may include a fluid (e.g., combustion air) input end, and the first output end 2-202 may include a power output end for outputting rotational mechanical power.

For example, the generator 2-30 may be arranged in the first casing 2-102 and may also include a second input end 2-301 and a second output end 2-302. For example, the second input end 2-301 may be a power input end, and the second output end 2-302 may include an electric power output end for outputting electrical power. In some example implementations, the first output terminal 2-202 of the gas turbine 2-20 may be connected to the second input terminal 2-301 of the electric generator 2-30, so that the electric generator 2-30 can obtain the power output (e.g., rotational power) by the gas turbine 2-20 and convert the power into electrical output.

In the example embodiments shown in FIG. 4 and FIG. 5, the gas turbine and the generator are arranged in the same transportation means or vehicle, so that the gas turbine and the generator can be moved as a whole by a same transportation means to a location where power generation is needed. As such it becomes simple and convenient to use such a system as an integrated but mobile power generation system.

In some example implementations, the first means of transportation 2-10 may adopt at least one mobile platform including but not limited to a semi-trailer, a trailer, a truck, a skid, and a barge.

In addition, in the example embodiments of the present disclosure, by arranging the gas turbine and the generator in the same vehicle 2-10, the relative positions of the gas turbine and the electric generator can be fixable, so that the gas turbine and the electric generator can be stably connected through a simplified connection (e.g., simplified power connection), thereby avoiding repeated disassembly and installation.

In some example implementations, as shown in FIG. 4 and FIG. 5, the first output end 2-202 and the second input end 2-301 may be connected through a coupling 2-50 without using a mechanical device such as a gearbox for connection, which can simplify the Connection structure of the gas turbine and generator. In some other examples, the two ends of the coupling 2-50 may be detachably connected to the first output end 2-202 of the gas turbine 2-20 and the second input end 2-301 of the generator 2-30 through bolts or splines, respectively.

In some example implementations, as shown in FIGS. 4 and 5, the power generating system/device may further include an exhaust passage 2-40 disposed within the first casing 2-102 between the gas turbine 2-20 and the generator 2-30. For example, the gas turbine 2-20 may further include an exhaust end 2-203. The exhaust passage 2-40 may be connected with the exhaust end 2-203, for example, via flanges, for releasing exhaust gas of the gas turbine 2-20.

In some example implantations, as shown in FIG. 4, the exhaust passage 2-40 may include a volute exhaust structure 2-401 (portion shown by the dashed box). FIG. 6 shows a front view of an example volute exhaust structure 2-401. As shown by FIGS. 4, 5, and 6, the volute exhaust structure 2-401 may include an annular casing 2-401A. The annular casing 2-401A may include a central passage 2-401B and a first exhaust opening 2-401C. The coupling 2-50 may be arranged to pass through the central passage 2-401B to connect the gas turbine 2-20 to the electric generator 2-30. The first output end 2-202 of the gas turbine may be connected to the second input end 2-301 of the electric generator 2-30. Under such a configuration, the annular casing 2-401A would surround the coupling 2-50.

As a result, the volute exhaust structure 2-401 may form a channel for the coupling 2-50 to pass, and the volute exhaust structure 2-401 can assist in guiding and releasing the exhaust of the gas turbine 2-20 and at the same time facilitate the driving power connection between the gas turbine 2-20 and the electric generator 2-30. The overall connection-configuration of the gas turbine 2-20 and the electric generator 2-30 is thus compactly arranged. The overall space occupied by the gas turbine 2-20, the exhaust passage 2-40, and the generator 2-30 may be reduced. A single casing may be used for easier transportation.

In some example implementations, the volute exhaust structure 2-401 may be connected to the first casing or housing 2-102 by means including but not limited to bolts. The first exhaust opening 2-401C of the volute exhaust structure 2-401 may be configured to face away from the first platform 2-101. For example, the volute exhaust structure 2-401C may face upward, as shown in the example of FIGS. 4 and 6. Such arrangement may facilitate a release of the exhaust gas discharged from the gas turbine 2-20 to a location further away from the power generation system and help prevent the exhaust gas from immediate circulation back to the power generation system and from inadvertently affecting the operating environment around the first vehicle 2-10.

In some example implementations, as shown in FIGS. 4 and 5, the volute exhaust structure 2-401 and the generator 2-30 may be spaced apart, thereby preventing the exhaust heat in the volute exhaust structure 2-401 from affecting the operation of the electric generator 2-30 and causing adverse effects.

In some example implementations, as shown in FIG. 4, the exhaust passage 2-40 may further include an extended exhaust structure 2-402. The extended exhaust structure 2-402 may include opposite second exhaust openings 2-402A and third exhaust openings 2-402B. The second exhaust opening 2-402A may communicate with the first exhaust opening 2-401C. For example, the opening size of the second exhaust opening 2-402A and the first exhaust opening 2-401C may be substantially the same, thereby facilitating the connection of the second exhaust opening 2-402A and the first exhaust opening 2-401C. The opening size of the third exhaust opening 2-402B may be larger than that of the second exhaust opening 2-402A. For example, the third exhaust opening 2-402B may flush with the upper surface of the first casing or housing 2-102.

In some example implementations, as shown in FIG. 4, the exhaust passage 2-40 may further include an auxiliary exhaust structure 2-403 having a fourth exhaust opening 2-403A. The first housing 2-102 may be configured with opening 102A for installation of the exhaust passage. The auxiliary exhaust structure 2-403 may be detachably connected with the extended exhaust structure 2-402 through the installation opening 2-102A of the exhaust passage. For example, the fourth exhaust opening 2-403A may communicate with the third exhaust opening 2-402B, and the fourth exhaust opening 2-403A and the third exhaust opening 2-402B may have substantially the same opening size, thereby facilitating a passage from the fourth exhaust opening 2-403A to the third exhaust opening 2-402B. For example, the opening size of the exhaust passage installation opening 2-102A may be slightly larger than the opening size of the fourth exhaust opening 2-403A, so as to facilitate the installation and removal of the auxiliary exhaust structure 2-403.

In the example embodiments of the present disclosure above, the extended exhaust structure 2-402 may facilitate the connection between different passage sizes or diameters. By designing the opening size of the third exhaust opening 2-402B to be larger than the opening size of the second exhaust opening 2-402A, the entire exhaust passage 2-40 is enlarged towards the exhaust exit. The size of the exhaust discharge opening is thus increased. As a result, the gas flow rate discharged from the exhaust passage 2-40 per unit time maybe increased, so that excessive pressure and excessive accumulation of heat from a large amount of exhaust gas in the exhaust passage 2-40 can be reduced.

In some example implementations, the extended exhaust structure 2-402 may be configured in the shape of a cone or frustum cone. The auxiliary exhaust structure 2-403 may be configured, for example, in a cylindrical structure. The auxiliary exhaust structure 2-403 and the extended exhaust structure 2-402 may be connected via flanges or bolts. For example, a structure such as a sealing ring may also be provided between the auxiliary exhaust structure 2-403 and the extended exhaust structure 2-402, so that the auxiliary exhaust structure 2-403 and the extended exhaust structure 2-402 are sealedly connected.

In some example implementations, the auxiliary exhaust structure 2-403 may be configured to guide the gas exhausted from the gas turbine 2-20 to a location away from the power generation system, so as to avoid affecting the operational environment around the first vehicle 2-10.

In some example implementations, various parts of the exhaust passage 2-40, such as the volute exhaust structure 2-401, the extended exhaust structure 2-402, and the auxiliary exhaust structure 2-403, may be fabricated from materials with high temperature resistance and thermal conductivity, such as metal materials including but not limited to copper, aluminum, or alloy materials thereof.

In some example implementations, as shown in FIGS. 4 and 5, the power generation equipment above may further include an intake passage 2-60. The intake passage 2-60 may be disposed at least on a side of the gas turbine 2-20 away from the portion of the first platform 2-101 where the gas turbine engine resides. One or more intake pipelines 2-601 may communicate with the first input end 2-201 of the gas-turbine 2-20 to provide combustion air for the gas turbine 2-20.

In some example implementations, the intake passage 2-60 may extend from an end of the first housing 2-102 away from the generator 2-30, such as extending above the gas turbine 2-20, thereby forming a longer intake passage 2-60 for supplying combustion air to the gas turbine 2-20. The one or more intake pipelines 2-601 may respectively connected to the intake passage 2-60 and the first input end 2-201 of the gas turbine 2-20 in a sealed manner. For example, the intake pipelines 2-601 can be arc-shaped to guide the flow of combustion air and reduce pressure loss.

In some example implementations, the intake passage 2-60 may also be provided with an intake filter and muffler device and a ventilation filter and muffler device (not shown in the figure). When the combustion air gas is being provided, the noise at the position of the gas inlet of the gas turbine 2-20 may be reduced to avoid pollution to the environment. The ventilation filter muffler may be used for filtering ambient air, providing filtered air for ventilation and cooling for the gas turbine 2-20, and for performing noise reduction in the intake passage 2-60 to reduce environmental pollution.

In some example implementations, as shown in FIGS. 4 and 5, the power generating system above may further include a generator control device configured to communicate with the generator 2-30, by, for example, wired or wireless communications to monitor and control the operation of the generator 2-30. In some example implementations, the power generation equipment may further include a gas turbine control device 2-204 configured to communicate with the gas turbine 2-20 in a wired or wireless manner, for monitoring and controlling the operation of the gas turbine 2-20. As a result, automation can be achieved and the safety of the operation of the gas turbine and the electric generator can be improved.

In some example, implementations, as shown in FIG. 4, the side of the first casing 2-102 may include a plurality of doors. One example door 2-102C is shown in FIG. 4 The plurality of doors may correspond to different parts of the system, e.g., the gas turbine 2-20, different parts of the passage 2-40 and the generator 2-30, thereby facilitating an inspection and maintenance of the gas turbine 2-20, the exhaust passage 2-40, and the different parts of the generator 2-30 through the multiple doors.

In some example implementations, as shown in FIGS. 4 and 5, the central axes of the gas turbine 2-20 and the generator 2-30 may be disposed along the length of the first vehicle. The second output end 2-302 of the electric generator 2-30 may be configured to face the rear of the first vehicle. The rear of the first casing or housing 2-102 may be provided with a connection opening or door 2-102B, so as to provide electrical connection to the second output end 2-302 of the generator 2-30 by other devices/circuits/system to provide electrical energy thereto.

Figure 7:
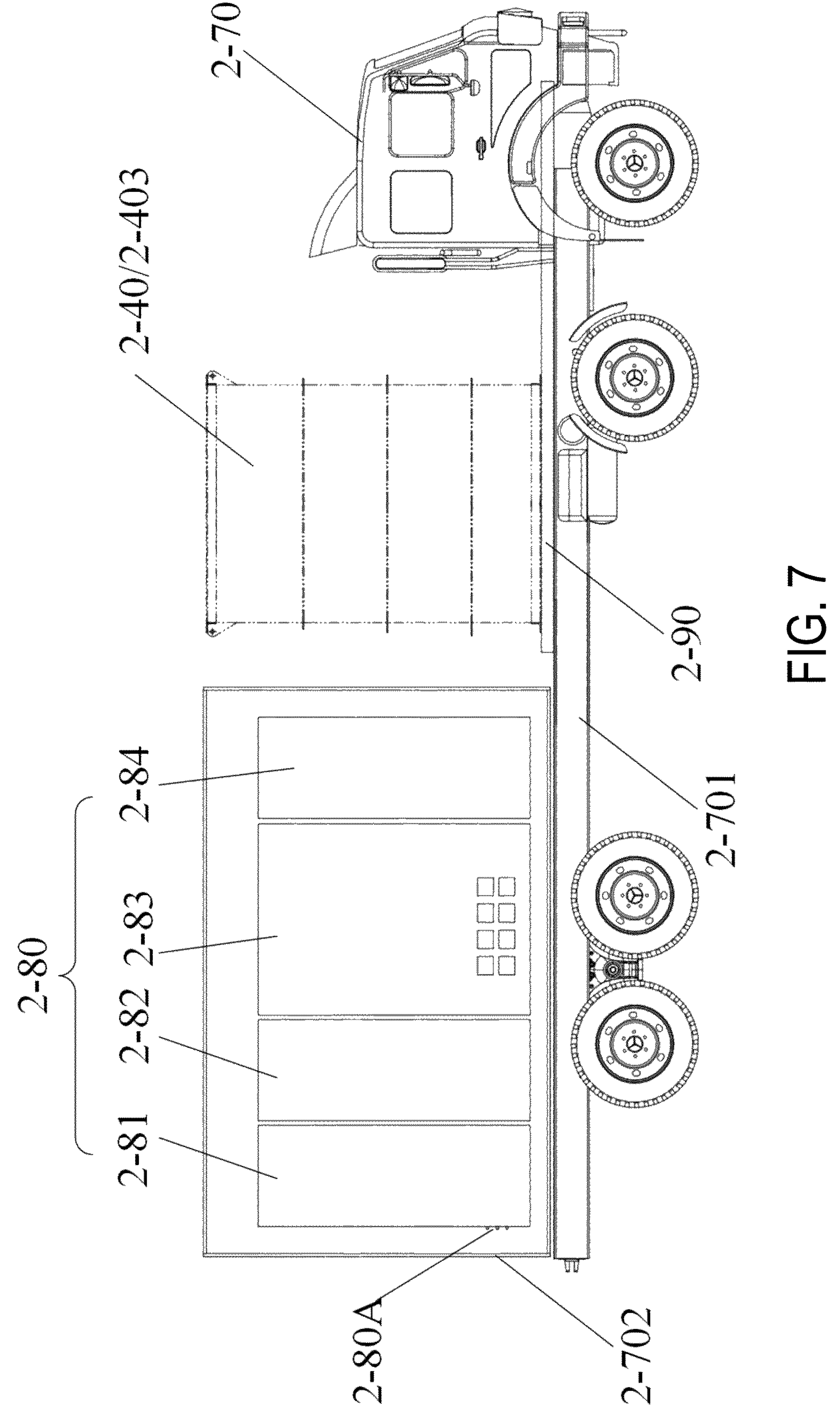
FIG. 7 shows a side view of an example power distribution system as provided according to an embodiment of the present disclosure.
Figure 8:
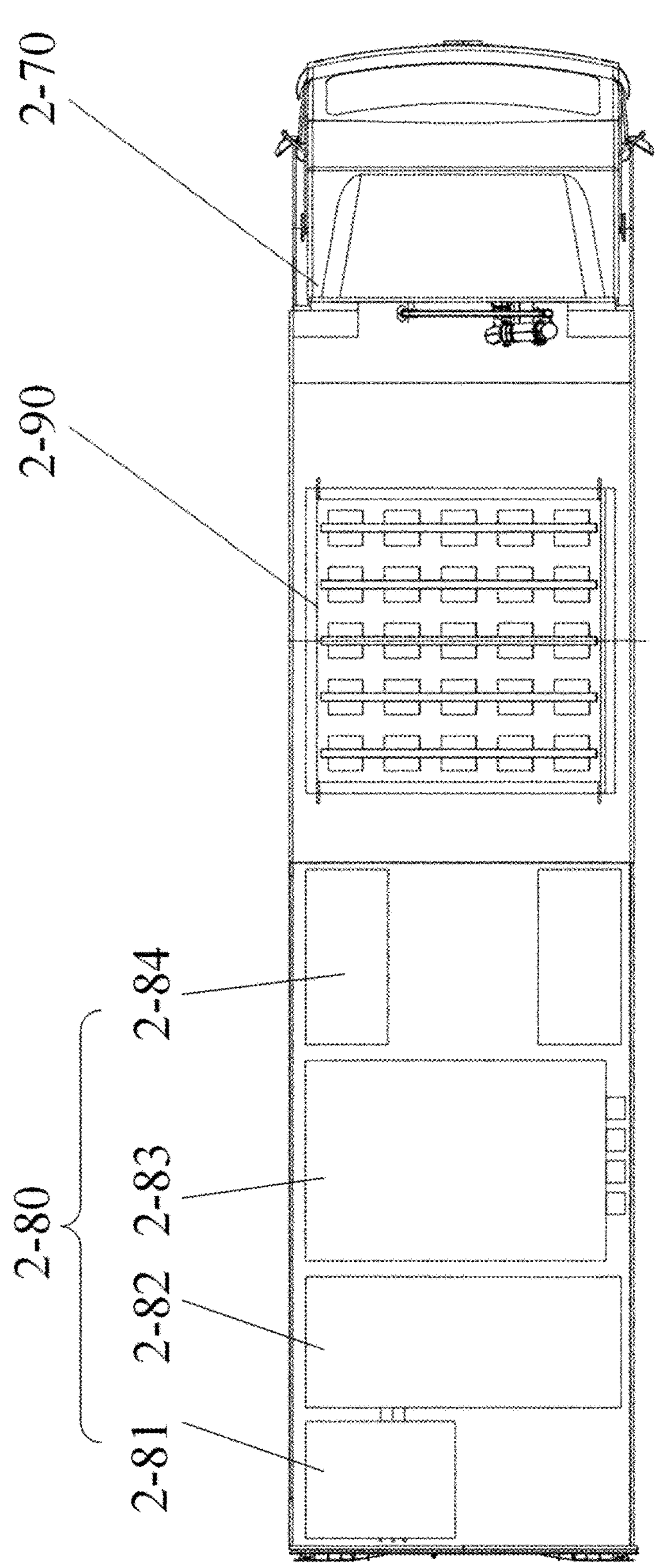
FIG. 8 shows a top view of the example power distribution system of FIG. 7 provided according to an embodiment of the present disclosure.
Figure 9:
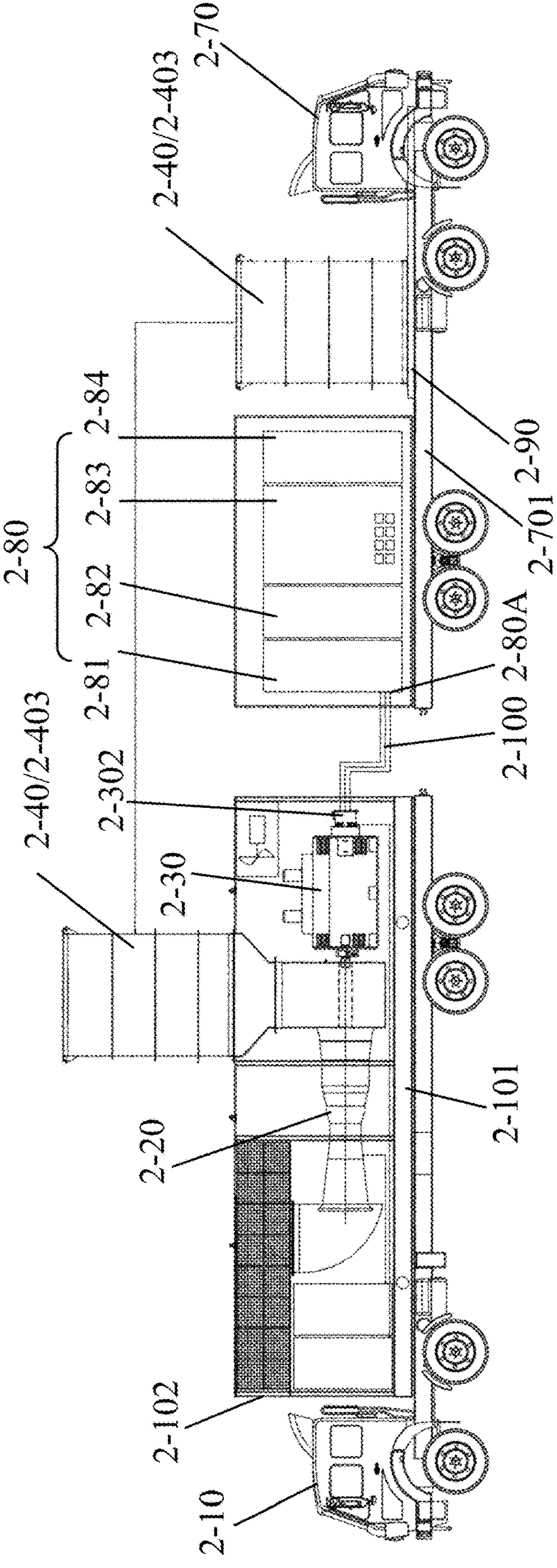
FIG. 9 shows a side view of an example power system as provided according to an embodiment of the present disclosure.
Figure 10:
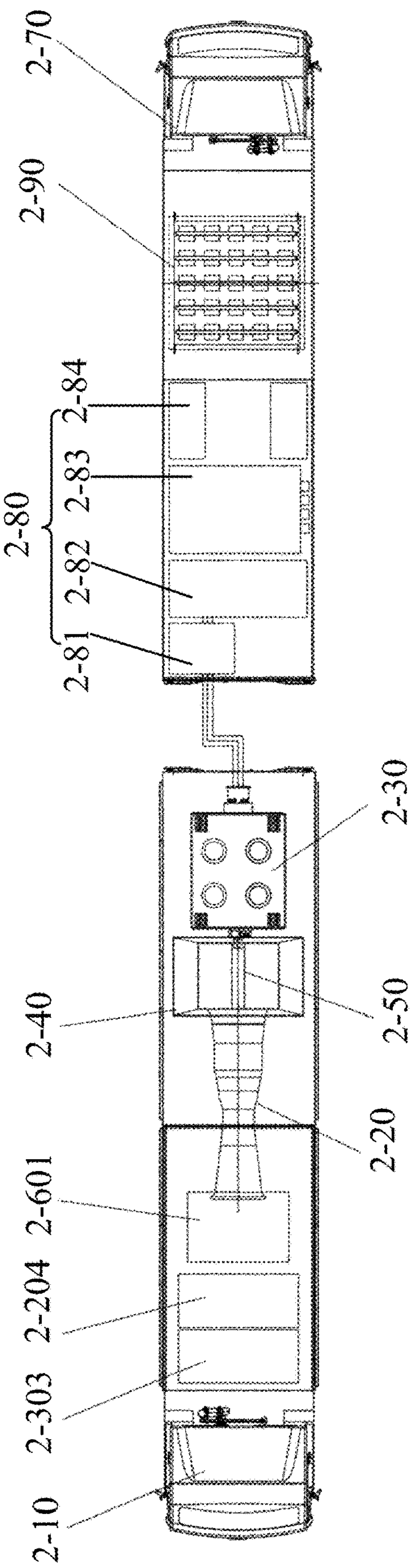
FIG. 10 shows a top view of the power system of FIG. 9 as provided according to an embodiment of the present disclosure.

The power generation systems above may be configured to couple to a power distribution system or equipment. For example, FIG. 7 shows a side view of an example power distribution equipment, whereas FIG. 8 shows a top view of the power distribution equipment. The power distribution equipment or system may be mobile, e.g., be disposed on a vehicle. FIGS. 9 and 10 show a side view a top view of an example power system including the power distribution equipment and the power generation system described above. As shown in FIG. 7 and FIG. 8, the example power distribution system may include a second vehicle 2-70 (alternatively referred to as a second means of transportation 2-70) and a power distribution device 2-80. The second vehicle 2-70 may include a second platform 2-70. A second casing or housing 2-702 may be provided on the second platform 2-701, As further shown in FIG. 9 and FIG. 10, the power distribution device 2-80 may be disposed in the second casing or housing 2-702, and may include a third input 2-80A configured to be electrically connected to the second output 2-302 of the electric generator 2-30 described above, via, for example, a conductive cable 2-100 to obtain electrical energy from the generator 2-30.

In some example implementations, as shown in FIGS. 7 and 8, the power distribution device 2-80 may include a frequency converter 2-81, a transformer 2-82, a power distribution cabinet 2-83, a monitoring and control device 2-84, and the like. As such, the power distribution device 2-80 may be configured to regulate the power generation, the frequency, the voltage, and the like of the output power from the generator 2-30. The power distribution device 2-80 thus may be used to convert any non-standard electrical output by the generator 2-30 into the standard electrical supply system required by the downstream load of the power system. For example, the monitoring and control device 2-84 may be configured to communicate with the frequency converter 2-81, the transformer 2-82, and the power distribution cabinet 2-83, for example, in a wired or wireless manner, so as to monitor and control the frequency converter 2-81, the transformer 2-82, and the power distribution cabinet individually or collectively. The operation of the output frequency inverter 81, the transformer 2-82, and the power distribution cabinet 2-83 may be monitored by the monitoring and control device 2-84. For example, the monitoring and control device 84 may be configured to adjust the output frequency of the inverter 2-81, the output voltage of the transformer 2-82, and the power-distribution mode of the power distribution-cabinet 2-83, and the like. In some example implementations, the second means of transport 2-70 (the second vehicle) may also be implemented as at least a vehicle including but not limited to one of a semi-trailer, a trailer, a truck, a skid, a barge, and the like.

In some example implementations, as shown in FIGS. 7 and 8, the second platform 2-701 may be further provided with an exhaust passage carrying area 2-90 configured to place or dispose at least part of the exhaust passage 2-40. The exhaust passage 2-40 may be implemented as or may include the example auxiliary exhaust structure 2-403 described above. For example, the exhaust passage carrying area 2-90 may include a groove matching a shape of the auxiliary exhaust structure 2-403, whereby the auxiliary exhaust structure 2-403 may be stably arranged on the exhaust passage carrying area 2-90 by being snapped-fit into the groove. As such, after the auxiliary exhaust structure 2-403 is disassembled from the extended exhaust structure 2-40 described above, it can be placed in the exhaust passage carrying area 2-90 of the second platform 2-701. The auxiliary exhaust structure 2-403 may thus be transported by the second transportation means 2-70.

In some example implementations, before using the above-described power system, the auxiliary exhaust structure 2-403 may be disposed in the exhaust passage carrying area 2-90 of the second transportation means 2-70 to be transported by the second transportation means 2-70. When using the above-mentioned power distribution system on the vehicle 2-70 of FIGS. 7-9 with the power generation system, firstly, the first vehicle 2-10 may be parked at a desired position with the rear of the vehicle facing the power distribution device 2-80 of the power distribution system, and at the same time, the second vehicle 2-70 may be parked at a suitable position with the rear of the vehicle facing the power generation system. Then, the rears of the first vehicle 2-10 and the second vehicle 2-70 may be connected by means of flange coupling, so as to maintain a table relative position and orientation of the first vehicle 2-10 and the second vehicle 2-70 stable.

Thereafter, the auxiliary exhaust structure 2-403 disposed in the exhaust passage carrying area 2-90 may be unloaded and installed on the extended exhaust structure 2-402 on the first transportation means 2-10 for integration with the exhaust passage of the gas turbine. For example, the auxiliary exhaust structure 2-403 may be moved to the roof of the first vehicle 2-10 for connection and installation with the extended exhaust structure 2-402. In some example implementations, a hoisting device may be integrated on the second transportation means 2-70 for moving the extended exhaust structure 2-402, so as to improve on-site deployment efficiency. Thereafter, cable 2-100 may be used to connect the third input end 2-80A of the power distribution device 2-80 and the second output end 2-302 of the electric generator 2-30, so that the power output from the generator 2-30 can be distributed by the power distribution device 2-80.

In some example implementations, the power generation system and the power distribution system may also be connected and used in other ways than the above-mentioned example embodiments which are not specifically limited in the embodiments of the present disclosure.

In the example implementations depicted in FIGS. 1-8 above, rotational power is generated by the gas turbine system. The output of the gas turbine may be use to drive the electric generator directly. The electric generator may be integrally installed and connected with the output of the gas turbine, as shown by FIGS. 7-8. Alternatively, the electric generator may be carried by a separately vehicle and may then be assembled and coupled to the gas turbine for electric power generation, as shown in the implementations depicted in FIGS. 1-3.

In some other implementations, the turbine or turbine engine above may be used to drive a pump, such as a plunger pump for, e.g., generating high pressure fracturing liquid for fracturing operation at a well head. The turbine, the pump, and other component of such fracturing system may be carried on, for example, a semitrailer, a truck, a tractor, or the like.

Figure 34:
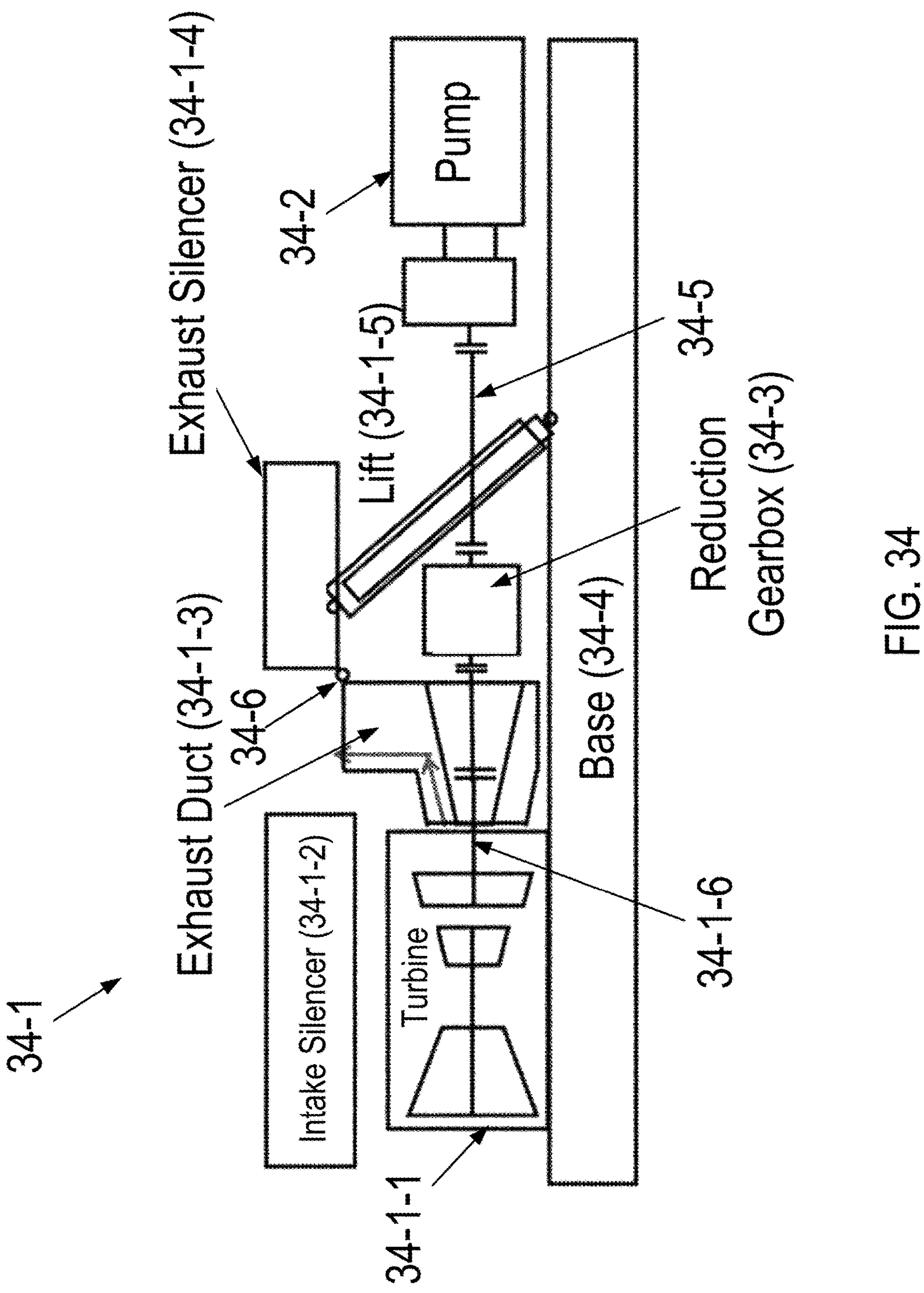
FIGS. 34 and 35 illustrate an example pumping system driven by a turbine engine with an exhaust silencer having controllable positions during an operational state and an idle state.
Figure 35:
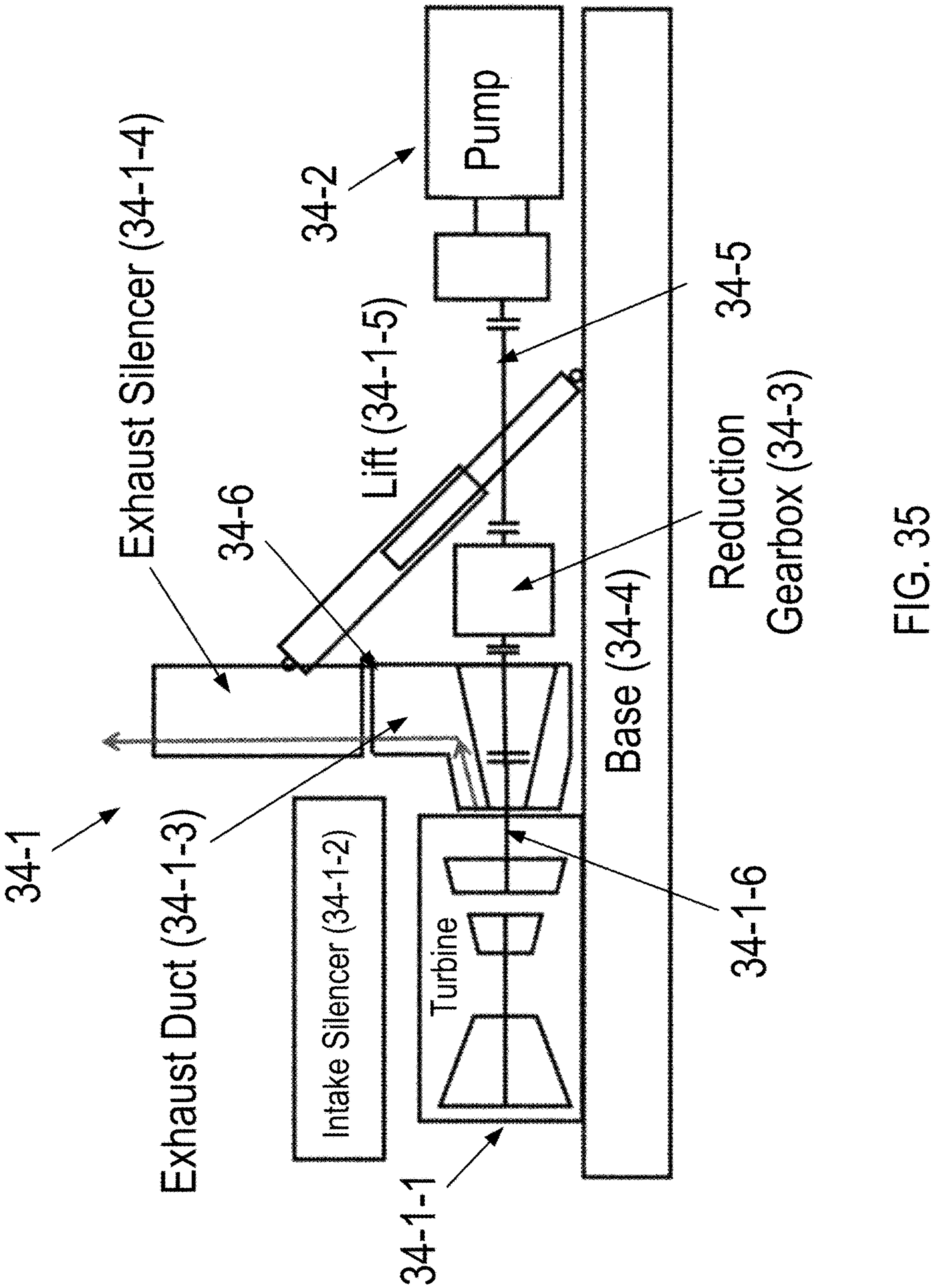

FIGS. 34 and 35 show an example implementation. The system of FIG. 34 includes a turbine engine subsystem 34-1 for driving a pump (e.g., a plunger pump) 34-2 via a reduction gearbox (34-3). The turbine subsystem comprises a turbine engine 34-1-1, an air intake subsystem including an intake silencer 34-1-2, and an exhaust subsystem. The exhaust subsystem, for example, includes an exhaust duct 34-1-3, an exhaust silencer 34-1-4, and a lift device 34-1-5. The system of FIG. 34 also include base 34-4 for carrying the other components above In the example of FIG. 34, the driving output of the turbine engine 24-1-1 is from its exhaust end, also referred to as its hot end. In other words, the driving output is on the same side of the exhaust subsystem. The driving rotational axis, shown as 34-1-6 pass through the exhaust duct 34-1-3 and connects to the gearbox 34-3, which is connected to and drive the plunger pump 34-2 by rotational axis 34-5.

The exhaust duct 34-1-3 is connected to the exhaust end of the turbine engine 34-1-1 and then turns upward to guide the high-temperature exhaust of the turbine engine upward. In the example implementations of FIGS. 34 and 35, the exhaust silencer 34-1-4 may be designed with extended dimensions to further guide the hot exhaust from the turbine engine away from the system (so that the exhaust has less chance of entering the air intake system of the turbine engine). The exhaust silencer 34-1-4 may be rotatably coupled to an upper end of the exhaust duct 34-1-3 such that its flow path can be positioned horizontally and not in flow connection with the upper end of the exhaust duct 34-1-3 when the turbine engine is not in operation, or when the system of FIG. 34 is being transported and it is advantageous to place the exhaust silencer 34-1-4 horizontally to lower the overall clearance height of the system in transit. The rotation of the exhaust silencer relative to a coupling rotational axis 34-6 between the exhaust duct 34-1-3 and the exhaust silencer 34-1-4 may be controllably driven by a lift 34-1-5 (or a turnover mechanism, referred to as a lift hereinafter 34-1-5).

The lift 24-1-5, for example, may be hydraulically driven (by hydraulic oil, fluid, or gaseous substances), or may be electrically driven. It may include an extendable and contractible arm assembly in a telescopic geometry. One end of the lift 34-1-5, for example, may be fixedly connected on the base 34-4. Another end of the lift 34-1-5 may be connected to one of more anchor points on the exhaust silencer 34-1-4 in order to operably for the lift to retract to place the exhaust silencer 34-1-4 in the horizontal position and in an operational position shown in FIG. 35. In the operation position, for example, the lift extends to rotate the exhaust silencer 34-1-4 upright such that it is coupled to the upper output end of the Exhaust duct 34-1-3, e.g., conformably, to guide the high temperature exhaust of the turbine engine upward through the exhaust silencer 34-1-4, as shown in FIG. 35.

The operational position of the exhaust silencer, however, need not be completely vertical. It can have some none-zero angle with the vertical axis as long as its lower end is connected with upper end of the exhaust duct 34-1-3 for guiding the exhaust flow upward.

In some example implementations, the control of driving the lift 34-1-5 to switch the idle and the operational positions for the exhaust silencer 34-1-4 may be automated. For example, when the turbine engine starts up, a controller of the system may automatically provide a control signal to drive the lift 34-1-5 to turn the exhaust silencer 34-1-4 upward to its operational position. A positional sensor may be installed with the exhaust silencer 34-1-4 or elsewhere to detect the position of the exhaust silencer 34-1-4. Once the sensor detects that the exhaust silencer 34-1-4 reaches is operational position, a signal is then automatically generated by the controller to stop the driving of the lift 34-1-5 and the rotation of the exhaust silencer 34-1-4. Likewise, when the system is to go into idle or into transmit state, the controller may send an automatic instruction to drive the lift 34-1-5 to rotate the exhaust silencer-34-1-4-lower towards its idle position. Again, the sensor may detect the position of the exhaust silencer 34-1-4. Once it detects that the exhaust silencer 34-1-4 has reached its idle position, another signal is generated by the controller to stop the driving of the list 34-1-5 and the rotation of the exhaust silencer 34-1-4.

The implementation of FIG. 34-35 allows for positioning the exhaust silencer in an idle or transit position and an operational position without external positional equipment such as a crane. The extended exhaust silencer can be included together with the exhaust subsystem for the turbine engine and need not be carried separately. In addition, the extended version of the exhaust sliencer can be used in operation such that the exhaust gas can be guided away from the system above the air intake subsystem.

Figure 36:
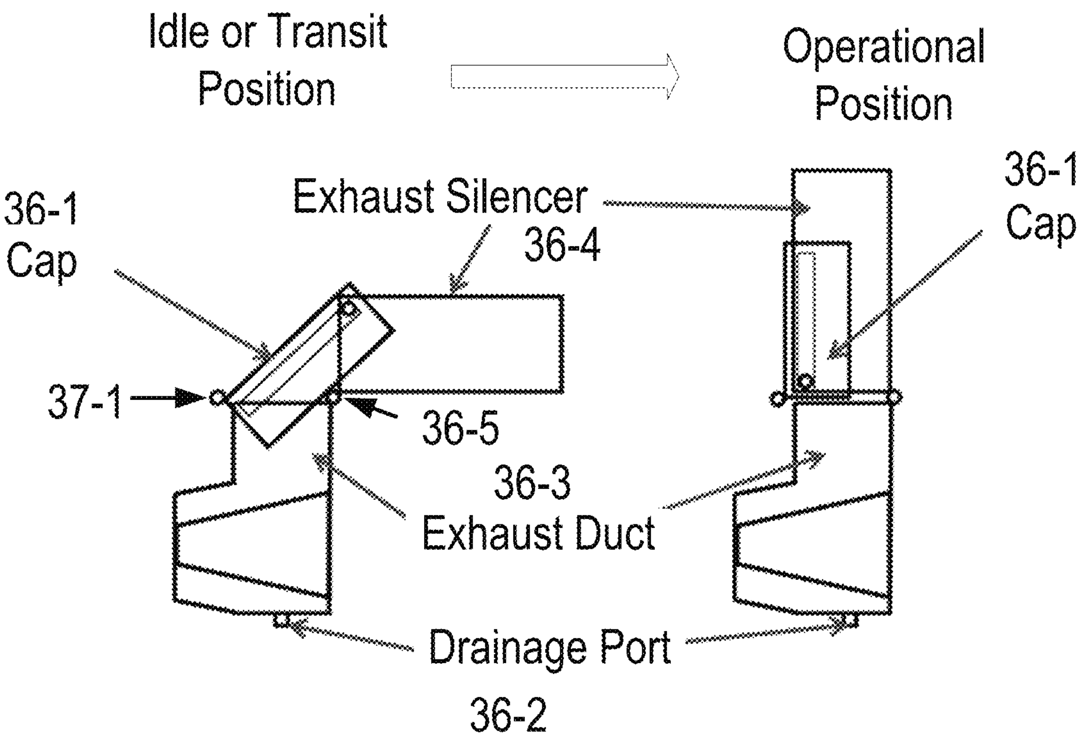
FIGS. 36-37 illustrates a mechanism for positioning a cap over the exhaust duct of FIGS. 34 and 35.
Figure 37:
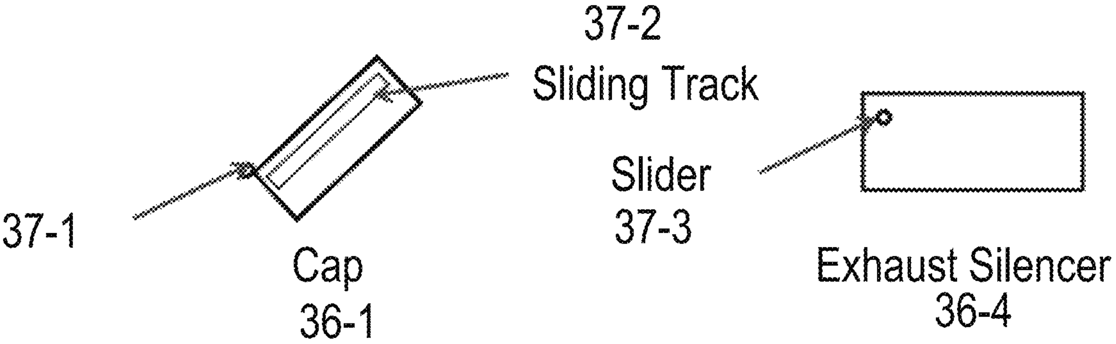

In some other example implementations, as shown in FIGS. 36 and 37, an additional component 36-1 serving as a cap for the exhaust duct 36-3 may be included. The cap 36-1, for example, may be configured to function as a rain cap when the exhaust silencer 36-4 is in its idle or transit position. The cap 36-1 may be configured such that it does not affect or minimally affect the exhaust path when the exhaust silencer 36-4 is in its operational position. For example, as shown in the example of FIGS. 36 and 37, the cap 36-1 may be connected to an end edge of the exhaust duct via a pivotal point 37-1. This pivotal point may be at an opposite location from another end edge of the exhaust duct 36-3 for pivotal connection 36-5 between the exhaust silencer 36-4 and the exhaust duct 36-3. The cap 36-1 may include a sliding track or guiding track 37-2 fixedly installed with the cap 36-1. A slider 37-3 may be fixedly included on the exhaust silencer 36-4, and may be configured to slide within the sliding track or guiding track 37-2 while the exhaust silencer 36-4 pivots between its idle or transit position and its operational position. The sliding track or guiding track 37-2 in its sliding path direction may be shaped to accommodate the moving path of the slider 37-3 within the sliding or guiding track 37-2 when the exhaust silencer 36-4 pivots between its idle or transit position and its operational position. The cap 36-1 may be shaped in a hood such that it covers the upper end cross section of the exhaust duct 36-3 when the exhaust silencer 36-4 is in its idle or transit position, and wrap around the exhaust silencer 36-4 when the exhaust silencer 36-4 is in its operational position. The mechanism described above for positioning the cap 36-1 between the idle or transit state and the operational state of the exhaust system is merely one example. Other mechanisms that achieve similar operational outcome may be alternatively implemented. The exhaust silencer 36-4 may be driven between its idle or transit position and its operational position using similar mechanism illustrated in FIGS. 34 and 35. Alternatively, the exhaust silencer 36-4 may be pulled between the idle or transit position and the operational position using an electric, hydraulic, or other driving mechanism within the sliding track 37-2 and the slider 37-2 (for driving the slider 37-3 in the sliding track 37-2). In that situation, the exhaust silencer 36-4 may be maintained in its idle or transit position via the pivotal connection 36-5 and by the driving mechanism holding the slider 37-3 in an end point of the sliding track 37-2.

As further shown in FIG. 36, in some example implementations, a drainage port 36-2 may be placed at a bottom of the exhaust duct 36-1 for draining any accumulation of water or other liquid (from, e.g., condensation in the exhaust).

While the description above with respect to FIGS. 34 and 35 uses the term "horizontal" with respect to the position of the exhaust silencer 34-1-4 when the turbine is not in operation or when the system is being transported (referred to as "idle position", the idle position need not be horizontal. In other words, the exhaust silencer may be at a slanted angel relative to the base of the system in its rest positions, as long as the overall height of the system due to the exhaust silencer is sufficiently low for, for example, transportation purposes.

The pump 34-2 of FIG. 34 is shown merely as an example. In some other example implementations and applications, such a pump may be replaced by an electric generator. In some other example implementations, like the ones described elsewhere in this disclosure, the pump 34-2 may be installed in a manner it is swappable with an electric generator. In some other implementations, the turbine may be used to drive some other types of loads. The gas turbine, and other loads may be configured to be switchable. As such, the gas turbine may be conveniently configured for multiple purposes and conveniently switch between different types of loads as needed. For example, such a switchable configuration may be used in an oil field or well site and the gas turbine system may be used to drive one or more hydraulic pumping systems (e.g., one or more plunger pumps) for hydraulic fracturing operation or may be used to drive one or more electric generator for electric power generation for various used at the oil field or well site. These loads for the gas turbine may be conveniently switchable, thereby providing a highly reconfiguration power generation and delivery platform in an oil field or well site.

For example, switching may be made between fracturing operation and electric power generation to balance the fracturing and electric demand of the well site and the fracturing operation. Such a load switchable systems or platforms, for example, may include a power generation system (e.g., a gas turbine), a power transmission device and a bearing base. The power-transmission device may be connected with the power device. The bearing base may be configured for carrying and fixing a load, e.g., a plunger pump or an electric generator, where the plunger pump and electric generator may be switchable. Such a switchable system may be configured to switch between a first operational state and a second operational state. Under the first operational state, the plunger pump may be installed and fixed on the bearing base and connected with or coupled to the power transmission device. In the first operational state, the switchable platform may function as a fracturing system. Under the second operational state, the electric generator rather than the plunger pump may be fixed and installed on the bearing base and connected with or coupled to the power transmission device. In the second operational state, the switchable platform may function as an electric power generation system for supply electricity of various type of uses at the oil filed or well site.

Thus, in the switchable power platform above, the power transmission device may be configured to be connectable with either the power input end of the plunger pump or the rotational power input of the electric generator. Such dual use platform may help reduce operational footprint in oil fields or well sites.

An example well site may include a manifold and a plurality of fracturing and electric power generation switchable systems describe above. The manifold may be configured to transport fracturing fluid to a wellhead of the well site. The plurality of switchable systems may be arranged at two sides of the manifold and may be connected with or coupled to the manifold. The at least one of the plurality of switchable systems may operate in the first state when connected to the manifold. In other words, each gas turbine in the plurality of switchable system may be configured to drive the one or more plunger pump for pumping fracturing fluid into the wellhead via the manifold.

In some example implementations of this present disclosure, a control method of the well site as described above may be provided. Such a control method may include: according to fracturing fluid displacement data output by each of the plurality of switchable systems in the first state, generating a fracturing fluid displacement information, wherein the fracturing fluid displacement information includes the fracturing fluid displacement data of each of the plurality of switchable system in the first state and a total fracturing fluid displacement value obtained by summing all of the displacement data at each of the switchable systems. The control method may further include obtaining a fracturing fluid displacement demand input, and, when the total fracturing fluid displacement value is greater than or equal to the fracturing fluid displacement demand, outputting or generating a standard-compliant information. Otherwise, the method may output a standard-non-compliant information. In response to the standard-compliant information, based on the fracturing fluid displacement information and the fracturing fluid displacement demand, selecting at least one switchable system from the plurality of switchable systems operating in the first state to generate a switching information, wherein the switching information includes the number of switchable systems selected to be switched from the first state to the second state; and when the number of the switchable apparatuses in the switching information is greater than a number of electric generators in demand, further selecting switchable apparatuses with a same number of the electric generators in demand in within the switchable systems within the switching information and generating a replacement information for specifying switchable systems to be actually switched from the first state to the second state.

The example implementations above of the switchable systems are described in further detail below with reference to the accompanying drawings in FIGS. II-19.

Figures 11, 12A, 12B:
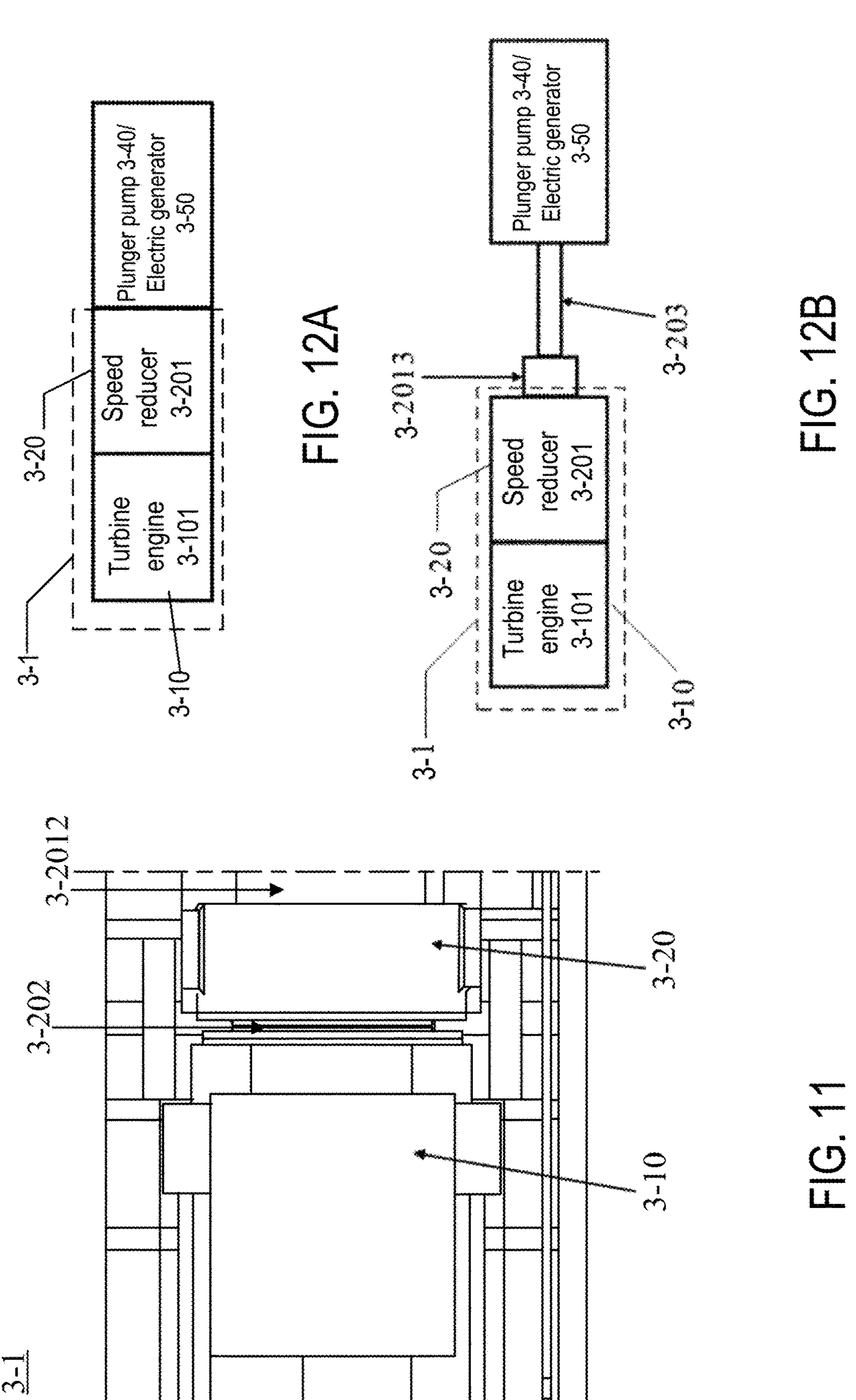
FIG. 11 shows a structural schematic diagram of an example fracturing and electric power generation switchable system as provided according to embodiment of the present disclosure.
FIG. 12A shows a schematic block diagram of an example fracturing and electric power generation switchable system as provided according to an embodiment of the present disclosure.
FIG. 12B shows a schematic block diagram of another example fracturing and electric power generation switchable system as provided according to an embodiment of the present disclosure.
Figures 13, 14A, 14B:
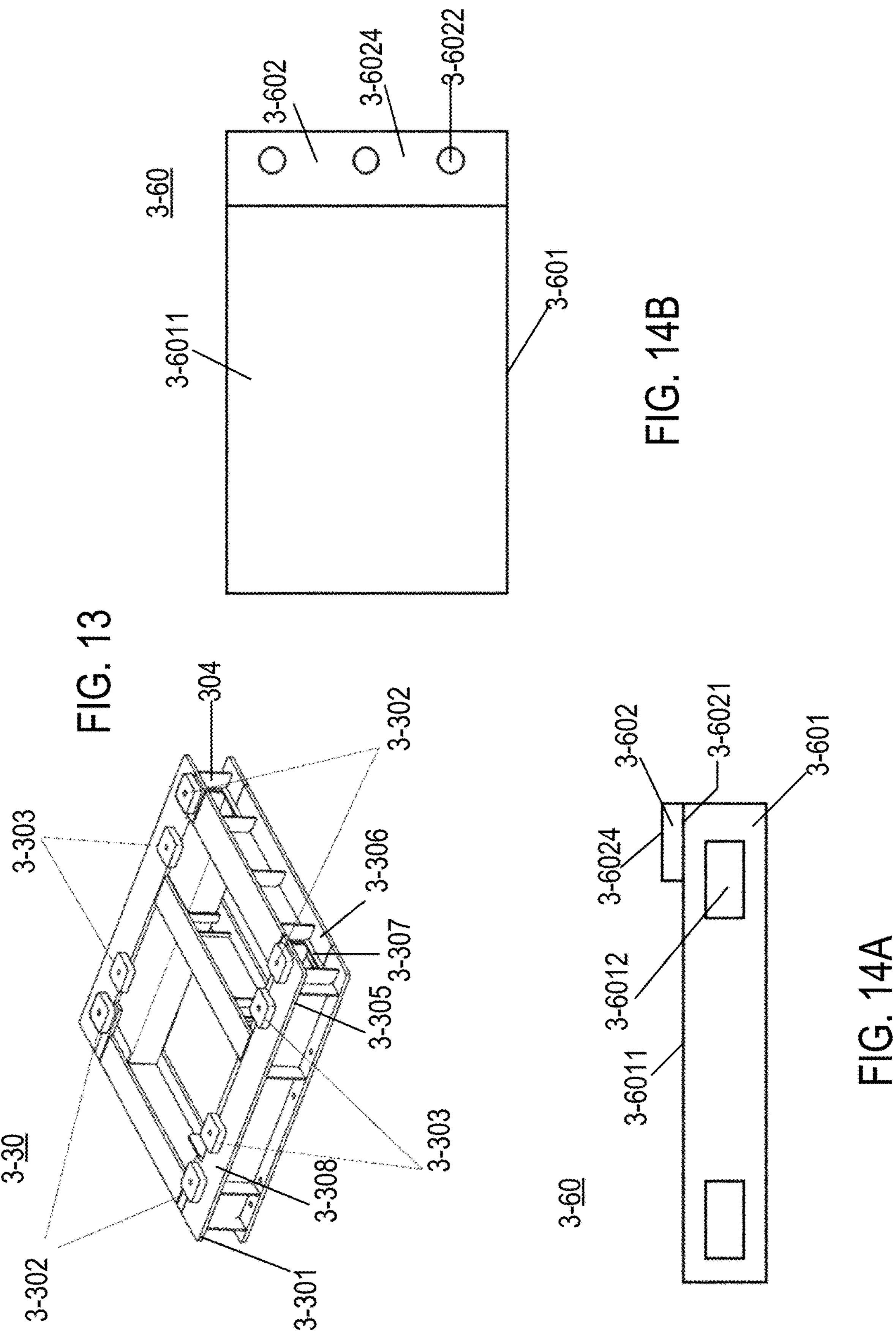
FIG. 13 shows a schematic block diagram of an example bearing base as provided according to an embodiment of the present disclosure.
FIG.14A shows-a schematic front view of an example first connection unit in an unfolded state as provided according to an embodiment of the present disclosure.
FIG. 14B shows a schematic top view of the example connection unit as shown in FIG. 14A.

FIG. 11 shows a structural schematic diagram of an example fracturing and power generation switchable system provided by at least one embodiment of the present disclosure. FIG. 12A illustrates a schematic block diagram of an example fracturing and power generation switchable system provided by at least one embodiment of the present disclosure. FIG. 12B shows a schematic block diagram of another example fracturing and power generation switchable system provided by at least still one embodiment of the present disclosure. FIG. 13 shows a schematic block diagram of a bearing base in accordance with at least one embodiment of the present disclosure.

In some example implementations, as shown in FIG. 11, FIG. 12A, and FIG. 12B, the fracturing and power generation switchable system 3-1 may include a power device 3-10 and a power transmission device 3-20. The power device 3-10 may be connected with or coupled to the power transmission device 3-20. The power device 3-10 transmits a driving power (e.g., rotational power) or driving force/torque produced by the power device 3-10 to the power transmission device 3-20. The power transmission device 3-20 may convert the driving power or force into an appropriate rotational speed range and transmit the driving power or force to a next-stage. For example, an output end of the power transmission device 3-20 may be connected with a plunger pump 3-40 or an electric generator 3-50, where the plunger pump 3-40 and the electric generator 3-50 are switchable.

In some example implementations, as shown in FIG. 13, the fracturing and power generation switchable systems 3-1 further may include a bearing base 3-30. The bearing base 3-30 may be configured for carrying and fixing the plunger pump-3-40 or the electric generator 3-50. For example, the bearing base 3-30 may be adapted to carry and fix the plunger pump 3-40 connected with the power transmission device 3-20 when the plunger pump 3-40 is in operation, and is also adapted to carry and fix the electric generator 3-50 connected with the power transmission device 20 when the electric generator 3-40 needs to be in operation.

For example, the fracturing and power generation switchable system 3-1 may be configured to switch between the first state and the second state. Under the first state, the plunger pump 3-40 may be fixed on the bearing base 3-30 and connected with the power transmission device 3-20, under this case, the switchable apparatus may be deployed as a fracturing apparatus. The fracturing apparatus may be configured to pressurize the fracturing fluid transported in the well site and push the fracturing fluid into the wellhead. In the second state, the electric generator 3-50 rather than the plunger pump may be fixed on the bearing base 3-30 and connected with or coupled to the power transmission device 3-20. In the second state, the switchable system is configured as an electric power generation system. The power generation system may provide electric power generation by the power generation apparatus and supply the generated electricity to devices or locations that are in need of electricity. For example, when the fracturing and power generation switchable system 3-1 is provided in the well site, and electrical power sources in the well site are not enough, switchable systems 1 other than those switchable apparatus deployed as the fracturing apparatus can be designated as power generation apparatuses. As such, adaptive sufficient electric power supply capacity at the well site may be provided. The fracturing and power generation switchable system 3-1 provided by the above implementations of the present disclosure may help reduce a number of the electric generators in the well site, so that the space occupied by the various well site devices and equipment may be reduced.

In some example implementations, as shown in FIG. 13, the bearing base 3-30 may include a bearing component 3-301, first fixing plates 3-302, and second fixing plates 3-303. For example, the first fixing plates 3-302 and the second fixing plates 3-303 are arranged on a bearing surface 3-308 of the bearing component 3-301. For example, the bearing surface 3-308 may include four rectangular surfaces. The first fixing plates 3-302 and the second fixing plates 3-303 may be arranged at two opposite sides of the bearing surface 3-308. The number of the first fixing plates 3-302 and the number of the second fixing plates 303 may be arranged at intervals. For example, the first fixing plates 3-302 and the second fixing plates 3-303 are fixing blocks with threaded holes or fixing holes, respectively. In some example implementations, the bearing component 3-301 may be configured to carry the plunger pump 3-40 or the electric generator 3-50, the first fixing plates 3-302 may be adapted to fix the plunger pump 3-40, and the second fixing plates 3-303 may be adapted to fix the electric generator 3-50.

Positions of the first fixing plates 3-302 (for example, the threaded holes or the fixing holes in the first fixing plates 3-302) may be configured with a fixing structure (for example, is located at the bottom surface of the plunger pump 3-40) corresponding to the plunger pump 3-40, to fix the plunger pump 3-40, so that when the switchable system is operating in the first state, the plunger pump 3-40 may be firmly connected with the power transmission device 3-30. Positions of the second fixing plates 3-303 (for example, the threaded holes or fixing holes in the second fixing plate 3-303) is configured with a fixing structure (for example, is located at the bottom surface of the electric generator 3-50 corresponding to the electric generator 3-50, to fix the electric generator 3-50, so that when the switchable system operates in the second state, the electric generator 3-50 may be firmly connected with the power transmission device 3-30. The implementations of the various parts of the bearing base 3-30 above, including the bearing component 3-301, the first fixing plates 3-302 and the second fixing plates 3-303 are merely examples. The number of these components are not limited as shown in FIG. 13. Other alternative structures can be implemented and adapted to fix/install the plunger pump 3-40 or the electric generator 3-50 on the bearing base 3-30.

In some example implementations, as shown in FIG. 13, the bearing base 3-30 may further include a supporting frame 3-304, a top plate 3-305, a bottom plate 3-306, and a relief groove 3-307. The support frame 3-304 may be located between the top plate 3-305 and the bottom plate 3-306 to support the top plate 3-305 and the bottom plate 3-306. For example, the upper surface of the top plate 3-305 may include the bearing surface 3-308. The relief groove 3-307 may be located between the top plate 3-305 and the bottom plate 3-306. During a transportation process, one or more forklift arms of a forklift truck may be inserted into the relief groove 3-307 to unload or carry the bearing base 3-30 by the forklift truck.

In some example implementations, as shown in FIG. 11, FIG. 12A, and FIG. 12B, the power device 3-10 may include a turbine engine 3-101. For example, the power transmission device 3-20 may include a speed reducer 3-201. In some example implementations, the electric generator 3-50 may include an electric power generation unit. After being slowed down by the speed reducer 3-201, the rotational driving force output by the turbine engine 3-101 can provide power input for either the plunger pump and the electric generator 3-50 in a switchable manner. An output shaft of the turbine engine 3-101 and an input shaft 3-2012 of the speed reducer 3-201 may be connected with each other by a flange 3-202 (shown in FIG. 11). When the switchable system 3-1 is in the first state (e.g., the switchable system 3-1 is deployed as a fracturing system to power one or more plunger pumps), the output shaft 3-2012 of the speed reducer 3-201 may be directly connected with the input shaft of the plunger pump 3-40. Alternatively, the output shaft 3-2012 of the speed reducer 3-201 and the input shaft of the plunger pump 3-40 may be coupled/connected with each other via a coupling 3-203 to for rotational power transmission. When the switchable system 3-1 is in the second state (e.g., the switchable system 3-1 is deployed as the power generation system to drive one or more electric generators), the output shaft 3-2012 of the speed reducer 3-201 may be directly connected with the input port of the electric generator 3-50. Alternatively, the output shaft 3-2012 of the speed reducer 3-201 and the input port of the electric generator 3-50 may be coupled/connected with each other by a coupling 203 to transmit the rotational power to the electric generator. In the examples described above, the structure of the switchable system 3-1 may be implemented in a compact manner.

In some example implementations, as shown in FIG. 12B, the power transmission device 3-20 may further include a torque limiter 3-2013, and the speed reducer 3-201 and the torque limiter 3-2013 may be connected with each other. The output end of the torque limiter 3-2013 may be connected with the coupling 3-203, so as to better control the rotational power output by the power transmission device 3-20.

In some example implementations, the coupling 3-203 may be implemented as one of structures including but not limited to a flexible coupling, a transmission shaft, and a clutch. The embodiments of the present disclosure are not limited to these.

In some example implementations, the plunger pump 3-40 and the electric generator 3-50 may not connected with the speed reducer 3-201 at the same time but may be configured to as switchable loads to the gas turbine engine.

FIG. 14A further shows a schematic front view of a first connection unit provided by at least one embodiment of the present disclosure. FIG. 14B shows a schematic top view of the first connection unit as shown in FIG. 14A.

In some example implementations, as shown in FIG. 14A, separate instances of a first connection unit 3-60 may be detachably arranged on the electric generator 3-50 and the plunger pump 3-40, respectively. The electric generator 3-50 may be connected with pipelines/cables/wires required for the operation of the electric generator 3-50 by the first connection unit 3-60. The plunger pump 3-40 may be connected with pipelines/cables/wires required for the operation of the plunger pump 3-40 by the first connection unit 3-60. For example, the separate instances of the first connection unit may be installed to the electric generator 3-50 and the plunger pump 3-40 through respective connection port 3-6012. Through the first connection unit 3-60, the plunger pump 3-40 or the electric generator 3-50 can be quickly connected with pipelines/cables/wires required for their operation, thereby enabling the switchable system 1 to quickly switch between the first state and the second state.

In some example implementations, as shown in FIG. 14A and FIG. 14B, the first connection unit 3-60 may further include a base 3-601 and a connection structure 3-602. The connection structure 3-602 may be movably connected with the base 3-601. For example, the connection structure 3-602 and the base 3-601 may be connected by structures including but not limited to bolts or pins, so that the connection structure 3-602 can turn or move relative to the base 3-601, as described in further detail below.

In some example implementations, as shown in FIG. 14B, the connection structure 3-602 may include a plurality of interfaces 3-6022, and the plurality of interfaces 3-6022 may be configured to connect the pipelines/cables/wires required for the operation of the plunger pump 3-40 or the electric generator 3-50. For example, the connection structure 3-602 may be arranged with interfaces 3-6022 (for example, quick connectors, sockets, pass throughs, and the like) for connecting lubricating pipelines, control cables, or hydraulic pipelines, electric cables, sensor wires/cables. The plurality of interfaces 3-6022 may each be configured to connect with at least one of the lubrication pipelines, the control cables, electric cables, sensor wires/cables, and the hydraulic pipelines. That is, the various pipelines/cables/wires required for the operation of the electric generator 3-50 or the plunger pump 3-40 may be guided to the several interfaces for direct connection, which can speed up the connection and installation process and the switching process.

In some example implementations, as shown in FIG. 14A and FIG. 14B, a plurality of interfaces 3-6022 may pass through or be inserted into a plug-in surface 3-6024 of the connection structure 3-602. When the connection structure 3-602 is not connected with the pipelines/cables/wires required for the operation of the power generating device 3-50 or the plunger pump 3-40 (for example, when the switchable system 3-1 is in a non-operating state or a configuration state), the plug-in surface 3-6024 of the connection structure 3-602 aligns parallel with the surface 3-6011 of the base 3-601. For example, the plug-in surface 3-6024 may be located at a main surface of the connection structure 3-602. The main surface of the connection structure 3-602 may be a surface with a largest area of the connection structure 3-602 facing upward in the state of the connection structure 3-602 as shown in FIG. 14A and FIG. 14B (a state in which the pipelines/cables/wires are not connected). In the case where the main surface of the connection structure 3-602 is a plane, the plug-in surface 3-6024 and the main surface are arranged in a same plane. The surface of the connection structure 3-602 opposite to the plug-in surface 3-6024 may be referred to as a bottom surface 3-6021 of the connection structure 3-602. The bottom surface 3-6021 may be attached to or coincide with the surface 3-6011 of the base 3-601. Under this case, the pipelines/cables/wires to the electric generator or plunger pump may not be connected and the first connection unit 3-60 may be referred to as being in a folded state. The size of the first connection unit 3-60 in such folded state is therefore reduced, facilitating transportation and storage of the first connection unit 3-60.

Figures 15A, 15B, 16A, 16B:
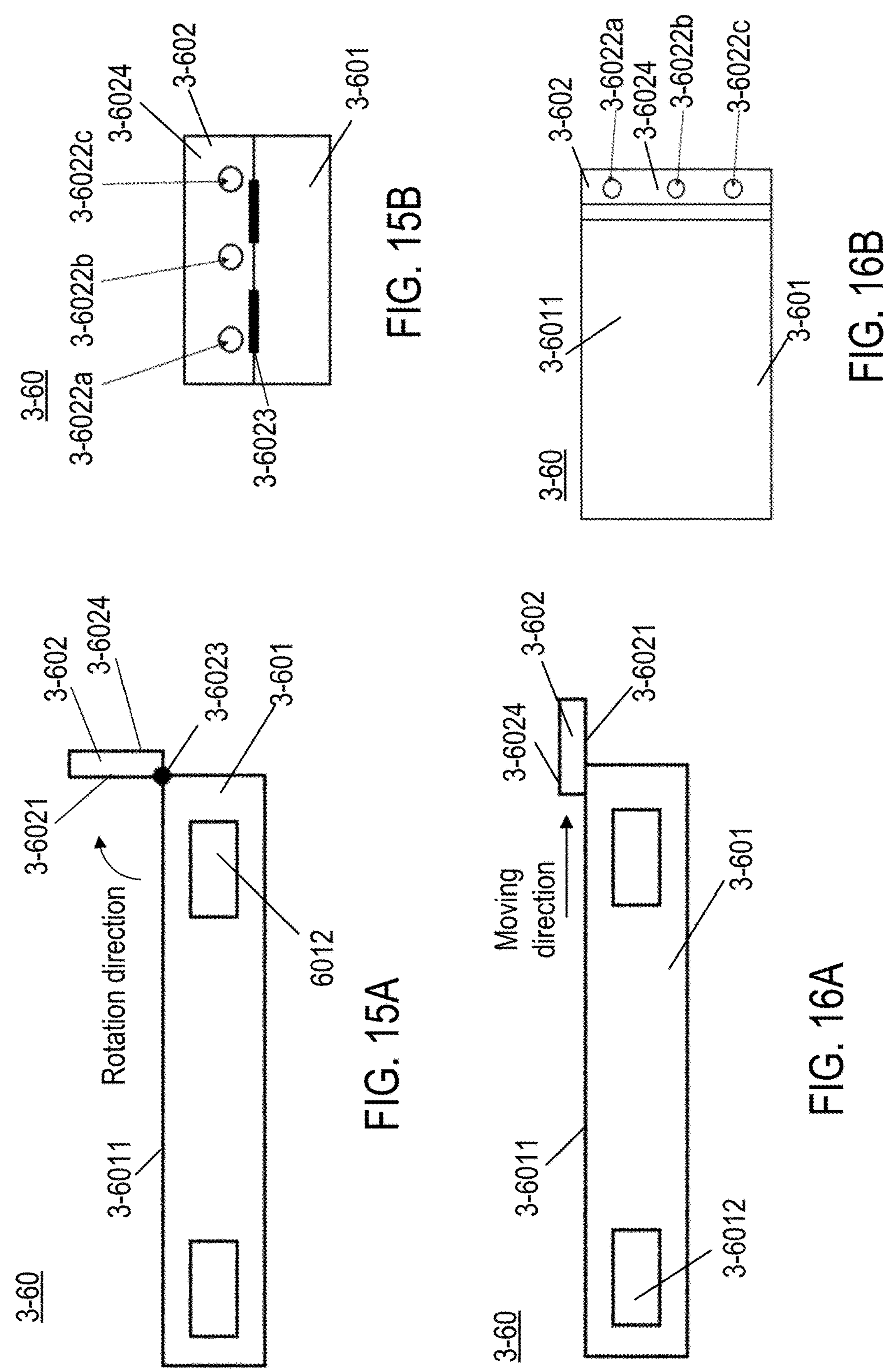
FIG. 15A shows a schematic front view of the example connection unit as shown in FIG. 14A in an unfolded state.
FIG. 15B is a schematic side view of the example connection unit as shown in FIG. 15A.
FIG. 16A shows another schematic front view of the example connection unit as shown in FIG. 14A in an extended state.
FIG. 16B shows a schematic top view of the example connection unit as shown in FIG. 16A.

FIG. 15A further shows a schematic front view of the first connection unit 3-60 shown in FIG. 14A in an unfolded state. FIG. 15B is a schematic-side view of the first connection unit as shown in FIG. 15A in the unfolded state. FIG. 16A shows another schematic front view of the first connection unit as shown in FIG. 14A in an unfolded state. FIG. 16B shows a schematic top view of the first connection unit as shown in FIG. 6A in the unfolded state.

In some example implementations, as shown in FIG. 15B and FIG. 16A, the plurality of interfaces 3-6022 may include a first interface 3-6022*a*, a second interface 3-6022*b*, and a third interface 3-6022*c*. For example, when the plurality of interfaces 3-6022 are connected with the pipelines/cables/wires required for the operation of the electric generator 3-50, the first interface 3-6022*a* may be configured for quickly plugging with lubrication pipelines; the second interface 3-6022*b* may be configured for quickly plugging with control cables; and the third interface 3-6022*c* may be configured for quickly plugging with sensor wires. In some example implementations, when the plurality of interfaces 3-6022 are connected with the pipelines/cables/wires required for the operation of the plunger pump 3-40, the first interface 3-6022*a* may be configured for quickly plugging with the lubrication pipelines; the second interface 3-6022*b* may be configured for quickly plugging with the control cables; and the third interface 3-6022*c* may be configured for quickly plugging with the hydraulic pipelines. It should be noted that a number of the plurality of interfaces 3-6022 is not limited to three, and can be determined according to the number of interfaces required by the pipelines/cables/wires needed for the operation of the power generating device 3-50 or the plunger pump 3-40.

In some example implementations, as shown in FIG. 15A and FIG. 15B, the connection structure 3-602 and the base 3-601 may be rotatably (or hingedly) connected. For example, the connection structure 3-602 may be hinged with the base 3-601. The connection structure 3-602 and the base 3-601 may be connected by a connection component 3-6023 (e.g., a hinge). The connection component 3-6023 may allow the connection structure 3-602 to rotate relative to the base 3-601 in a direction labeled as "rotation direction" and indicated by the corresponding arrow in FIG. 15A. When the connection structure 3-602 is connected with the pipelines/cables/wires required for the operation of the electric generator 3-50 or the plunger pump 3-40 (for example, in the operating state of the switchable system 3-1 (deployed as the fracturing system or the power generation system)), the plug-in surface 3-6024 (and the bottom surface 3-6021) of the connection structure 3-602 rotates toward a side away from the surface 3-6011 of the base 3-601, so that the bottom surface 3-6021 of the connection structure 3-602 is perpendicular to the surface 3-6011 of the base 3-601, and the connection structure 3-602 may be connected with the pipelines/cables/wires required for the operation of the power generating device 3-50 or the plunger pump 3-40 from sideways. Accordingly, after the first connection unit 3-60 is installed on the turbine engine 3-101, the first connection unit 3-60 is unfolded (for example, by a 90° rotation), the lubrication pipelines, the control cables, the sensor wires, and the electric cables required when the generator is in operation may be quickly connected by the interfaces 3-6022.

In some example implementations, as shown in FIG. 16A and FIG. 16B, the connection structure 3-602 may be movably connected with the base 3-601. For example, the connection structure 3-602 may be integrated with the plug-in surface 3-6024 (and the bottom surface 3-6021). A sliding rail may be arranged at the bottom surface 3-6021 of the connection structure 3-602, so that the connection structure 3-602 can move or slide on the base 3-601. When the connection structure 3-602 is connected with the pipelines/cables/wires required for the operation of the electric generator 3-50 or the plunger pump 3-40 (for example, in an operational state of the switchable system 3-1 (deployed as the fracturing system or the power generation system)), the plug-in surface 3-6024 (and the bottom surface 3-6021) of the connection structure 3-602 may move to a side away from the base 3-602. In other words, the bottom surface 3-6021 of the connection structure 3-602 may move along a direction labeled as "moving direction" and indicated by the corresponding arrow in FIG. 16A. As a result of such sliding, an orthographic projection of the plug-in surface 3-6024 of the connection structure 3-602 on the plane parallel to the surface 3-6011 of the base 3-601 at least partially extend outside the surface 3-6011 of the base 3-601, and the bottom surface 3-6021 of the connection structure 3-602 correspondingly extends beyond the surface 3-6011 of the base 3-601. As such, the bottom surface 3-6021 of the connection structure 3-602 is exposed to allow the connection structure 3-602 to connect with the pipelines/cables/ wires required for the operation of the electric generator 3-50 or the plunger pump 3-40. When the electric generator 3-50 or the plunger pump 3-40 is connected with the first connection unit 3-60 in the operational state, the connection structure 3-602 moves at least partially to the outside of the base 3-602, so that the bottom surface 3-6021 extends beyond the surface 3-6011 of the base 3-601 to allow the connection structure 3-602 to connect with other pipelines/cables/wires. The difference in the example implementations of FIG. 16A and FIG. 16B as compared with FIG. 15A and FIG. 15B is the linear versus rational movement of the connection structure 3-602 to change between the non-operational sate (folded state, transportation state, storage state) and operational state. Other configuration for the motion of the connection structure 3-602 are also contemplated. For example, the linear movement of the connection structure 3-602 need not be parallel to the surface 3-6011 of the first connection unit 3-60.

In some example implementations, as shown in FIG. 12B, the switchable system 3-1 may be detachably arranged with a second connection unit, the second connection unit may be configured to connect (e.g., electrically) with an electric generator that supplies electrical power to the switchable system 3-1. For example, the electric generator can also transmit electric energy to a power supply system in the well site where the switchable system 3-1 is located, then the electric energy is transmitted to the switchable system 3-1 from the power supply system. For example, the electric generator may be electrically connected with the switchable system 3-1 to supply power to devices that need to be electrically powered (such as a meter, a controller, a display, etc.) in the switchable system 3-1. For example, the electrical energy output by the electric generator can also be indirectly transmitted to the switchable system 3-1 via, for example, intermediate voltage transformation, which are not limited in the embodiments of the present disclosure. For example, the second connection unit may include a structure similar to that of the first connection unit (as shown in FIG. 14A, FIG. 14B, FIG. 15A, FIG. 15B, FIG. 16A, and FIG. 16B), or a modified version thereof. For example, the second connection unit may be provided with interfaces such as control cables, lubrication pipes, and hydraulic pipes. For example, the pipelines/cables/wires required for the switchable system to be powered may be arranged into several interfaces and for direct connection, so that the connection and installation can be sped up. In the case where the switchable system 3-1 in the well site needs to be powered, other switchable systems can be switched to the second state and deployed as a power generation system for the switchable system 3-1. In particular, the electric generator from the other switchable system may be connected with the switchable system 3-1 needing electric power supply, so that the electric power supplying capability of the well site is improved, and the space occupied by the various devices at the well site may be reduced.

Figure 17:
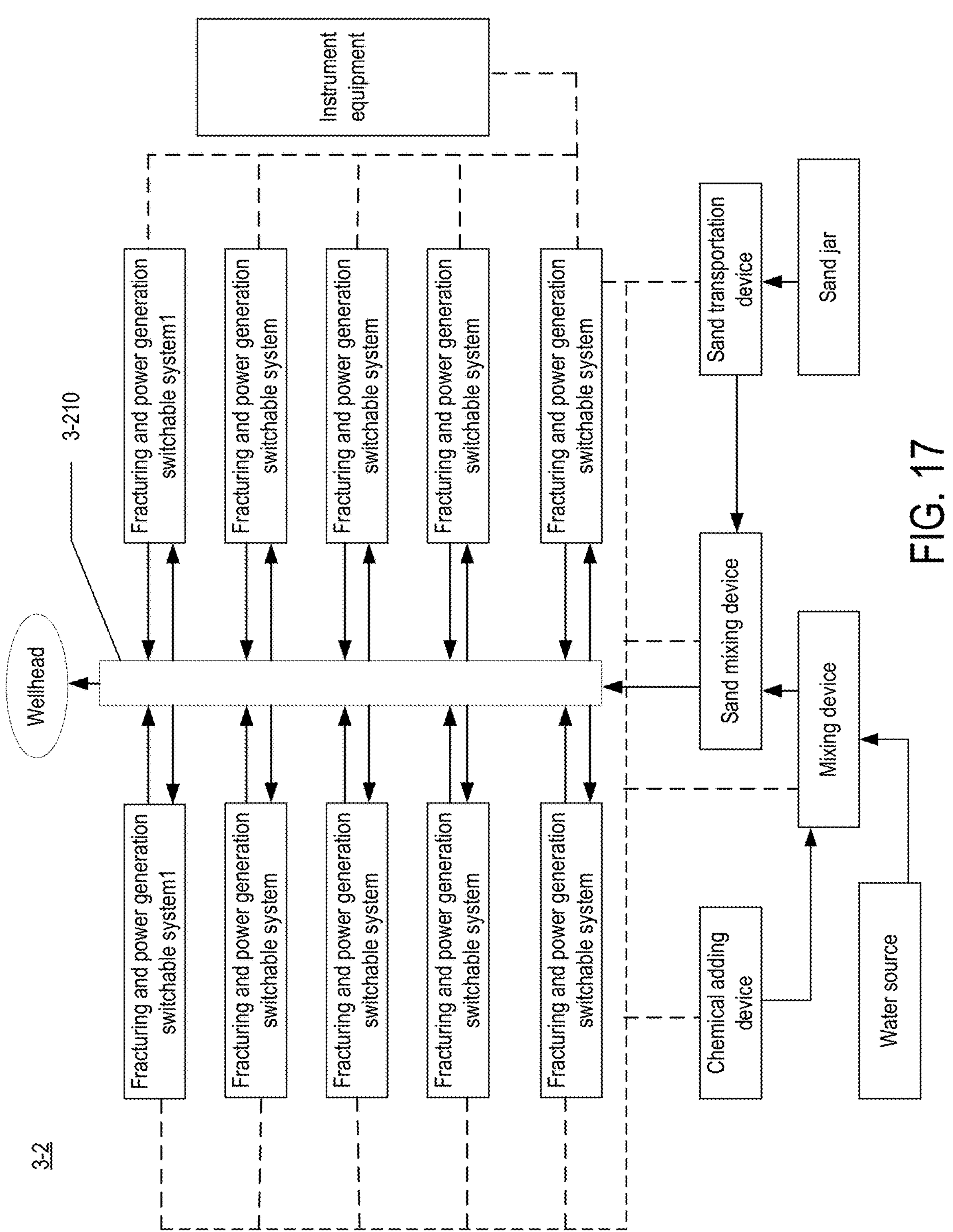
FIG. 17 shows a schematic diagram of an example layout of a well site as provided according to an embodiment of the present disclosure.

FIG. 17 shows a schematic diagram of a layout of a well site according to at least one embodiment of the present disclosure.

In some example implementations, as shown in FIG. 17, the well site 3-2 may include a manifold 3-210 and a plurality of fracturing and electric power generation switchable systems each of which may be implemented as the example fracturing and electric power generation switchable system described above in relation to FIGS. II-16. The manifold 3-210 may be configured to transport or deliver fracturing fluid to the wellhead. The plurality of fracturing and electric power generation switchable system may be arranged at two sides of the manifold 3-210 and may be connected with the manifold 3-210 to collectively pressurize the fracturing fluid in the manifold 3-210 towards the wellhead. At least one of the plurality of fracturing and power generation switchable systems is configured to operate in the first state and is deployed as a fracturing system. Each of the plurality of fracturing and power generation switchable systems at the well site may quickly switch between the first state and the second state for deployment as an electric power generation system. For example, when the power transmission devices 3-20 of the plurality of fracturing and power generation switchable systems are connected with plurality of plunger pumps 3-40, the switchable systems are deployed as fracturing systems. When the power transmission devices 3-20 of the switchable systems are connected with the electric generators 3-50, the switchable systems are deployed as power generation systems. In FIG. 17, solid lines with arrows indicate manifold connections; solid lines indicate hydraulic fluid transporting lines; various arrows point to directions of flow (such as flow of the fracturing fluid); and the dashed lines indicate control cabling and also indicate mechanical connections between the various components. The hydraulic pressure of the fracturing fluid can be detected by a pressure gauge. The fracturing fluid may be input into the manifold 3-210 from a sand mixing device through a sand transportation device. Sand material of the fracturing fluid may be produced by a mixing device.

Figure 18:
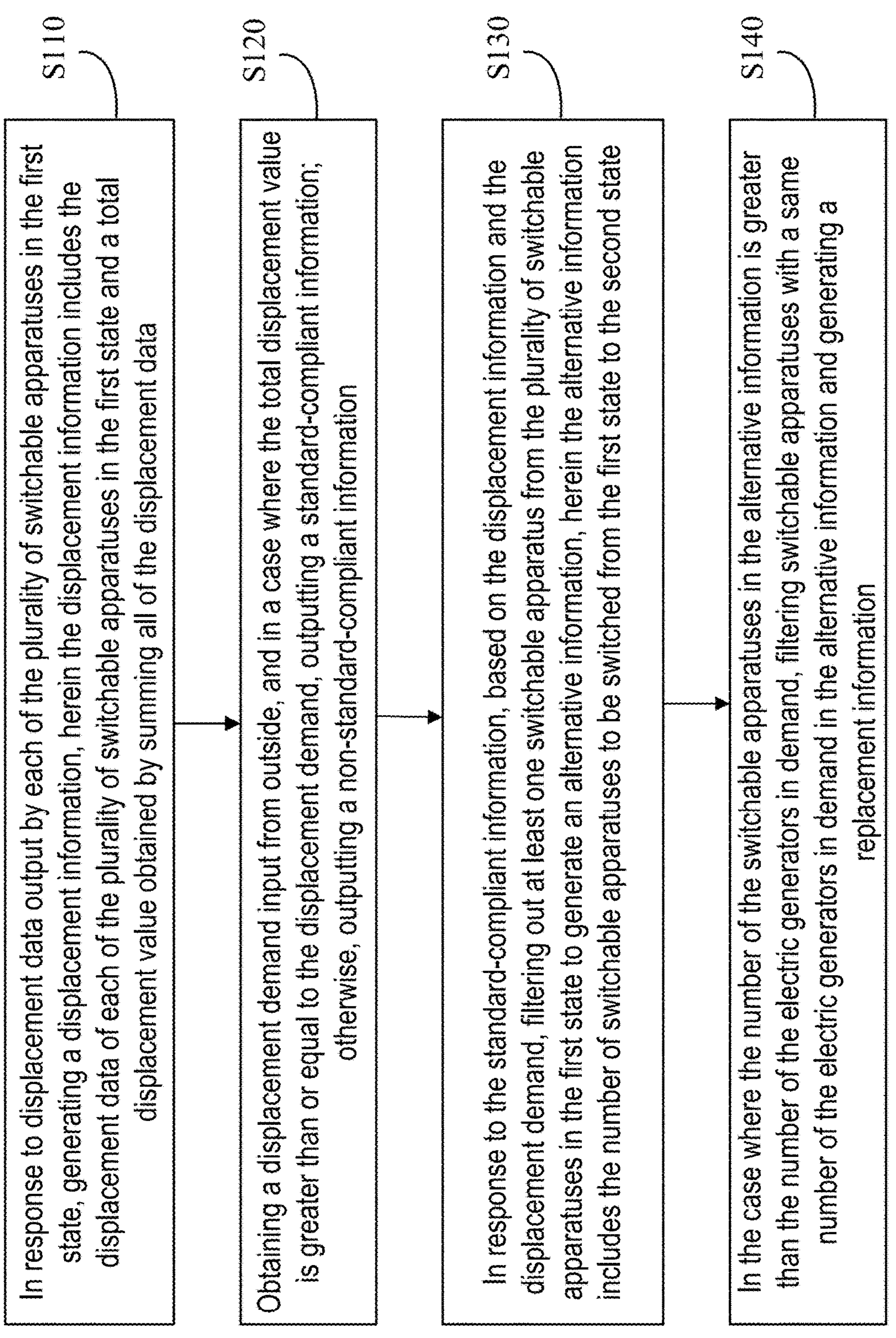
FIG. 18 shows a schematic flow chart of a control method of the well site shown in FIG. 17 as provided according to an embodiment of the present disclosure.

FIG. 18 shows a schematic flow chart of a control method of the well site as shown in FIG. 17 in accordance with at least one embodiment of the present disclosure. The example control method of the well site shown in FIG. 8 includes step S110 through step S140.

Step S110: in response to fracturing fluid displacement data output by each of the plurality of switchable systems in the first state, generating a fracturing fluid displacement information. The fracturing fluid displacement information may include but is not limited to the fracturing fluid displacement data of each of the plurality of switchable systems in the first state and a total fracturing fluid displacement value obtained by summing all of the fracturing fluid displacement data.

In some example implementations, the fracturing fluid displacement data of the switchable systems deployed as fracturing systems in the well site may be calculated, and the total fracturing fluid displacement of the switchable systems deployed as fracturing systems may be calculated.

Step S120: obtaining a fracturing fluid displacement demand, and when the total fracturing fluid displacement value is greater than or equal to the fracturing fluid displacement demand, generating/outputting a standard-compliant information/indication; otherwise, generating/outputting a standard-non-compliant information/indication. The fracturing fluid displacement demand is determined by the need at the wellhead for fracture formation and may be provided as an input parameter to the control system or may be a predefined value.

In some example implementations, the fracturing fluid displacement demand of the fracturing fluid required by the wellhead of the well site may be compared with the total monitored fracturing fluid displacement of the switchable systems deployed as fracturing systems as extracted from the fracturing fluid displacement information. When the total fracturing fluid displacement value is greater than or equal to the fracturing fluid displacement demand, it indicates that the fracturing fluid displacement of the switchable systems deployed as fracturing systems produce sufficient fracturing fluid to achieve a desired fracturing operation, or that the fracturing fluid displacement has a surplus over the desired amount. As such, when the total fracturing fluid displacement value is greater than the fracturing fluid displacement demand, and the switchable systems deployed as fracturing systems meets the fracturing fluid displacement demand, the surplus switchable systems deployed as fracturing systems may be switched to the second state and deployed as electric power generation systems instead. When the total fracturing fluid displacement value is less than a standard-non-compliant information, it indicates that the fracturing fluid displacement produced by the switchable systems deployed as fracturing systems is not enough to meet the requirement of the well site. Under this circumstance, no switchable systems deployed as fracturing systems are to be switched and deployed as electric power generation systems.

For example, both the standard-compliant information and the standard-non-compliant information may be generated in a form of an indication, an instructional, or the like.

In some example implementations, when the switchable systems in the first state in the well site is powered off, if no standard-compliant information or standard-non-compliant information is generated, an abnormal information/indication may be generated. For example, the abnormal information may indicate that communication failure may have occurred at the well site, such that the operational status of the switchable systems cannot be monitored normally. Under this circumstance, it may be necessary to invoke troubleshooting procedures. For example, the operation may be suspended to allow the staff or operators to perform maintenance and system check.

In some example implementations, power failure situations of the switchable systems in the well site can be detected by detecting voltages and/or currents in various circuit of the well site.

For example, when the switchable systems in the first state in the well site is not powered off, saturation information/indication may be generated. In response to the saturation information/indication, an operator can implement recovery steps or procedures. For example, an unneeded power supply system (e.g., switchable systems in the second state), may be switched to the first state.

In some example implementations, when the plurality of switchable systems in the first state in the well site are powered off, if the standard-compliant information/indication is received, in response to an overall power demand data may be determined (e.g., input from outside of the power generation systems). The number of operational electric generators needed may be determined by dividing the power demand data by a unit power data of an electric generator followed by a rounding up to the next nearest integer. In other words, the electric power demand by the well site may be divided by the power that can be generated by one power generation system if being switched to, and the result obtained may be rounded up to the next nearest integer. This integer represents the number of the electric generators currently needed. The number of the switchable systems that need to switched to the second state may be derived from this integer number (e.g., by subtracting the currently number of operational electric generator system form this integer number).

Step S130: in response to the standard-compliant information/indication, and based on the fracturing fluid displacement information and the fracturing fluid displacement demand, selecting at least one switchable system from the plurality of switchable systems in the first state to switch to the second state to generate a switching information. Herein the switching information indicates the number and identify of switchable systems to be switched from the first state to the second state.

Figure 19:
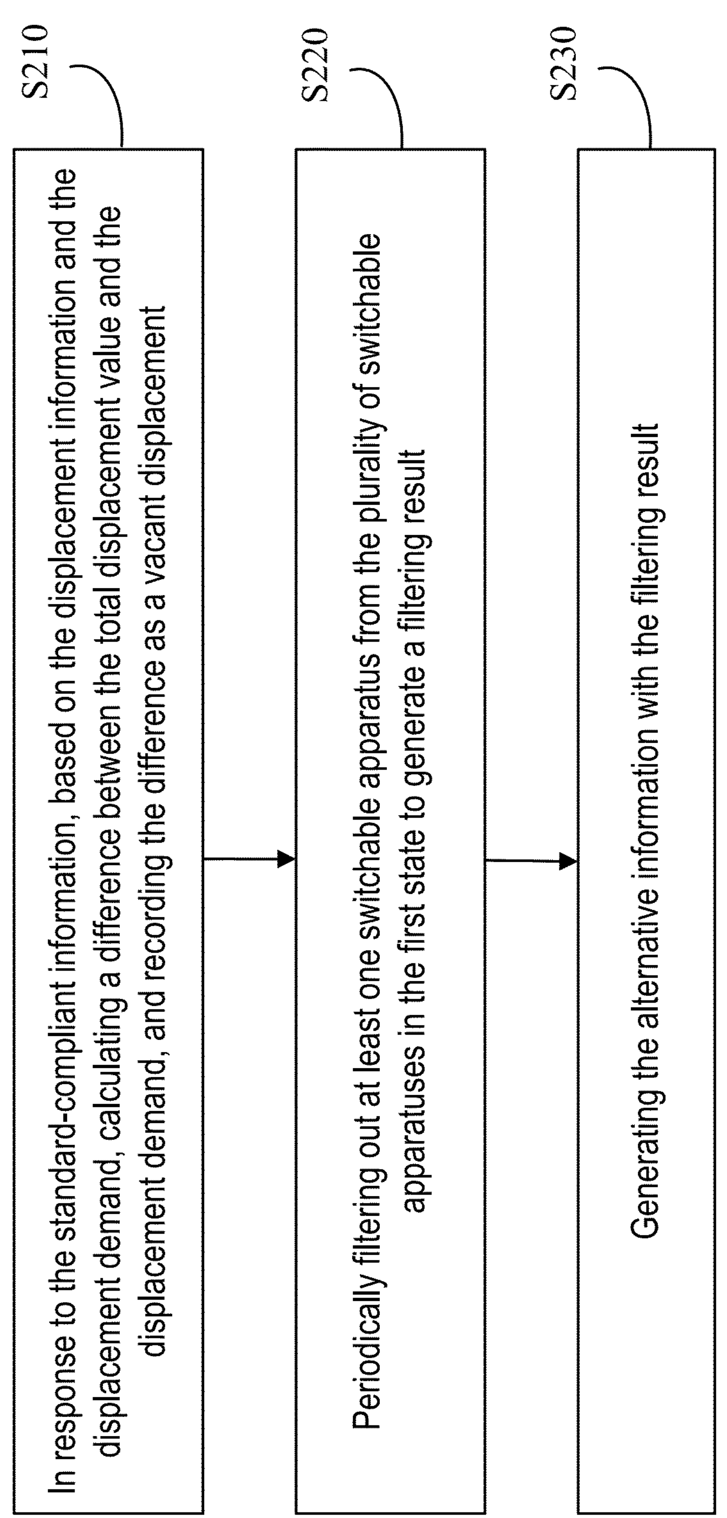
FIG. 19 is a schematic flow chart of another control method of the well site of FIG. 7 as provided according to an embodiment of the present disclosure.

FIG. 19 shows a schematic flow chart of an example control method of the well site as shown in FIG. 17 in accordance with at least one embodiment of the present disclosure. The example control method for the well site as shown in FIG. 19 may include step S210 through step S230. These steps may be implemented to achieve Step S130 of FIG. 18.

Step S210: in response to the standard-compliant information/indication, and based on the fracturing fluid displacement information and the fracturing fluid displacement demand, calculating a difference between the total fracturing fluid displacement value and the fracturing fluid displacement demand, and recording the difference as an excess fracturing fluid displacement.

Step S220: periodically determining at least one switchable system from the plurality of switchable system in the first state to be switched from the first state to the second state. Such determination and the set of switchable system to be switched from the first state to the second state may be referred to as an adjustment scheme.

In some example implementations, the condition for periodically switching operating state of at least one switchable system from the plurality of switchable systems in the first state is as follows: periodically determining the adjustment scheme including at least one switchable systems according to the fracturing fluid displacement data of the plurality of switchable systems (supplied as the fracturing systems) in the first state in an ascending order of fracturing fluid displacement data of the plurality of switchable systems. The at least one switchable system to be switched is determined by evaluating the sum of their fracturing fluid displacement data such that the sum is just smaller than the excess fracturing fluid displacement (including a next switchable system with the next higher fracturing fluid displacement would lead to the sum being higher than the excess fracturing fluid displacement). As such, under the condition that the fracturing fluid displacement demand of the well site is met, a set of switchable systems with the smaller fracturing fluid displacement data are selected to be switched from the first state to the second state for electric power generation. In such a manner, it becomes convenient for an operator of the well site to maintain the compliance status of the fracturing systems with sufficient but not overly excessive fracturing fluid displacement at the wellhead, and the set of switchable systems in the first state (fracturing state) that can be switched to the second state (electric power generation state) without affecting the overall hydraulic fluid discharge requirement can be identified.

Step S230: generating the switching information based on the adjustment scheme. For example, the adjustment scheme may include the set of switchable systems to be switched from the first state to the second state deployed as electric power generation systems. For example, based on the adjustment process and the adjustment condition of the switchable systems in step S220, the adjustment scheme may include relevant information about the switchable systems to be switched from the first state to the second state. Such information, for example, may include but is not limited to the locations of the set of switchable systems to be switched in the well site and/or the number of the corresponding switchable systems. As such, the to-be-switched switchable systems are more quickly identified when they need to be switched.

Step S140: when the number of the switchable systems to be switched in the adjustment scheme and the switching information is greater than a number of the electric generators in demand, modify the adjustment scheme to select a number of switchable systems among the ones in the adjustment scheme with a matching number of the electric generators in demand to generate a replacement adjustment scheme.

In some example implementations, generating the replacement adjustment scheme may include: selecting a number of switchable systems with the same number of the electric generators in demand from the set of switchable systems in the adjustment scheme in an ascending order of the fracturing fluid displacement of the switchable systems in the first state in adjustment scheme and the switching information, and generating the replacement adjusted scheme based on the selected switchable systems having the same number of the electric generators in demand. In other words, if the set of the switchable systems that can be switched to the second state in the adjustment scheme and switching information is greater than the number of the switchable systems that need to be switched to the second state, the switchable systems in the adjustment scheme in the first state with smaller fracturing fluid displacement are preferentially selected and then switched to the second state and deployed as power generation systems.

The control method of the well site provided by the embodiments of the present disclosure above may be implemented to improve the electric power supply capability in the well site while meeting the fracturing fluid displacement demand of the well site.

In some example implementations, as shown in FIG. 17, when the fracturing fluid displacement demand of the well site is met, fracturing and power generation switchable systems at locations that are further away from the wellhead may be preferably chosen to be switched to the second state and deployed as power generation systems, thereby reducing the fracturing fluid displacement transport inefficiency and waste (associated with longer distance transport of the fluid to the wellhead) of the switchable systems, improving energy utilization, and reducing power consumption.

In some example implementations, as shown in FIG. 17, when one of the power supply devices of the fracturing and power generation switchable systems in the well site breaks down and needs other systems to supply power, under the condition that the fracturing fluid displacement demand of the well site is met, the principle of proximity may be adopted to select switchable system that is nearest to the troubled switchable system to switch to the second state as an electric power generation system.

In some example implementations, in response to the replacement adjustment scheme, the selected switchable systems having the same number of electric generators in demand are finally switched to the second state. That is, the selected switchable systems having the same number of required power generation systems are deployed as power generation systems to supply electric power to other switchable systems as the fracturing systems.

In some example implementations, when the number of the switchable systems in the adjustment scheme and switching information is not greater than the number of the electric generators in demand, the replacement adjustment scheme is generated based on all of the switchable systems in the adjustment scheme and the switching information. In such circumstance, a warning may be automatically generated. In other words, when the switchable systems not to be switched ensure the fracturing fluid displacement demand of the well site, other switchable systems can be deployed as electric power generation systems. When the number of the switchable systems that can be switched to and deployed as the power generation systems in the well site is insufficient, and under the condition that the fracturing fluid displacement demand of the well site is met, other switchable systems are all switched to and deployed as electric power generation systems. The staff can deploy other electric generators or electricity sources according to the warning information to meet the electric power supply demand of the switchable system deployed as fracturing system and/or other components and systems of the well site.

It should be noted that the fracturing and power generation switchable systems described in the embodiments of the present disclosure can be switched from the first state to the second state, and can also be switched from the second state to the first state under similar principles. That is, the fracturing and power generation switchable systems can be deployed as either electric power generation systems or fracturing systems, and can be flexibly switched (or swapped), depending on a real-time or periodically evaluated fracturing fluid demand and electric power demand. In other words, the combined platform including the plurality of switchable systems provide power to both the fracturing operation and electric power for the operating the switchable systems when they operate as a fracturing system. The plurality of switchable systems may be allocated for either fracturing operation or electric power generation based on the demand for fracturing fluid and electric power demand of the combined platform. The switchability or swappability provided by the various embodiment above offer a flexibility in balancing the two demands, allowing for real-time or periodic monitoring of both fracturing fluid data and the electric power demand and optimally select from the plurality of switchable system to switch form the first state to the second state, or from the second state to the first state.

Figure 20:
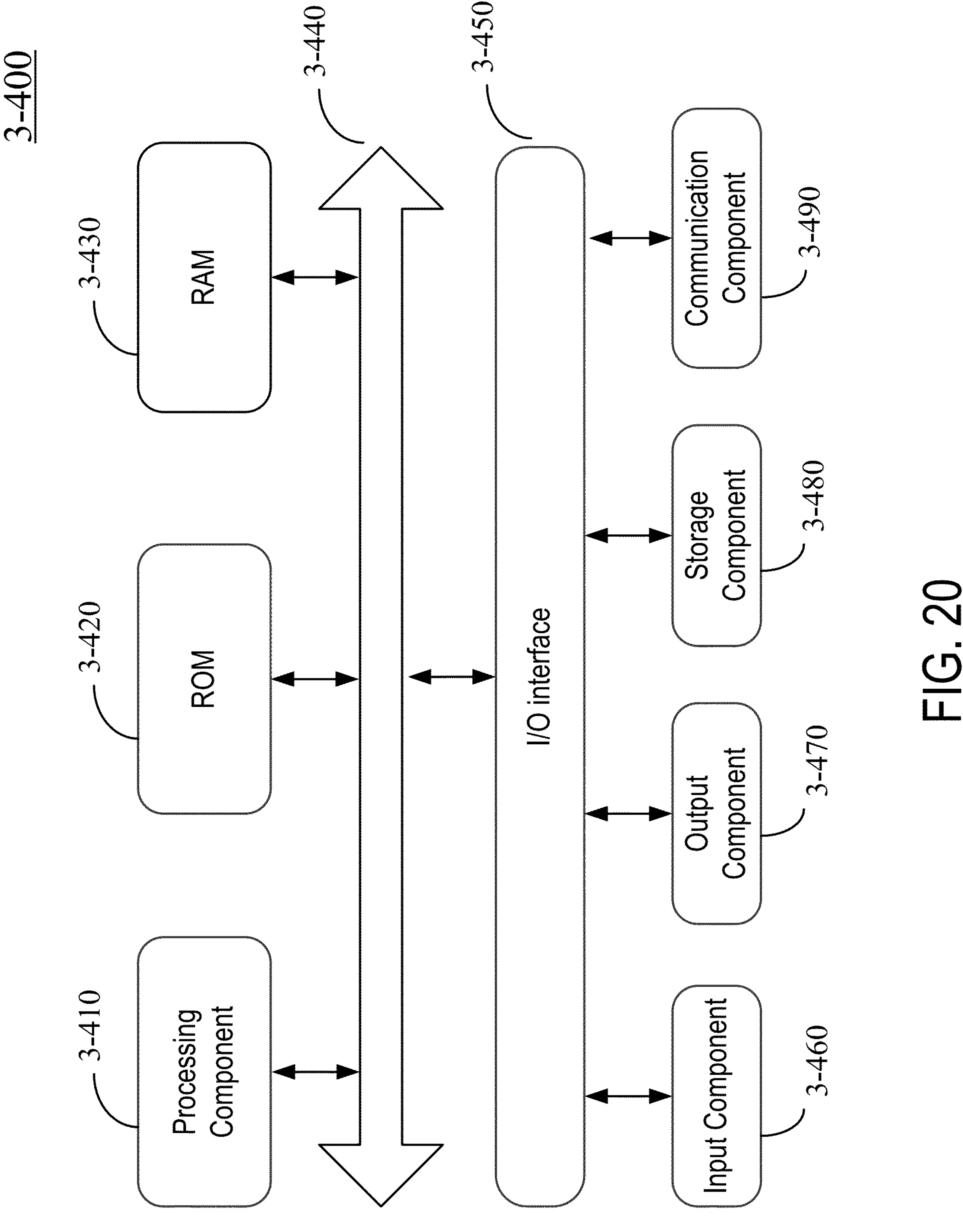
FIG. 20 shows a structural schematic diagram of an example control device as provided according to an embodiment of the present disclosure.

FIG. 20 shows a structural schematic diagram of an example control device used in the well site in accordance with at least one embodiment of the present disclosure.

The example control device 3-400 for the well site shown in FIG. 20 may be configured to implement the control method of the well site in accordance with the embodiments of the present disclosure. The control device 3-400 used for the well site may be implemented as a terminal device such as a personal computer, a notebook computer, a tablet computer, and a mobile phone, a workstation, a server, or a cloud service, etc. It should be noted that the control device 3-400 used for the well site as shown in FIG. 20 is merely one non-limiting example.

As shown in FIG. 20, the control device 3-400 used in the well site may include a processing unit (such as a central processing unit, a graphics processor, etc.) 3-410, which can perform various actions and processes according to a computer program stored in a read-only memory (ROM) 3-420 or a program loaded from a storage unit 3-480 into a random-access memory (RAM) 3-430. In the RAM 3-430, various programs and data relevant to the operation of the control device 3-400 of the well site are also stored. The processing unit 3-410, the ROM 3-420, and the RAM 3-430 communicate with each other through one or more buses 3-440. An input/output (I/O) interface 3-450 is also connected with the bus 3-440.

Generally, the following components can be connected with the I/O interface 3-450: an input component 3-460 including but not limited to a touch screen, a touch pad, a keyboards, a mouse, a camera, a microphone, an accelerometer, and a gyroscope, and the like; an output component 3-470 including but not limited to a liquid crystal display (LCD), a speaker, and a vibrator, and the like; a storage component 3-480 including but not limited to a magnetic tape, a hard disk, a solid-state storage, and the like; and a communication component 3-490. The communication component 3-490 may allow the control device 3-400 used for the well site to exchange data and/or commands with other electronic components through wireless communication or wired communication. Although FIG. 20 shows a control device 3-400 for a well site including various components, it should be understood that it is not required that all the components as shown in FIG. 20 be included. The control device 3-400 used for the well site may alternatively be implemented with more or fewer components as shown in FIG. 20.

In some example implementations according to the embodiments of the present disclosure, the above-mentioned control method of the well site may be implemented as a computer software program. For example, the embodiments of the present disclosure may include a computer program product, which includes a computer program stored on a non-transitory computer readable medium. The computer program includes program includes codes for executing the above-mentioned control method of the well site. In such an embodiment, the computer program may be downloaded and installed from the network through the communication unit 3-490, and can be installed from the storage unit 3-480, or can be installed from the ROM 3-420. When the computer program is executed by the processing unit 3-410, the functions defined in the control method of the well site provided by the embodiments of the present disclosure can be performed.

In some other example implementations of the present disclosure, a storage medium is further provided. The storage medium may be configured to store non-transitory computer program executable codes (such as computer executable instructions). When the non-transitory computer program executable codes are executed by a processor, the control method of the well site according to any embodiments of the present disclosure can be realized.

Figure 21:
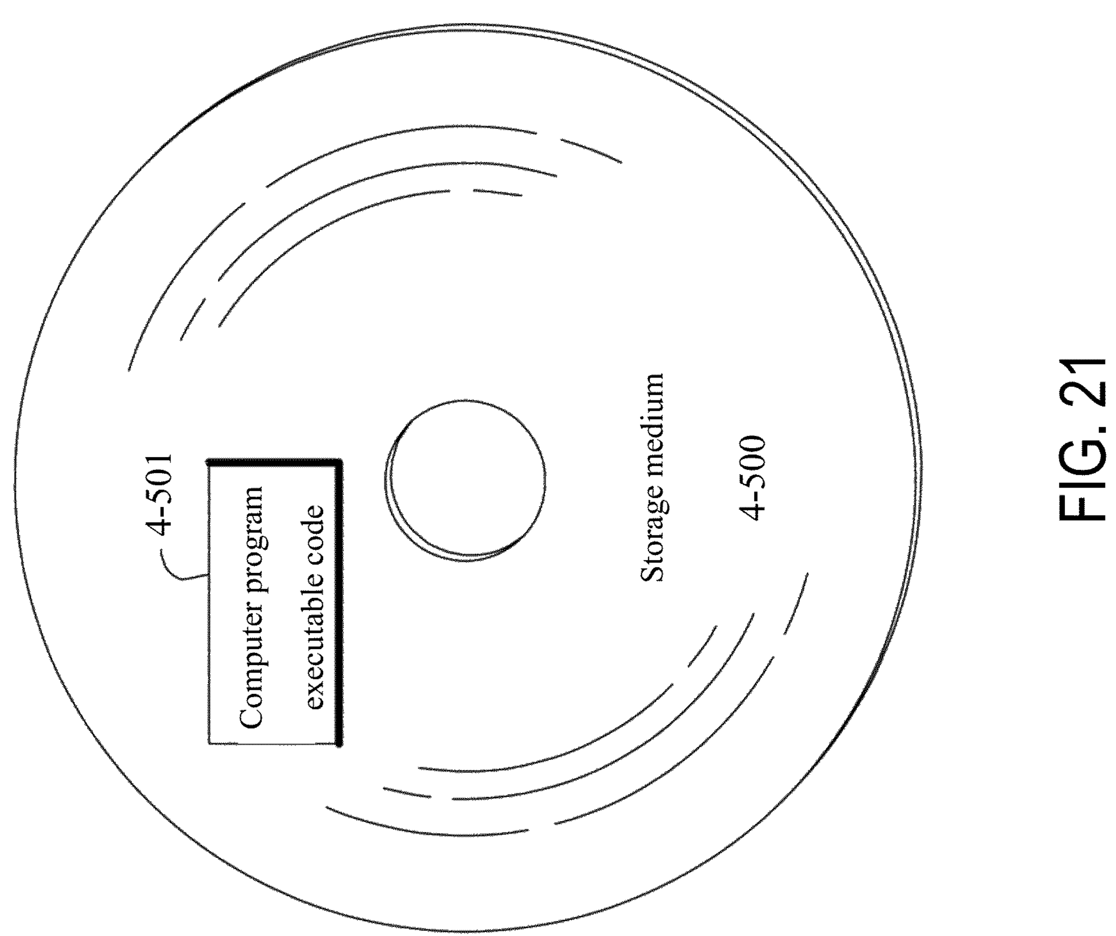
FIG. 21 shows a schematic diagram of an example storage medium as provided according to an embodiment of the present disclosure.

FIG. 21 is a schematic diagram of a storage medium in accordance with at least one embodiment of the present disclosure. As shown in FIG. 21, the storage medium 4-500 may non-temporarily stores computer program executable codes 4-501 when the computer program executable codes 4-501 are executed by a computer, one or more steps in the control method of a well site described above may be executed.

For example, the storage medium 4-500 may be applied to the above-mentioned control device 3-400 of the well site. For example, the storage medium 4-500 may be a memory 3-420 in the control device 3-400 of the well site as shown in FIG. 20. The function of the code included in the storage medium 4-500 are described in the various embodiments above.

Figures 22, 23:
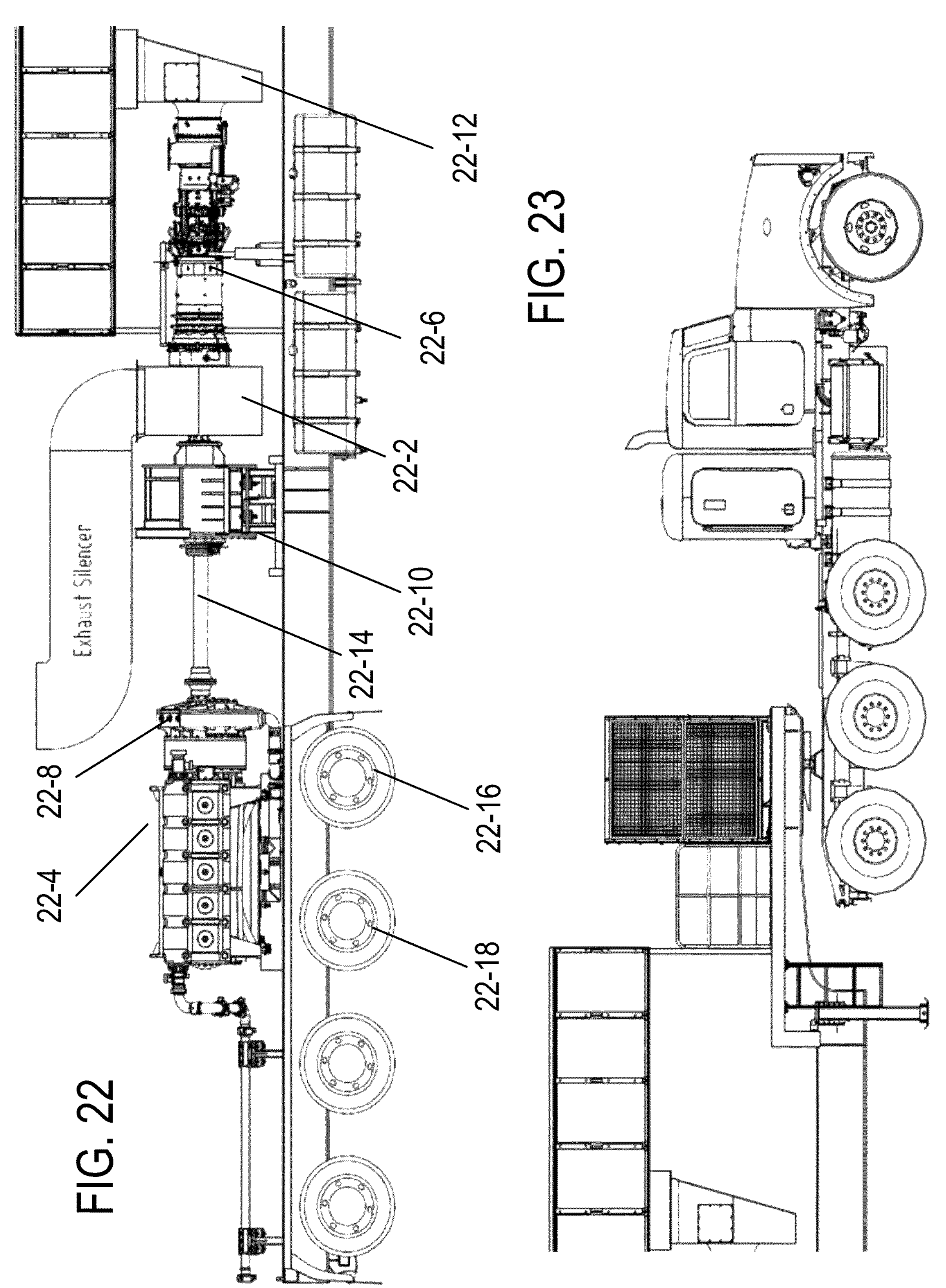
FIG. 22 shows a back portion of an example semi-trailer turbine based fracturing system.
FIG. 23 shows a front portion of the semi semi-trailer turbine based fracturing system of FIG. 22.

Finally, FIGS. 22-23 show a front portion and a back portions of a fracturing system disposed on a semi-trailer platform. As shown in FIG. 22-23, the fracturing system is based on a turbine engine (or turbine) 22-6 that drives a plunger pump 22-4 for pumping fracturing fluid to a wellhead. The driving power output port of the turbine engine 22-6 may be coupled to a reduction gearbox 22-10 through an exhaust section 22-2 of the turbine pump. The exhaust section is configured to receive the combustion exhaust gas from the turbine engine and is further connected upwards to an exhaust duct that guide the combustion exhaust from the turbine engine away from the intake side 22-12 of the turbine engine. Example construction and component of the exhaust section and exhaust duct is descried above in this disclosure.

The coupling between the reduction gearbox 22-10 and the driving power output end of the turbine engine may be based on a through-shaft. The through-shaft may pass through a channel or cavity in the exhaust section 22-2. For example, the channel or cavity for inserting the shaft may be through a volute in the exhaust section, as descried above.

As further shown in FIGS. 22-23, another shaft 22-14 may be installed between the reduction gearbox 22-10 and the plunger pump 22-4. In some implementations, the plunger pump 22-4 may include an integrated reduction gearbox 22-8. The shaft 22-14, thus may be configured to couple either direct to the plunger pump 22-4 or indirectly to the plunger pump 22-4 through the integrated reduction gearbox 22-8. The reduction gearboxes 22-10 and 22-8, if both employed, may thus operate collectively to reduce the rotational speed at the driving power output end of the turbine engine 22-6 to the input of the plunger pump 22-4.

In some implementations, the plunger pump 22-4 may be fixedly installed on the semi-trailer platform. The plunger pump 22-4 may be installed such that at least one set of wheels of the semi-trailer, such as wheel set 22-18 and wheel set 22-16 are directly beneath the plumber pump 22-4 when viewed from the side of the semi-trailer. In some implementations, the plunger pump 22-4 may be disposed/installed on the semi-trailer such that two sets of wheels are directly under it when viewed from the side, as shown in FIG. 22. In some implementations, the center of mass of the plunger pump may be directly on top of one set of wheels when viewed from the side. In some other implementations, the center of mass of the plunger pump 22-4 may be located at a center between two sets of wheels when viewed from the side. The purpose of the example implementations above is to provide a stable support to the plunger pump 22-4 by the semi-trailer platform.

In some implementations, the reduction gearbox 22-10 and the shaft 22-14 connected thereto may be configured as removable components on the semi-trailer platform. The reduction gearbox 22-10 may be configured to be easily movable in the field. Other auxiliary components may be included on the semi-trailer platform for assisting in removing and hoisting the reduction gearbox 22-10 when needed.

Figures 24, 25:
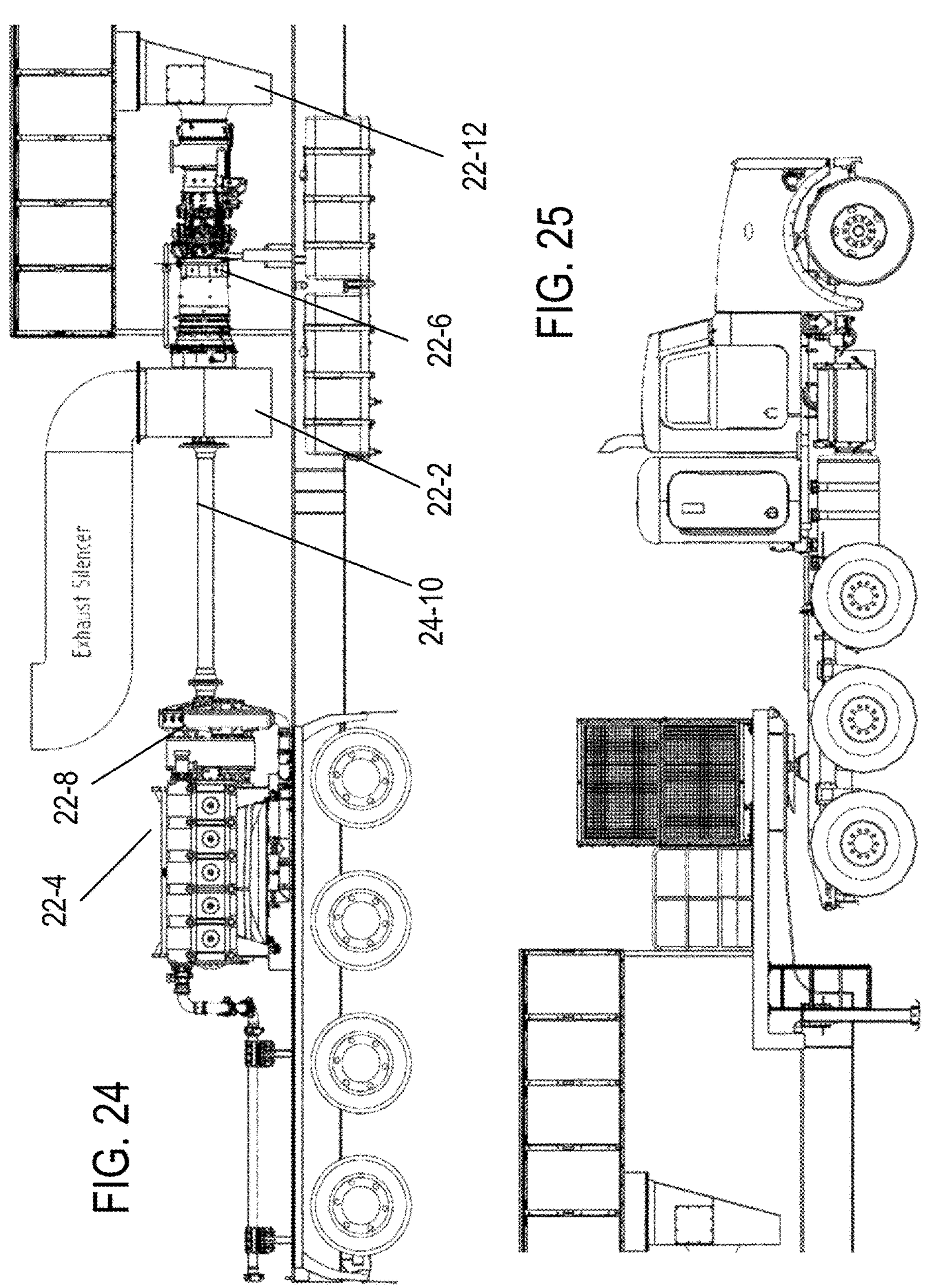
FIG. 24 shows a back portion of another example semi-trailer turbine based fracturing system.
FIG. 25 shows a front portion of the semi semi-trailer turbine based fracturing system of FIG. 24.

With the reduction gearbox 22-10 and the shaft 22-14 are removed, the system of FIG. 22-23 may be converted into another configuration, as shown in FIGS. 24-25. In particular, as shown in FIGS. 24-25, once the reduction gearbox 22-10 and the shaft 22-14 of FIGS. 22-23 are removed, another shaft 24-10 may replace the shaft 22-10 of FIGS. 22-23 and be disposed and connected between the plunger pump 22-4 (or the integrated gearbox 22-8 of the plunger pump) and the exhaust section 22-2. For example, the through-shaft described above as passing through the exhaust section 22-2 may be configured as couplable at its exit at the exhaust section 22-2. The shaft 24-10 may be installed by coupling it to the through-shaft at one end and the plunger pump 22-4 or the integrated reduction gearbox 22-8 at the other end. Example coupling mechanisms between rotational shafts are described above.

In some other implementations, the through-shaft and the shaft 24-10 may be implemented as a single driving shaft. As such, after the reduction gearbox 22-10 and the shaft 22-14 in FIGS. 22-23 are removed, the through-shaft can also be removed. A single shaft may be inserted through the through-channel or cavity in the exhaust section 22-10 and may be connected to the driving power output end of the turbine engine 22-6 at one end and the plunger pump 22-4 or the integrated reduction gearbox 22-8 at the other end.

The configurable system above may thus provide flexibility in operation. For example, in some situations the integrated reduction gearbox 22-8 may be sufficient for speed reduction and in such situation, the reduction gearbox 22-10 may be removed, and set aside for reinstallation when called for in a different operational circumstance.

Figure 26:
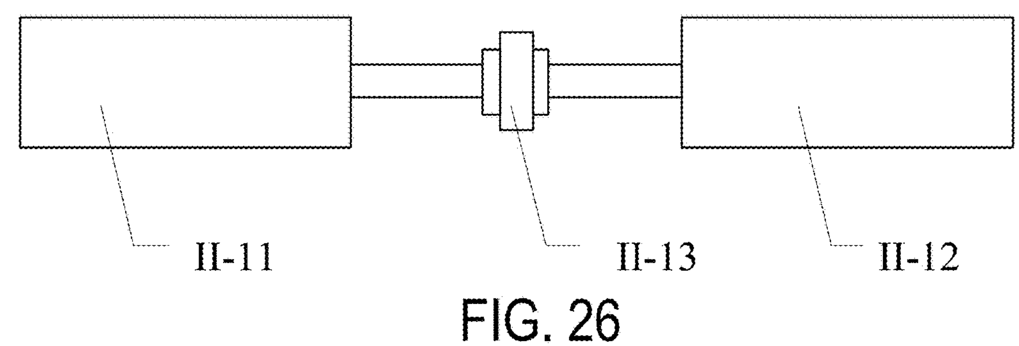
FIG. 26 is a schematic diagram of a fracturing apparatus.

FIG. 26 is-a schematic diagram of a fracturing apparatus: As illustrated by FIG. 26, the fracturing apparatus II-10 includes a plunger pump 11 and an electric motor II-12. A power output shaft of the electric motor II-12 is connected with a power input shaft of the plunger pump II-11 through a clutch II-13. Because of frequent engagement or disengagement, the clutch II-13 has a relatively high damage frequency. On the other hand, in fracturing operation, the plunger pump needs to operate stably and continuously, so the requirements on the stability of clutch is very high. Therefore, if there is a problem in the clutch of the fracturing apparatus during operation, and the problem cannot be judged and treated in time, it will cause great economic losses to the fracturing operation. It should be noted that the fracturing apparatus illustrated in FIG. 26 can adopt a mode of one engine and one pump (that is, one electric motor drives one plunger pump) or a mode of one engine and two pumps (that is, one electric motor drives two plunger pumps).

On the other hand, before or at the end of fracturing apparatus operation, maintenance personnel are required to carry out maintenance evaluation, and maintenance personnel shall check and judge faults according to experience. However, as mentioned above, fracturing apparatus has high requirements on stability, and belongs to construction operation equipment with high power (the rated maximum output power of a single plunger pump is usually higher than 2000 hp) and high pressure (the rated pressure of the plunger pump is usually not smaller than 10000 psi) (the maximum pressure can usually exceed 40 MPa during construction), and maintenance personnel cannot check and repair nearby during operation. Therefore, once the fracturing apparatus has problems during the operation, it will bring risks to the fracturing operation. In addition, once the fracturing apparatus has appeared potential failure, which cannot be detected by maintenance personnel, it will bring great potential safety hazards to fracturing operation.

In this regard, embodiments of the present disclosure provide a fracturing apparatus, a control method of the fracturing apparatus, and a fracturing system. The fracturing apparatus includes a plunger pump, a prime mover, a clutch and a clutch hydraulic system. The plunger pump includes a power end and a liquid end, the prime mover includes a power output shaft, and the clutch includes a first connection portion, a second connection portion and a clutch portion between the first connection portion and the second connection portion. The power end of the plunger pump includes a power input shaft, the first connection portion is connected with the power input shaft, the second connection portion is connected with the power output shaft of the prime mover, and the clutch hydraulic system is configured to provide hydraulic oil to the clutch. The fracturing apparatus further includes a first pressure sensor arranged in the clutch hydraulic system and configured to detect the hydraulic pressure of the clutch hydraulic system. Therefore, upon the first pressure sensor detecting that the pressure of the hydraulic oil provided by the clutch hydraulic system to the clutch is smaller than a preset pressure value, the fracturing apparatus can control the clutch to disengage, so that the clutch slip phenomenon caused by lower liquid pressure can be avoided, further deterioration of the fault can be avoided, and pertinent overhaul and maintenance can be carried out.

Hereinafter, the fracturing apparatus provided by the embodiments of the present disclosure will be described in detail with reference to the accompanying drawings.

Figure 27A:
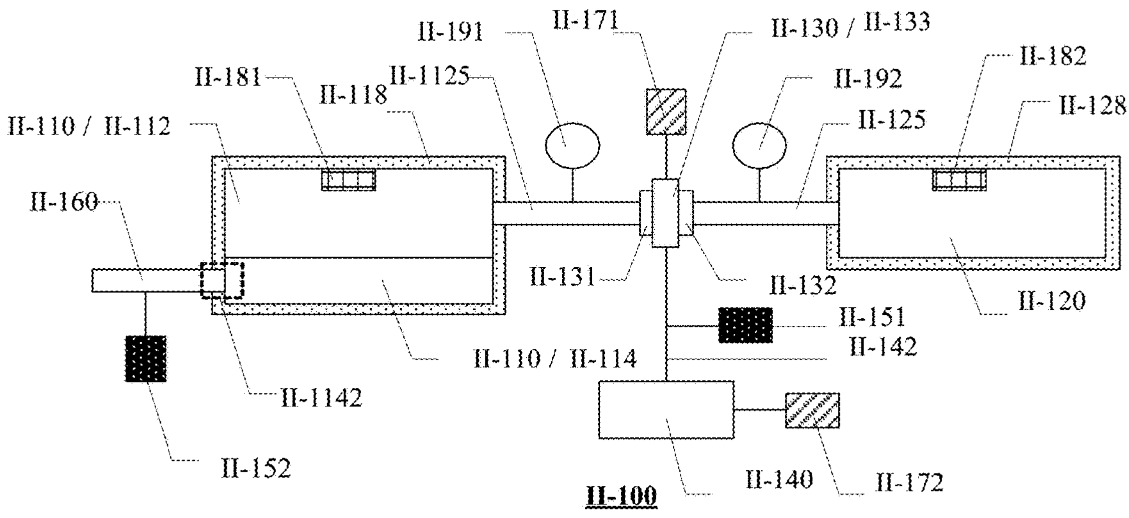
FIG. 27A is a schematic diagram of a fracturing apparatus according to an embodiment of the present disclosure.
Figure 27B:
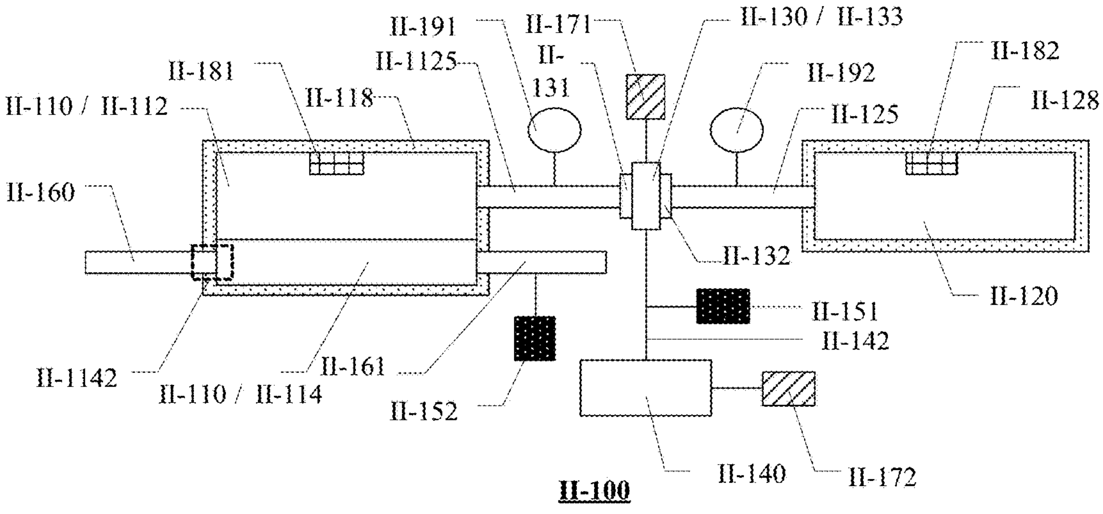
FIG. 27B is a schematic diagram of another fracturing apparatus according to an embodiment of the present disclosure.

An embodiment of the present disclosure provides a fracturing apparatus. FIG. 27A is a schematic diagram of a fracturing apparatus according to an embodiment of the present disclosure; FIG. 27B is a schematic diagram of another fracturing apparatus according to an embodiment of the present disclosure. As illustrated by FIGS. 27A and 27B, the fracturing apparatus II-100 includes a plunger pump II-110, a prime mover II-120, a clutch II-130 and a clutch hydraulic system II-140. The plunger pump II-110 includes a power end II-112 and a liquid end II-114, the prime mover II-120 includes a power output shaft II-125, and the clutch 130 includes a first connection portion II-131, a second connection portion II-132 and a clutch portion II-133 between the first connection portion II-131 and the second connection portion II-132. The power end II-112 of the plunger pump II-110 includes a power input shaft II-1125, the first connection portion II-131 is connected with the power input shaft II-1125, the second connection portion II-132 is connected with the power output shaft II-125 of the prime mover II-120, and the clutch hydraulic system II-140 is configured to provide hydraulic oil to the clutch II-130. The fracturing apparatus II-100 further includes a first pressure sensor II-151 configured to detect the hydraulic pressure of the clutch hydraulic system II-140, that is, the pressure value of the hydraulic oil provided by the clutch hydraulic system II-140 to the clutch II-130. It should be noted that various “pressures” or “pressure values” in the present disclosure are pressure values obtained by pressure gauges or pressure sensors. In a fracturing apparatus, the clutch hydraulic system is configured to provide hydraulic oil to the clutch. If the pressure of hydraulic oil does not meet the requirements because of oil leakage and other reasons, the clutch will have a slip phenomenon, in addition, if it is not treated in time, more serious faults may occur, which will bring greater potential safety hazards and greater economic losses to fracturing operations. However, the fracturing apparatus provided by the embodiments of the present disclosure detects the hydraulic value of the hydraulic oil provided to the clutch by the clutch hydraulic system through the first pressure sensor, upon the first pressure sensor detecting that the hydraulic value of the hydraulic oil provided to the clutch by the clutch hydraulic system is smaller than the preset pressure value, the fracturing apparatus can control the clutch to disengage, so that the clutch slip phenomenon caused by lower hydraulic pressure can be avoided, thus further deterioration of the fault can be avoided, and pertinent overhaul and maintenance can be carried out. In addition, the hydraulic pressure of the hydraulic oil provided to the clutch by the clutch hydraulic system detected by the first pressure sensor can be displayed remotely, so that remote operation can be realized and the operation difficulty and cost can be reduced.

In some examples, the prime mover includes one of a diesel engine, an electric motor, and a turbine engine. Of course, the embodiments of the present disclosure include but are not limited thereto, and the prime mover can also be other machines that provide power.

Figure 28:
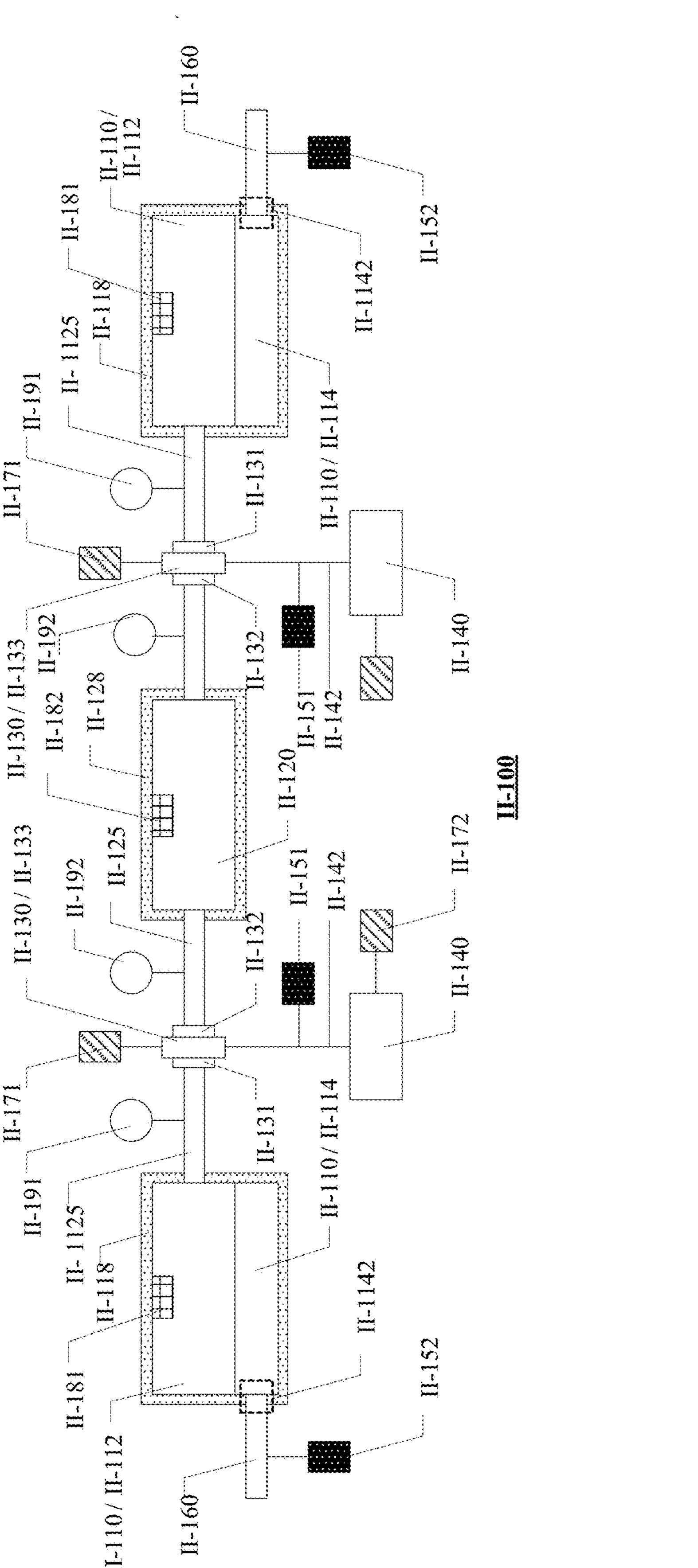
FIG. 28 is a schematic diagram of another fracturing apparatus according to an embodiment of the present disclosure.

FIG. 28 is a schematic diagram of another fracturing apparatus according to an embodiment of the present disclosure. As illustrated by FIG. 28, the fracturing apparatus II-100 includes two plunger pumps II-110 and one prime mover II-120. One prime mover II-120 can drive two plunger pumps II-110 at the same time. In this case, the fracturing apparatus II-100 can include two clutches II-130, two clutch hydraulic systems II-140, and two first pressure sensors II-151. The two first pressure sensors II-151 are arranged in one-to-one correspondence with the two clutch hydraulic systems II-140, and each first pressure sensor II-151 is configured to detect the hydraulic pressure of the corresponding clutch hydraulic system II-140. Therefore, upon the first pressure sensor detecting that the hydraulic value of the hydraulic oil provided by any one of the two clutch hydraulic systems is smaller than the preset pressure value, the corresponding clutch can be controlled to disengage, thereby ensuring the normal operation of the other plunger pump.

In some examples, as illustrated by FIG. 27A, the clutch hydraulic system II-140 includes an oil supply pipeline II-142, the oil supply pipeline II-142 is connected with the clutch II-130 so as to provide hydraulic oil for the clutch II-130. In this case, the first pressure sensor II-151 can be arranged on the oil supply pipeline II-142, so that the hydraulic pressure of the clutch hydraulic system II-140 can be better detected. Of course, the embodiments of the present disclosure include but are not limited thereto, and the first pressure sensor can also be arranged at other suitable positions as long as it can detect the hydraulic pressure of the clutch hydraulic system.

In some examples, because the clutch rotates in the working state, the oil supply pipeline can be connected with the clutch through a rotary joint. Of course, the embodiments of the present disclosure include but are not limited thereto, and the oil supply pipeline can also be connected with the clutch in other ways. In addition, the type of rotary joint can be selected according to the actual situation. In some examples, as illustrated by FIG. 27A, the fracturing apparatus II-100 further includes a second pressure sensor II-152. The hydraulic end II-114 of the plunger pump II-110 includes a liquid output end II-1142, and the second pressure sensor II-152 is configured to detect the pressure of the liquid output from the liquid output end II-1142. Upon the fracturing apparatus performing fracturing operations, it is needed for the fracturing apparatus to provide fracturing liquid meeting the preset pressure value. If the pressure of the liquid output from the liquid output end II-1142 of the plunger pump II-110 is greater than the safe pressure value (for example, 90 MPa), it is needed to protect the transmission and high-pressure components of the apparatus. In this case, the fracturing apparatus can quickly disengage the clutch and protect the transmission and high-pressure components of the apparatus, thus playing a safe role.

For example, upon the pressure of the liquid output by the liquid output end of the plunger pump being greater than the safe pressure value, the fracturing apparatus can control the clutch hydraulic system through the control system to make the clutch quickly disengage. Of course, the embodiments of the present disclosure include but are not limited thereto, the fracturing apparatus can also play a safe role by stopping the rotation of the electric motor, stopping the power supply of the electric motor, or stopping the output of the electric motor frequency converter through the control system upon the pressure of the liquid output by the liquid output end of the plunger pump being greater than the safe pressure value.

In some examples, as illustrated by FIG. 28, the fracturing apparatus II-100 includes two plunger pumps II-110 and a prime mover H-120. One prime mover II-120 can drive two plunger pumps II-110 at the same time. In this case, the fracturing apparatus II-100 can include two clutches II-130, two clutch hydraulic systems II-140, and two second pressure sensors II-152. The two second pressure sensors H-152 are arranged in one-to-one correspondence with the two liquid output ends II-1142 of the two plunger pumps II-110, and each second pressure sensor II-151 is configured to detect the hydraulic pressure of the corresponding liquid output end II-1142. Therefore, upon the second pressure sensors detects that the hydraulic pressure provided by any one of the two liquid output ends being greater than the safe pressure value, the clutch can be quickly disengaged to protect the transmission and high-pressure components of the apparatus, thus playing a safe role.

In some examples, as illustrated by FIG. 27A, the fracturing apparatus II-100 further includes a discharge manifold II-160, the discharge manifold II-160 is connected with the liquid output end II-1142. In this case, the second pressure sensor II-152 can be arranged on the liquid output end II-1142 or the discharge manifold II-160, so as to better detect the pressure of the liquid output by the liquid output end II-1142. Of course, the embodiments of the present disclosure include but are not limited thereto, and the second pressure sensor can also be arranged at other suitable positions as long as it can detect the pressure of the liquid output by the liquid output end; for example, the second pressure sensor can be arranged on a pressure relief manifold.

For example, as illustrated by FIG. 27A, the discharge manifold II-160 of the fracturing apparatus II-100 is only arranged on a side of the plunger pump II-110 away from the clutch II-130, in addition, as illustrated by FIG. 27B, the fracturing apparatus II-100 also has an auxiliary manifold II-161 on a side of the plunger pump II-110 away from the discharge manifold II-160. In this case, the second pressure sensor II-152 can also be arranged on the auxiliary manifold II-161, and the auxiliary manifold II-161 can be configured to discharge high-pressure liquid or relieve pressure.

In some examples, as illustrated by FIGS. 27A and 27B, the fracturing apparatus II-100 further includes a first temperature sensor II-171 configured to detect the temperature of the clutch II-130. Therefore, the fracturing apparatus detects the temperature of the clutch through the first temperature sensor, and upon the first temperature sensor detects that the temperature of the clutch, being higher than a preset temperature value, the clutch can be controlled to disengage, so that various faults caused by high clutch temperature can be avoided, further deterioration of faults can be avoided, and pertinent overhaul and maintenance can be carried out. In addition, the temperature of the clutch detected by the first temperature sensor can be displayed remotely, so that remote operation can be realized, and the operation difficulty and cost can be reduced. It should be noted that the first temperature sensor is configured to detect the temperature of the clutch, but the first temperature sensor is not needed to be installed on the clutch, because the clutch will rotate, and the stability of the first temperature sensor using wiring or wireless connection is easy to have problems, so the first temperature sensor can use non-contact temperature measurement methods such as infrared temperature measurement.

In some examples, as illustrated by FIGS. 27A and 27B, the fracturing apparatus II-100 further includes a second temperature sensor II-172, the second temperature sensor II-172 is configured to detect the temperature of the clutch hydraulic system II-140. Therefore, the fracturing apparatus detects the temperature of hydraulic oil in the clutch hydraulic system through the second temperature sensor, and upon the second temperature sensor detecting that the temperature of hydraulic oil in the clutch hydraulic system is higher than the preset temperature value, it can control the clutch to disengage, thus avoiding various faults caused by high clutch temperature, thus avoiding further deterioration of faults, and carrying out pertinent overhaul and maintenance.

In some examples, as illustrated by FIG. 28, the fracturing apparatus II-100 includes two plunger pumps II-110 and one prime mover II-120. One prime mover II-120 can drive two plunger pumps II-110 at the same time. In this case, the fracturing apparatus II-100 can include two clutches II-130, two clutch hydraulic systems II-140, two first temperature sensors II-171 and two second temperature sensors II-172. The two first temperature sensors II-171 are arranged in one-to-one correspondence with the two clutches II-130, and each first temperature sensor II-171 is configured to detect the temperature of the corresponding clutch II-130. The two second temperature sensors II-172 are arranged in one-to-one correspondence with the two clutch hydraulic systems II-140, and each second temperature sensor II-172 is configured to detect the temperature of the corresponding clutch hydraulic system II-140. Therefore, upon the first temperature sensors detecting that the temperature of any one of the two clutches is abnormal or the second temperature sensors detecting that the temperature of any one of the two clutch hydraulic systems is abnormal, the corresponding clutch can be controlled to disengage, thus ensuring the normal operation of the other plunger pump.

In some examples, as illustrated by FIGS. 27A and 27B, the fracturing apparatus II-100 further includes a first vibration sensor II-181, the first vibration sensor II-181 is configured to detect the vibration of the plunger pump II-110. The fracturing apparatus II-100 further includes a plunger pump base II-118, the plunger pump II-110 is arranged on the plunger pump base II-118, and the first vibration sensor II-181 is located on the plunger pump II-110 or the plunger pump base II-118. During the operation process of the fracturing apparatus, upon the clutch failing, the transmission between the clutch and the plunger pump will be abnormal, resulting in higher vibration value of the plunger pump. The fracturing apparatus provided in this example detects the vibration of the plunger pump through the first vibration sensor, upon the vibration of the plunger pump being greater than a preset vibration value, the clutch can be controlled to disengage, and the input power of the plunger pump can be completely cut off, so that the further deterioration of the fault can be avoided, and the pertinent overhaul and maintenance can be carried out. In addition, because the first vibration sensor is located on the plunger pump (such as the housing of the plunger pump) or the plunger pump base, the first vibration sensor is rigidly connected with the plunger pump in this case, and the first vibration sensor can better reflect the vibration of the plunger pump.

In some examples, as illustrated by FIG. 28, the fracturing apparatus II-100 includes two plunger pumps II-110 and one prime mover II-120. One prime mover II-120 can drive two plunger pumps II-110 at the same time. In this case, the fracturing apparatus II-100 can include two clutches II-130, two clutch hydraulic systems II-140, and two first vibration sensors II-181. Therefore, upon the first vibration sensor II-181 detecting that the vibration of any one of the two plunger pumps is greater than the preset vibration value, the corresponding clutch can be controlled to disengage, thereby ensuring the normal operation of the other plunger pump.

In some examples, as illustrated by FIGS. 27A and 27B, the fracturing apparatus II-100 further includes a second vibration sensor II-182, the second vibration sensor II-182 is configured to detect the vibration of the prime mover II-120. The fracturing apparatus II-100 further includes a prime motor base II-128, the prime mover II-120 is arranged on the prime motor base II-128, the second vibration sensor II-182 is arranged on the prime mover II-120 or the prime motor base II-128. During the operation process of the fracturing apparatus, upon the clutch failing, the transmission between the clutch and the prime mover will be abnormal, resulting in high vibration value of the prime mover. The fracturing apparatus provided in this example detects the vibration of the prime mover through the first vibration sensor, and upon the vibration of the prime mover being greater than the preset vibration value, the clutch can be controlled to disengage, so that the further deterioration of the fault can be avoided, and pertinent overhaul and maintenance can be carried out. In addition, because the second vibration sensor is located on the prime mover (such as the housing of the prime mover) or the prime mover base, the second vibration sensor can better reflect the vibration of the prime mover.

In some examples, as illustrated by FIGS. 27A and 27B, the fracturing apparatus II-100 further includes a first rotation speed sensor II-191 and a second rotation speed sensor II-192. The first rotation speed sensor II-191 is configured to detect the actual rotation speed of the power input shaft II-1125 of the plunger pump II-110. The second rotation speed sensor II-192 is configured to detect the actual rotation speed of the power output shaft II-125 of the prime mover II-120. Therefore, upon the actual rotation speed detected by the first rotation speed sensor II-191 not matching the actual rotation speed detected by the second sensor II-192, for example, the transmission ratio being not conformed, it can be judged that the clutch is abnormal. In this case, the clutch can be controlled to disengage, so that further deterioration of the fault can be avoided, and pertinent overhaul and maintenance can be carried out.

In some examples, as illustrated by FIGS. 27A and 27B, the first rotation speed sensor II-191 can be arranged on the power input shaft II-1125 of the plunger pump II-110, so that the space that can be fixed and protected is larger. It should be noted that if the rotation speed sensor is installed on the clutch or its upper and lower regions, there is a greater risk of damage to the rotation speed sensor upon the clutch being overhauled or oil leakage occurs. Moreover, the fault jitter of clutch can easily cause the deviation of detection data. However, the fracturing apparatus provided in this example can install the first rotation speed sensor on the power input shaft of the plunger pump, which will not be affected by clutch failure or clutch overhaul.

In some examples, as illustrated by FIG. 28, the fracturing apparatus II-100 includes two plunger pumps II-110 and one prime mover II-120. One prime mover II-120 can drive two plunger pumps II-110 at the same time. In this case, the fracturing apparatus II-100 can include two clutches II-130, two clutch hydraulic systems II-140, two first rotation speed sensors II-191 and one second rotation speed sensor II-192. Therefore, upon the rotation speed of any one of the two plunger pumps detected by the two first rotation speed sensors II-191 being not match the rotation speed of the prime mover detected by the second rotation speed sensor 192, the corresponding clutch can be controlled to disengage, thereby ensuring the normal operation of the other plunger pump.

It should be noted that both the fracturing apparatus illustrated in FIGS. 27A and 27B and the fracturing apparatus illustrated in FIG. 28 can be provided with at least three kinds of the above-mentioned first pressure sensor, second pressure sensor, first temperature sensor, first vibration sensor, second vibration sensor, first rotation speed sensor and second rotation speed sensor at the same time, so as to evaluate the state of the clutch from different aspects, thus controlling the clutch to disengage upon the clutch being abnormal, thus avoiding further deterioration of the fault, and pertinent overhaul and maintenance can be carried out.

Figure 29:
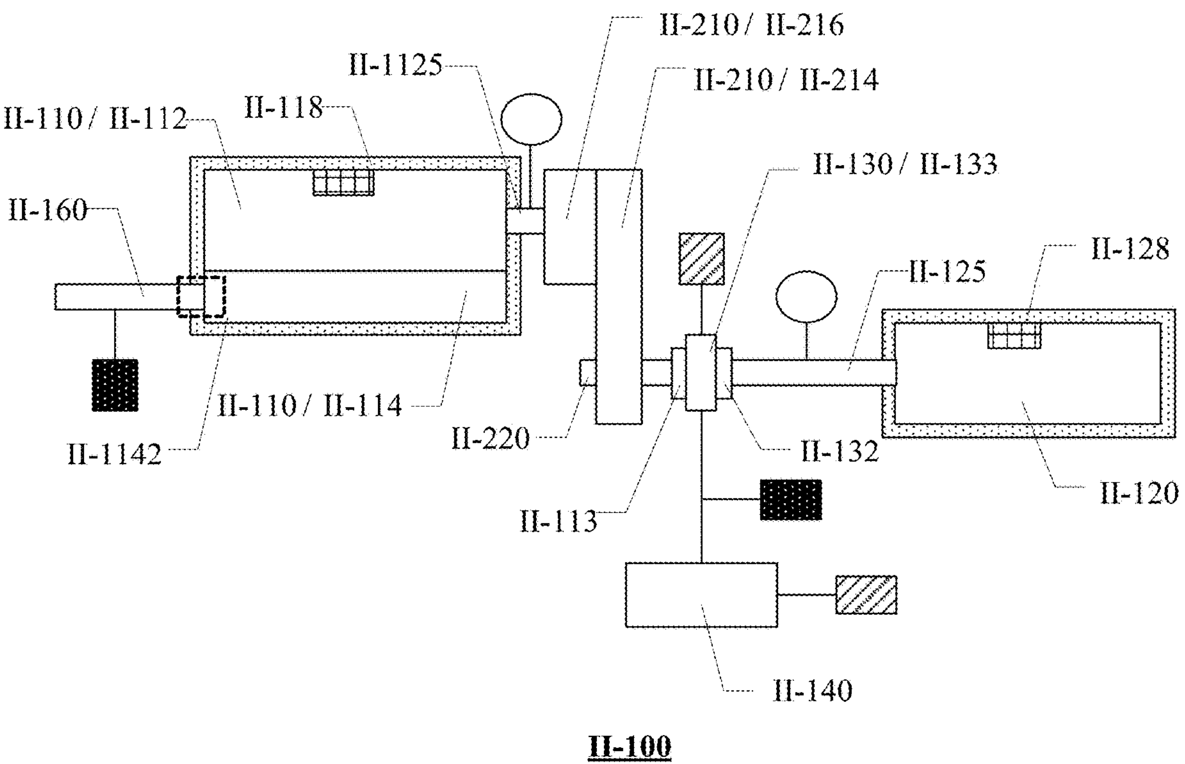
FIG. 29 is a schematic diagram of another fracturing apparatus according to an embodiment of the present disclosure.

FIG. 29 is a schematic diagram of another fracturing apparatus according to an embodiment of the present disclosure. As illustrated by FIG. 29, the fracturing apparatus II-100 can further include a reduction gear box II-210, the reduction gear box II-210 includes an input gear shaft II-212. The input gear shaft II-212 is directly connected with the first connection portion II-131 of the clutch II-130, and the power input shaft II-1125 is directly connected with the reduction gear box II-210. The reduction gear box II-210 can include a planetary gear box II-216 and a parallel shaft gear box II-214, in this case, the parallel shaft gear box II-214 is connected with the input gear shaft II-212, and the power input shaft II-1125 is directly connected with the planetary gear box 216.

In a common fracturing apparatus, the clutch is connected with the power input shaft of the plunger pump. In the operation process of fracturing apparatus, the vibration or jitter of the plunger pump itself is obviously higher than the vibration or jitter of the prime mover because of the crankshaft structure of the power input shaft and the instantaneous pressure fluctuation of the inlet and outlet of the plunger pump. In addition, the clutch itself is heavy, and the clutch also includes a moving mechanism and a sealing structure, so connecting the clutch with the power input shaft of the plunger pump is prone to failure. In addition, the power input shaft of the plunger pump needs to be directly connected with the clutch, and the plunger pump itself is usually provided with a plunger pump reduction gear box, so the power input shaft of the plunger pump needs to pass through the plunger pump body and the plunger pump reduction gear box and be connected with the clutch, thus resulting in a large length of the power input shaft; in addition, the power input shaft needs to form a hydraulic oil hole penetrating through the power input shaft, and the long length of the power input shaft will also lead to the long length of the hydraulic oil hole need to be formed, resulting in high processing difficulty and cost.

However, the fracturing apparatus provided in this example directly connects the first connection portion of the clutch with the input gear shaft of the planetary gear box, and the planetary gear box is directly connected with the power input shaft, so there is no need to connect the clutch with the power input shaft of the plunger pump. Therefore, the fracturing apparatus can reduce the failure rate of the clutch. On the other hand, the power input shaft of the plunger pump does not need to be directly connected with the clutch, which can greatly reduce the length of the power input shaft of the plunger pump, thereby greatly reducing the processing difficulty of the power input shaft and hydraulic oil holes in the power input shaft and reducing the cost.

For example, upon the plunger pump being a five-cylinder plunger pump, the length of the power input shaft can be reduced from more than 2 meters to smaller than 0.8 meters, thus greatly reducing the processing difficulty of the power input shaft and reducing the cost.

Figure 30:
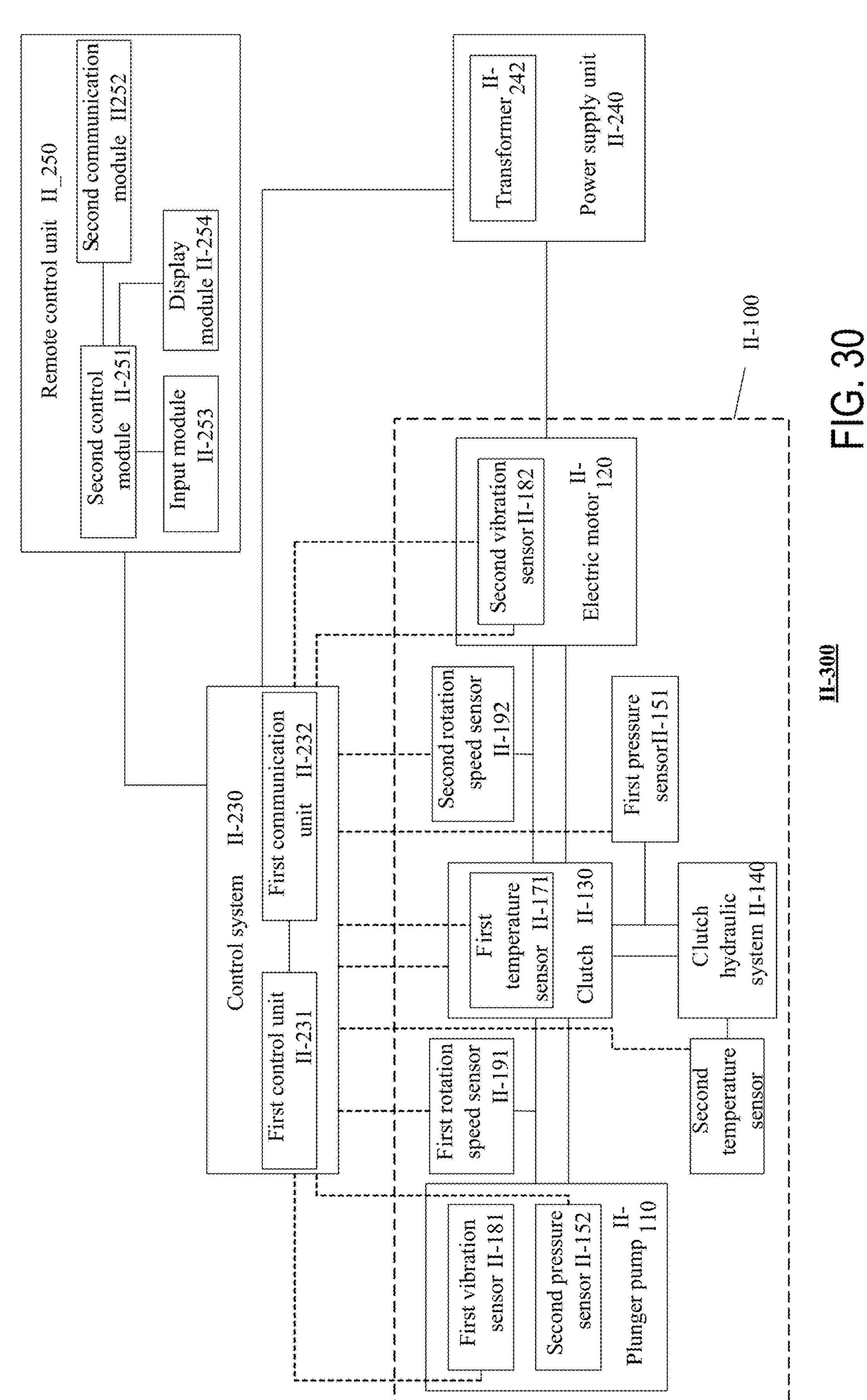
FIG. 30 is a schematic diagram of a fracturing system according to an embodiment of the present disclosure.

FIG. 30 is a schematic diagram of a fracturing system according to an embodiment of the present disclosure. The fracturing system II-300 includes the fracturing apparatus II-100 provided by any one of the above examples. The fracturing system II-300 further includes a control system II-230; the control system II-230 includes a first control unit II-231 and a first communication module II-232. The control system II-230 is electrically connected with the clutch II-130; the control system II-230 is communicatively connected with the first pressure sensor II-151, the second pressure sensor II-152, the first temperature sensor II-171, the second temperature sensor II-172, the first vibration sensor II-181, the second vibration sensor II-182, the first rotation speed sensor II-191 and the second rotation speed sensor II-192. The control system II-230 can control the clutch II-130 according to the parameters fed back by the first pressure sensor II-151, the second pressure sensor II-152, the first temperature sensor II-171, the second temperature sensor II-172, the first vibration sensor II-181, the second vibration sensor II-182, the first rotation speed sensor II-191 and the second rotation speed sensor II-192.

For example, upon the first pressure sensor detecting that the hydraulic pressure value of the hydraulic oil provided by the clutch hydraulic system to the clutch being smaller than the preset pressure value, the control system can control the clutch to disengage so as to avoid the clutch slip phenomenon caused by the lower hydraulic pressure, thus avoiding the further deterioration of the fault and carrying out pertinent overhaul and maintenance. For the control method of the control system according to the parameters fed back by other sensors, please refer to the description of the relevant sensors, which will not be repeated here.

It should be noted that the control system II-230 can be connected with the above-mentioned sensors in a wired manner, or can be connected with the above-mentioned sensors in a wireless manner.

In some examples, as illustrated by FIG. 30, the fracturing system II-300 further includes a remote control unit II-250. The remote control unit II-250 includes a second control module II-251, a second communication module II-252, an input module II-253 and a display module II-254. The remote control unit II-250 can communicate with the first communication module II-232 of the control system II-230 through the second communication module II-252. The second control module II-251 is respectively connected with the input module II-253 and the display module II-254. Therefore, the remote control unit II-250 can receive the data of the control system II-230 and display it on the display module II-254. The user can also send control instructions to the control system II-230 through the input module II-253 of the remote control unit II-250.

In some examples, as illustrated by FIG. 30, the fracturing system II-300 further includes a power supply unit II-240, the power supply unit II-240 includes a transformer II-242. Upon the prime mover II-120 being an electric motor, the power supply unit II-240 can be connected with the prime mover II-120 to supply power to the prime mover II-120. In addition, the power supply unit II-240 can also be connected with the control system II-230 to supply power to the control system II-230.

Figure 31:
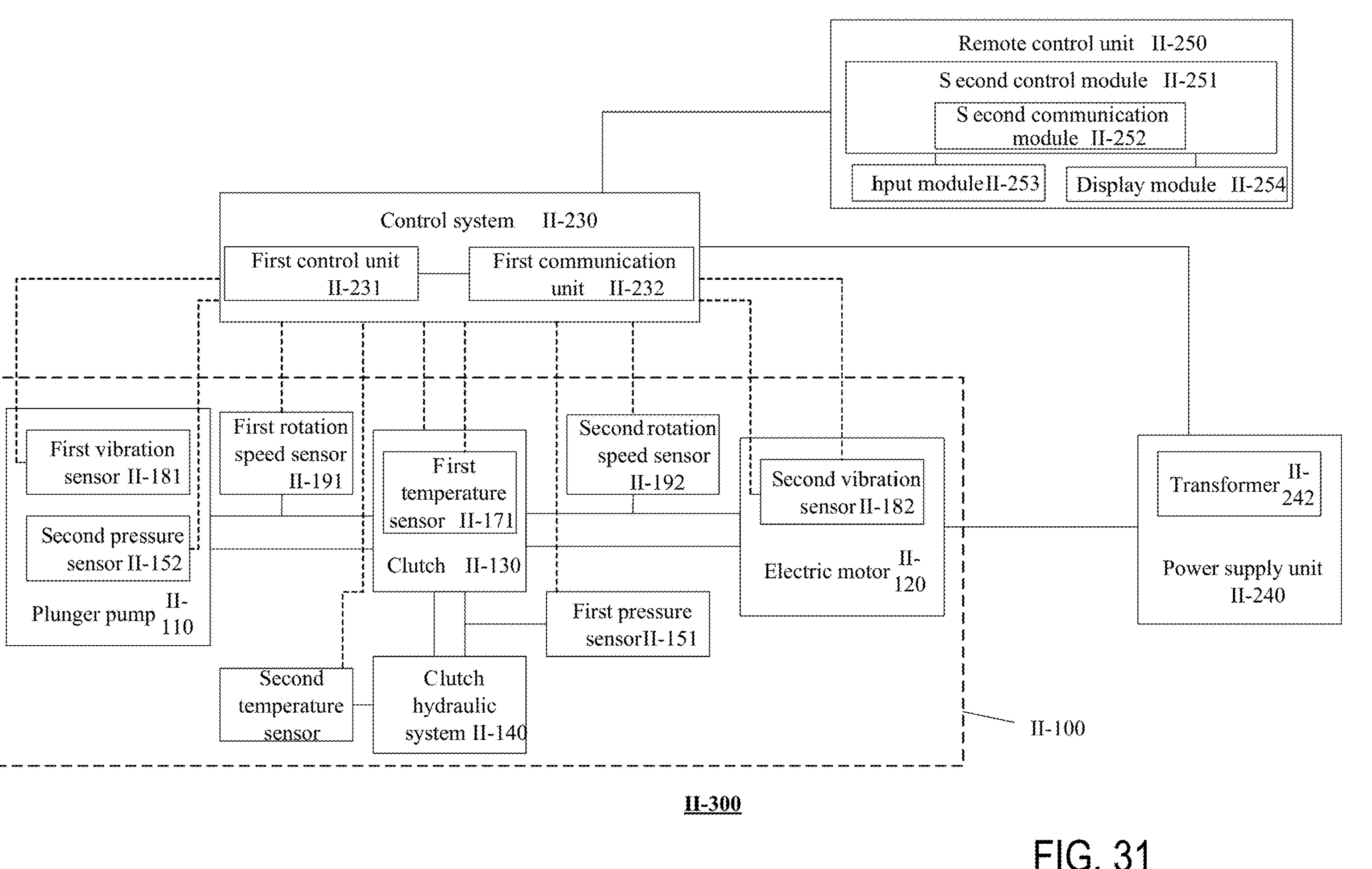
FIG. 31 is a schematic diagram of a fracturing system according to an embodiment of the present disclosure.

FIG. 31 is a schematic diagram of another fracturing system according to an embodiment of the present disclosure. As illustrated by FIG. 31, in the remote control unit II-250, the second communication module II-252 can be integrated in the second control module II-251, thereby improving the integration of the remote control unit. Therefore, the second control module II-251 can directly receive the data of the control system II-230 and display it on the display module II-254. The user can also send control instructions to the control system II-230 through the input module II-253 of the remote control unit II-250.

At least one embodiment of the present disclosure further provides a control method of a fracturing apparatus. The fracturing apparatus can be the fracturing apparatus provided by any of the above examples. In this case, the control method includes: detecting the hydraulic pressure of the clutch hydraulic system; and controlling the clutch to disengage if the detected hydraulic pressure of the clutch hydraulic system is smaller than a first preset pressure value.

In the control method provided by the embodiment of the present disclosure, Upon the hydraulic pressure value of the hydraulic oil provided to the clutch by the clutch hydraulic system being smaller than the first preset pressure value, the clutch is controlled to disengage, so that the clutch slip phenomenon caused by lower hydraulic pressure can be avoided, further deterioration of faults can be avoided, and pertinent overhaul and maintenance can be carried out.

For example, the hydraulic pressure of the clutch hydraulic system can be detected by the above-mentioned first pressure sensor, that is, the hydraulic pressure value of the hydraulic oil provided by the clutch hydraulic system to the clutch.

In some examples, the control method further includes: detecting the pressure of the liquid output by the plunger pump; and controlling the clutch to disengage if the detected pressure of the liquid output by the plunger pump is higher than a second preset pressure value. Therefore, if the pressure of the liquid output by the liquid output end of the plunger pump is higher than the second preset pressure value, there may be a problem with the clutch. In this case, the fracturing apparatus can control the clutch to disengage, so that the fault can be found and treated in time. It should be noted that the above-mentioned second preset pressure value can be a safe pressure value.

For example, the pressure of the liquid output by the plunger pump can be detected by the second pressure sensor described above.

In some examples, the control method further includes: detecting the temperature of the clutch; and controlling the clutch to disengage if the detected temperature of the clutch is higher than a first preset temperature value. Therefore, upon the temperature of the clutch being higher than the preset temperature value, the clutch can be controlled to disengage, so that various faults caused by high clutch temperature can be avoided, further deterioration of faults can be avoided, and pertinent overhaul and maintenance can be carried out.

For example, the temperature of the clutch can be detected by the first temperature sensor.

In some examples, the control method further includes: detecting the temperature of hydraulic oil in the clutch hydraulic system; and controlling the clutch to disengage if the detected temperature of the hydraulic oil in the clutch hydraulic system is higher than a second preset temperature value. Therefore, upon the temperature of hydraulic oil in the clutch hydraulic system being higher than the second preset temperature value, the clutch can be controlled to disengage, so that various faults caused by higher clutch temperature can be avoided, further deterioration of faults can be avoided, and pertinent overhaul and maintenance can be carried out.

For example, the temperature of the hydraulic oil in the clutch hydraulic system can be detected by the second temperature sensor.

In some examples, the control method further includes: detecting the vibration of the plunger pump; and controlling the clutch to disengage if the detected vibration of the plunger pump is higher than a first preset vibration value. During the operation process of fracturing apparatus, upon the clutch failing, the transmission between the clutch and the plunger pump will be abnormal, resulting in high vibration value of the plunger pump. Upon the vibration of the plunger pump being greater than the first preset vibration value, the control method can control the clutch to disengage and completely cut off the input power of the plunger pump, thus avoiding the further deterioration of the fault and carrying out pertinent overhaul and maintenance.

For example, the vibration of the plunger pump can be detected by the first vibration sensor described above.

In some examples, the control method further includes: detecting vibration of the prime mover; and controlling the clutch to disengage if the detected vibration of the prime mover is higher than a second preset vibration value. Upon the clutch failing, the transmission between the clutch and the prime mover will be abnormal, resulting in high vibration value of the prime mover. Upon the vibration of the prime mover being greater than the second preset vibration value, the control method can control the clutch to disengage, thus avoiding the further deterioration of the fault, and carrying out pertinent overhaul and maintenance.

In some examples, the control method further includes: detecting a first actual rotation speed of the power input shaft of the plunger pump; detecting a second actual rotation speed of the power output shaft of the prime mover; calculating a ratio of the first actual speed and the second actual speed, and controlling the clutch to disengage if the ratio is smaller than a first preset ratio or greater than a second preset ratio. Therefore, upon the ratio of the first actual speed of the power input shaft of the plunger pump to the second actual speed of the power output shaft of the prime mover being smaller than the first preset ratio or greater than the second preset ratio (i.e., there is no match), it can be judged that the clutch is abnormal. In this case, the control method can control the clutch to disengage, so as to avoid the further deterioration of the fault, and can carry out pertinent overhaul and maintenance.

Figure 32:
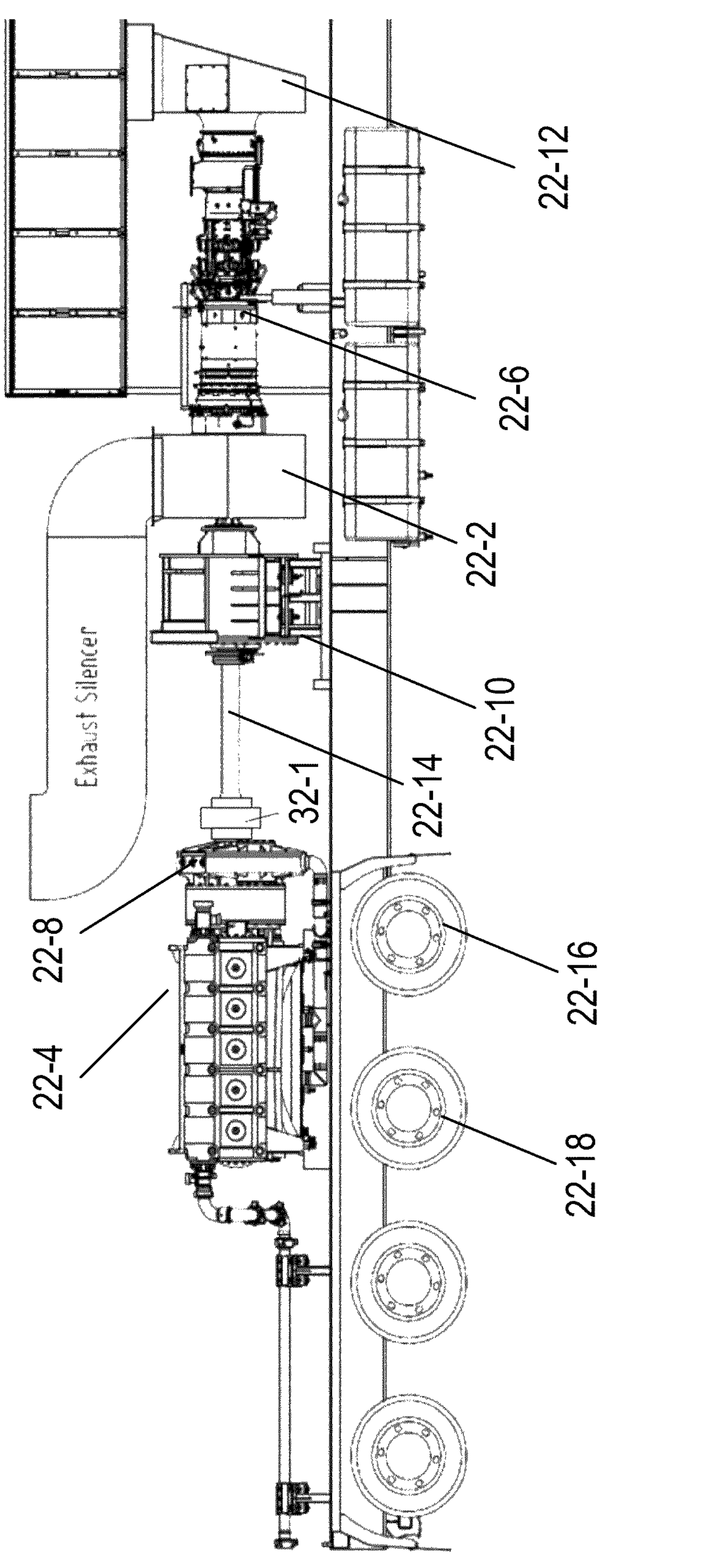
FIG. 32 illustrates the example semi-trailer turbine based fracturing system of FIG. 22 with a clutch 32-1.
Figure 33:
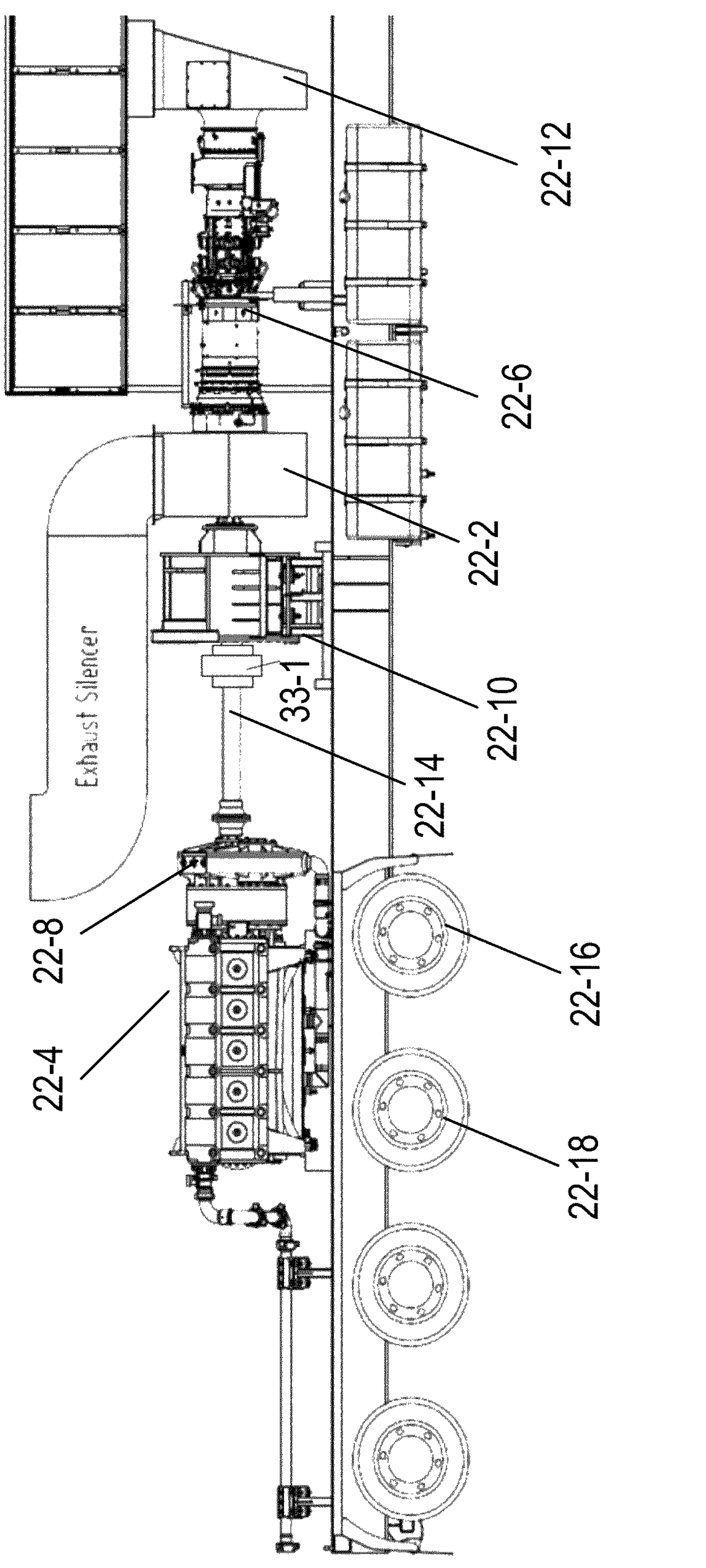
FIG. 33 illustrates the example semi-trailer turbine based fracturing system of FIG. 22 with a clutch 33-1.

FIGS. 31 and 32 further show the example semi-trailer turbine based fracturing system of FIG. 22 with a clutch 32-1 and 33-1, respectively. As illustrated in FIGS. 31 and 32, the clutch may be installed between the gearbox 22-8 as integrated with the plunger pump 22-4 and the gearbox 22-10. For example, the clutch may be installed at either end of the shaft 22-14. In some other implementations, the clutch may be installed such that it is connected to two shafts, one of the shafts may be connected to the integrated gearbox 2-8 and the other shaft may be connected with the gearbox 22-10. In some other implementations, the gearbox 22-10 may not be present (as in FIG. 24 and FIG. 25), and the clutch may be installed in the middle of the shaft or at the end connecting to the integrated gearbox 22-8. The clutch, as described above, may be controllably engaged or disengaged to vary drive speed and torque and may be provided with its hydraulic system.

The above embodiments are presented as non-limiting examples. A person having ordinary skill in the art may freely combine the various aspects of these embodiments. These derived combinations are covered within the scope of this disclosure and the claims listed below.

What is claimed is:

1. A system, comprising:

a turbine engine;

an exhaust subsystem of the turbine engine configurable into an operational state and an idle state distinct from the operational state; and a load drivable by the turbine engine from an exhaust end of the turbine engine via at least one driving shaft that passes through walls of an exhaust duct of the exhaust subsystem, the exhaust duct being connected to an exhaust side of the turbine engine and being separate from the turbine engine;

wherein the turbine engine, the exhaust subsystem, and the load are installed on a common base.

2. The system of claim 1, wherein the exhaust subsystem is disposed between the exhaust end of the turbine engine and the load.

3. The system of claim 2, wherein the exhaust subsystem comprises the exhaust duct and an exhaust silencer.

4. The system of claim 3, wherein a first end of the exhaust duct is coupled to the exhaust end of the turbine engine, and is configured to guide an output exhaust of the turbine engine from horizontal to upward through a second end of the exhaust duct.

5. The system of claim 4, wherein the exhaust silencer is coupled to the second end of the exhaust duct via a pivotal connection.

6. The system of claim 5, further comprising a turnover mechanism configured to drive the exhaust silencer to rotate around the pivotal connection.

7. The system of claim 6, wherein the turnover mechanism is configured to:

drive the exhaust silencer to an operational position in the operational state such that the exhaust silencer conformably couples to the second end of the exhaust duct to guide the output exhaust of the turbine engine through an internal passage of the exhaust silencer upward; and drive the exhaust silencer to an idle position in the idle state such that the internal passage is decoupled from the second end of the exhaust duct and an overall height of the exhaust subsystem is reduced.

8. The system of claim 7, wherein the turnover mechanism is driven hydraulically or electrically.

9. The system of claim 7, wherein the system further comprises a position sensor for detecting a rotational position of the exhaust silencer relative to the exhaust duct.

10. The system of claim 9, wherein the positional sensor is configured to generate signals to control a switching between the operational position and the idle position for the exhaust silencer.

11. The system of claim 7, further comprising a reduction gearbox disposed between the exhaust subsystem and the load.

12. The system of claim 7, wherein the exhaust silencer rests away from the turbine engine in the idle position.

13. The system of claim 7, further comprising an air intake assembly for the turbine engine.

14. The system of claim 13, wherein the air intake assembly is disposed above the turbine engine.

15. The system of claim 14, wherein the air intake assembly is disposed lower than an exit of the output exhaust of the turbine engine at the exhaust silencer in the operation position.

16. The system of claim 14, wherein the exhaust silencer comprises a silencer section and an extended section to guide the output exhaust of the turbine engine higher than the air intake assembly.

17. The system of claim 7, wherein the load comprises a plunger pump or an electric generator.

18. The system of claim 7, further comprising a cap pivotally connected to the second end of the exhaust duct and slidably coupled to the exhaust silencer.

19. A system, comprising:

a turbine engine;

an exhaust subsystem of the turbine engine configurable into an operational state and an idle state distinct from the operational state; and a load drivable by the turbine engine from an exhaust end of the turbine engine via at least one driving shaft that passes through walls of an exhaust duct of the exhaust subsystem, the exhaust duct being connected to an exhaust side of the turbine engine and being separate from the turbine engine;

wherein the exhaust subsystem comprises the exhaust duct and an exhaust silencer;

wherein the turbine engine, the exhaust subsystem, and the load are installed on a common base;

wherein the system further comprises a turnover mechanism comprising an extendable and contractible telescopic structure; and wherein one end of the extendable and contractible telescopic structure is anchored on the common base and another end of the extendable and contractible telescopic structure is anchored to an outer wall of the exhaust silencer.

* * * * *